US008145194B2

(12) United States Patent
Yoshikawa et al.

(10) Patent No.: US 8,145,194 B2
(45) Date of Patent: Mar. 27, 2012

(54) WIRELESS DEVICE MONITORING SYSTEM INCLUDING UNAUTHORIZED APPARATUS AND AUTHENTICATION APPARATUS WITH SECURITY AUTHENTICATION FUNCTION

(75) Inventors: Yoshishige Yoshikawa, Shiga (JP); Yoshio Horiike, Osaka (JP)

(73) Assignee: Panasonic Corporation, Osaka (JP)

( * ) Notice: Subject to any disclaimer, the term of this patent is extended or adjusted under 35 U.S.C. 154(b) by 476 days.

(21) Appl. No.: 12/064,937

(22) PCT Filed: Aug. 30, 2006

(86) PCT No.: PCT/JP2006/317069
§ 371 (c)(1),
(2), (4) Date: Oct. 8, 2008

(87) PCT Pub. No.: WO2007/026745
PCT Pub. Date: Mar. 8, 2007

(65) Prior Publication Data
US 2010/0197271 A1    Aug. 5, 2010

(30) Foreign Application Priority Data

Aug. 30, 2005 (JP) ................................ 2005-248969
Aug. 30, 2005 (JP) ................................ 2005-248970

(51) Int. Cl.
*H04W 72/00* (2009.01)
(52) U.S. Cl. ..................................... 455/411; 455/452.2
(58) Field of Classification Search .................. 455/411, 455/420, 410, 412, 556.2, 425, 550.1, 552.1; 713/170, 168; 340/573.4, 686.6; 380/270
See application file for complete search history.

(56) References Cited

U.S. PATENT DOCUMENTS

| 5,396,218 | A  | * | 3/1995  | Olah ......................... 340/568.7 |
| 6,515,575 | B1 |   | 2/2003  | Kataoka |
| 6,577,239 | B2 |   | 6/2003  | Jespersen |
| 6,956,480 | B2 |   | 10/2005 | Jespersen |

(Continued)

FOREIGN PATENT DOCUMENTS

JP           5-347617          12/1993

(Continued)

OTHER PUBLICATIONS

Supplementary European Search Report issued Mar. 18, 2010 in Application No. EP 06 82 1797.

(Continued)

*Primary Examiner* — Kamran Afshar
*Assistant Examiner* — Kenneth Corbin
(74) *Attorney, Agent, or Firm* — Wenderoth, Lind & Ponack, L.L.P.

(57) ABSTRACT

In a wireless device monitoring system including a mobile telephone and an authentication apparatus, a controller of the authentication apparatus repeatedly executes a distance detection processing based on a received level of a received wireless signal and an authentication processing based on authentication data included in the received wireless signal continuously at a first communication interval T1 and a second communication interval T2, respectively, and outputs an alarm signal or executes a predetermined control processing when a true counterpart electronic apparatus is not present or when the true counterpart electronic apparatus is apart from the electronic apparatus by a distance longer than the predetermined threshold distance. When a first communication time T11 for the distance detection processing is shorter than a second communication time T12 for the authentication processing, the T1 and the T2 are set to satisfy T1<T2.

19 Claims, 45 Drawing Sheets

U.S. PATENT DOCUMENTS

| | | |
|---|---|---|
| 2001/0052846 A1 | 12/2001 | Jespersen |
| 2003/0122671 A1 | 7/2003 | Jespersen |
| 2005/0048954 A1* | 3/2005 | Gortz et al. ................ 455/414.1 |

FOREIGN PATENT DOCUMENTS

| | | |
|---|---|---|
| JP | 10-41936 | 2/1998 |
| JP | 2002-57789 | 2/2002 |

OTHER PUBLICATIONS

European Search Report issued Jan. 26, 2011 in Application No. EP 10 19 0029.

International Search Report issued Oct. 24, 2006 in the International (PCT) Application No. PCT/JP2006/317069.

* cited by examiner

Fig.1
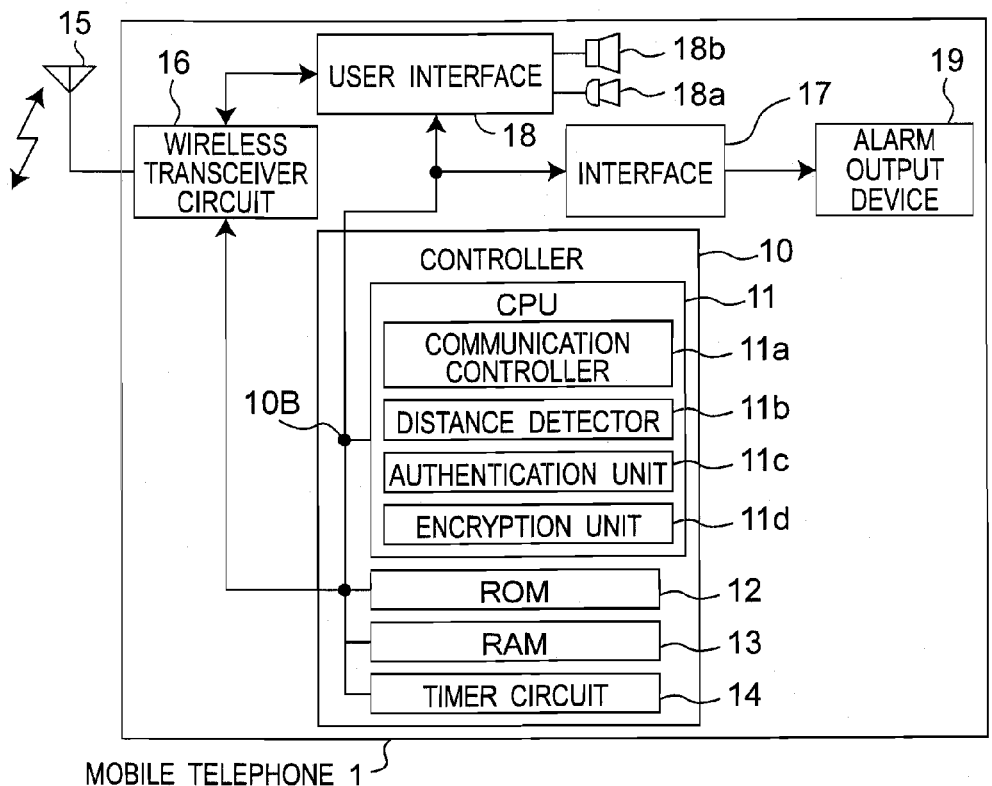
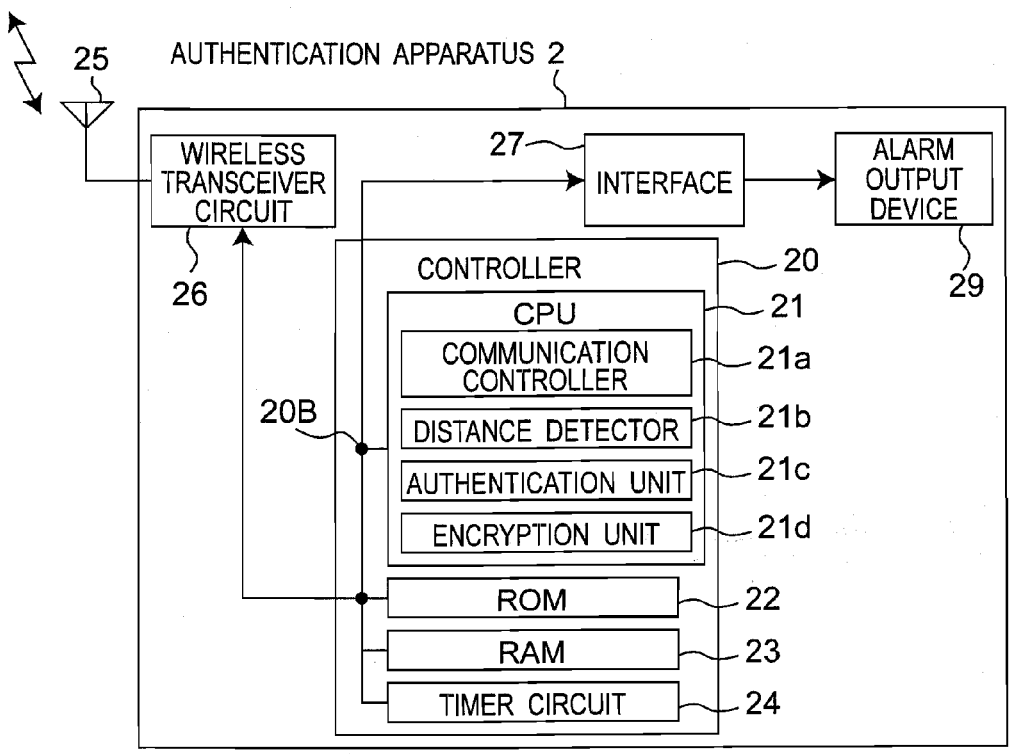

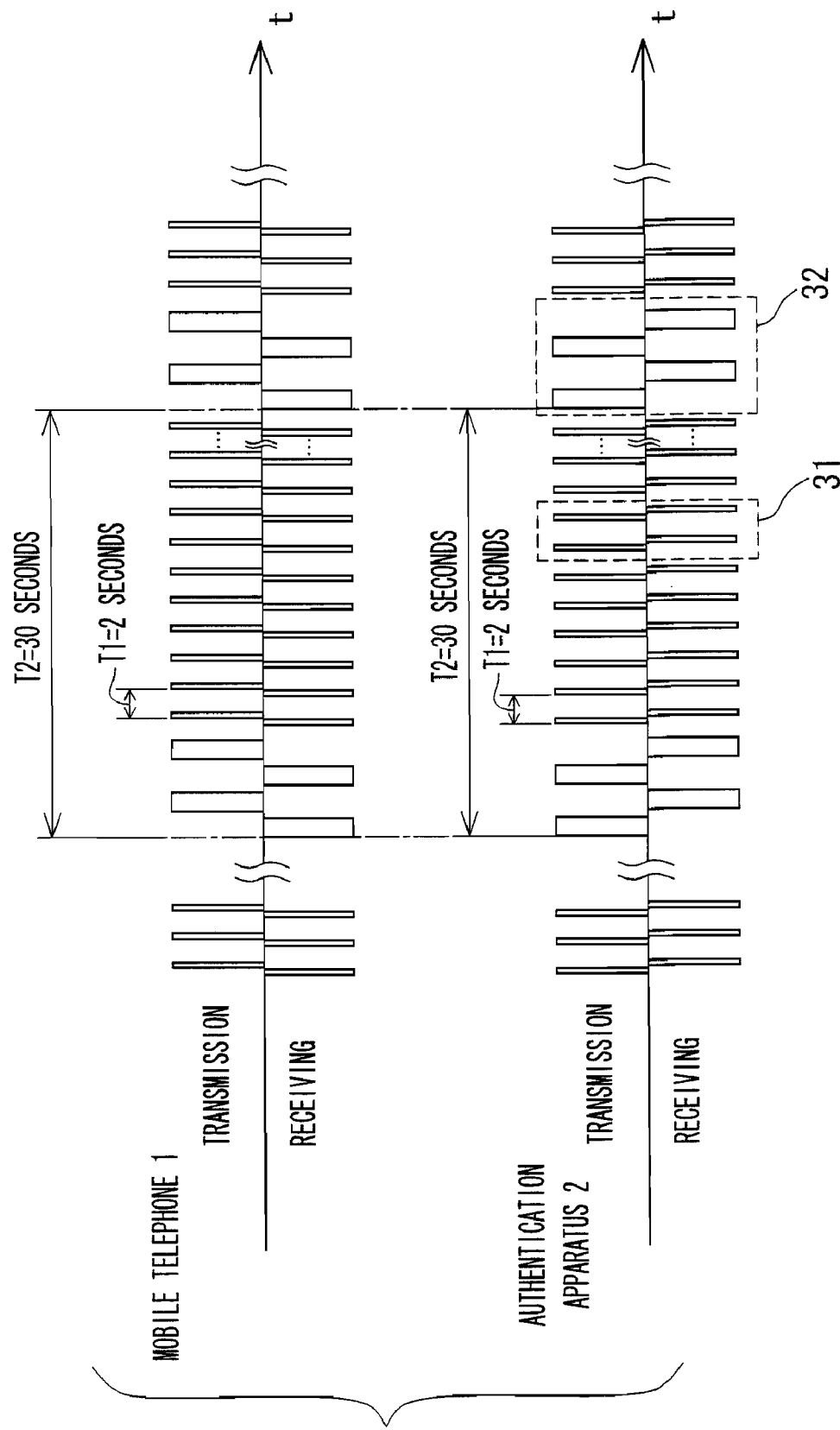

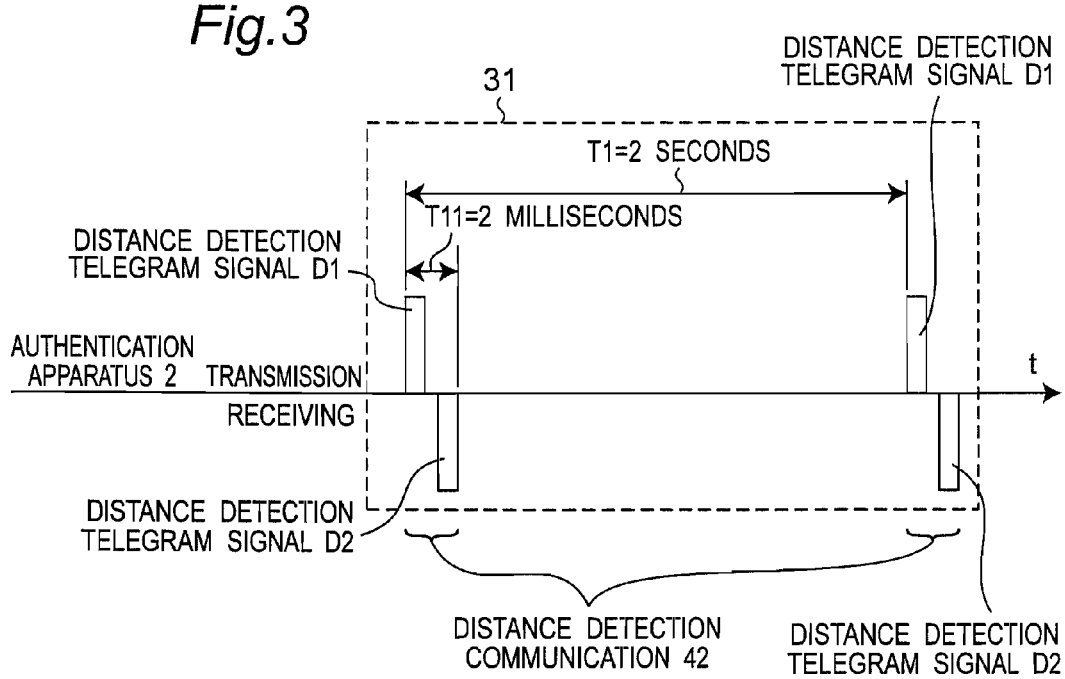
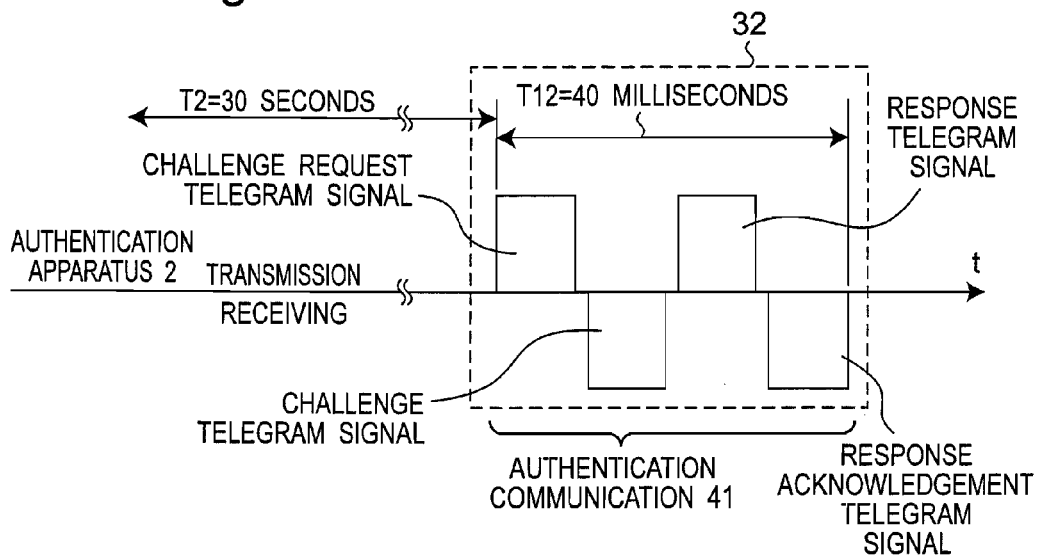

Fig. 37

SEVENTH EMBODIMENT

FIRST CHALLENGE TELEGRAM SIGNAL, AND SECOND CHALLENGE TELEGRAM SIGNAL

FIRST RESPONSE DIVIDED TELEGRAM SIGNALS V1 TO V8, AND SECOND RESPONSE DIVIDED TELEGRAM SIGNALS W1 TO W8

FIRST DISTANCE DETECTION TELEGRAM SIGNALS T1 TO T7, AND SECOND DISTANCE DETECTION TELEGRAM SIGNALS U1 TO U7

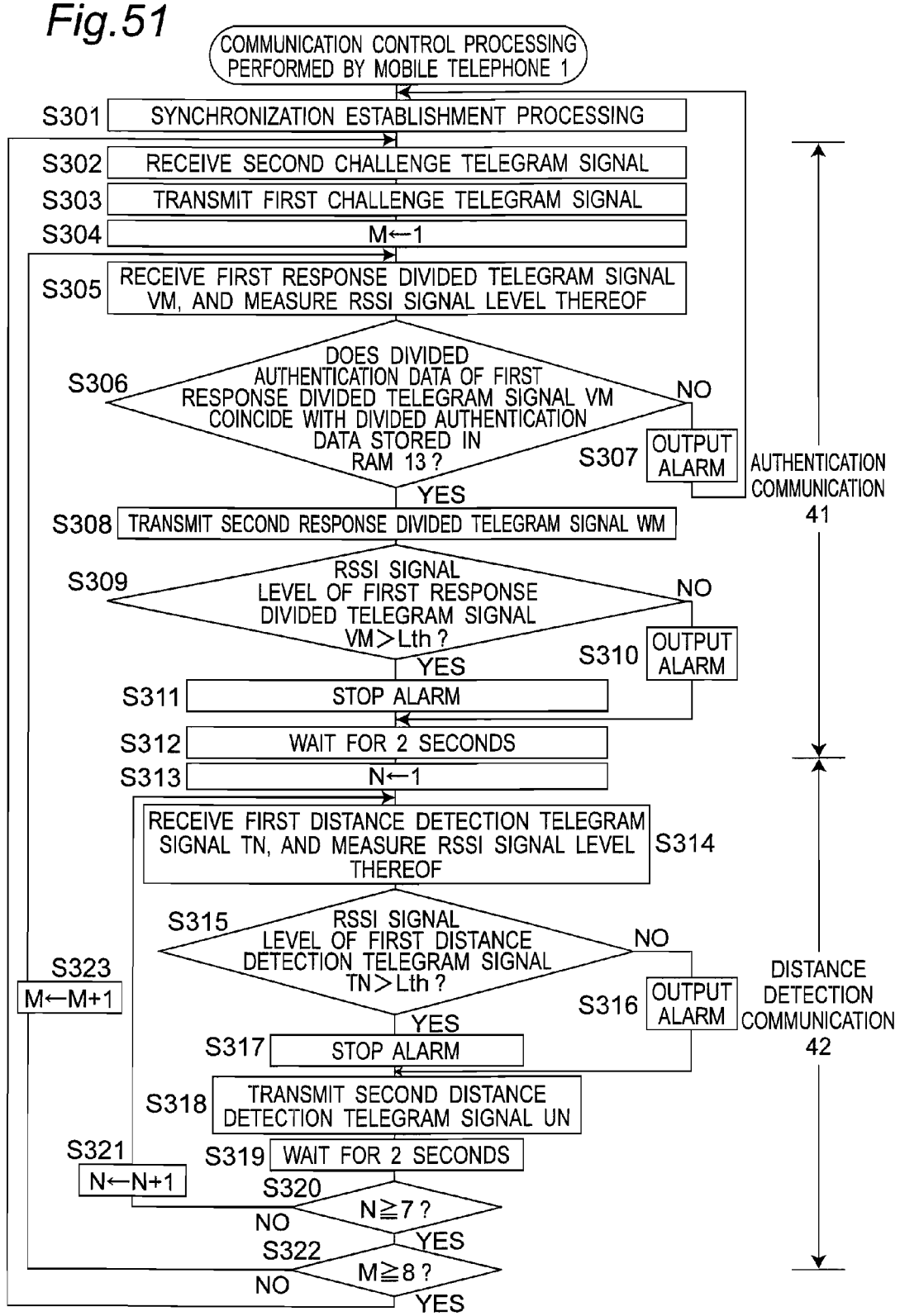

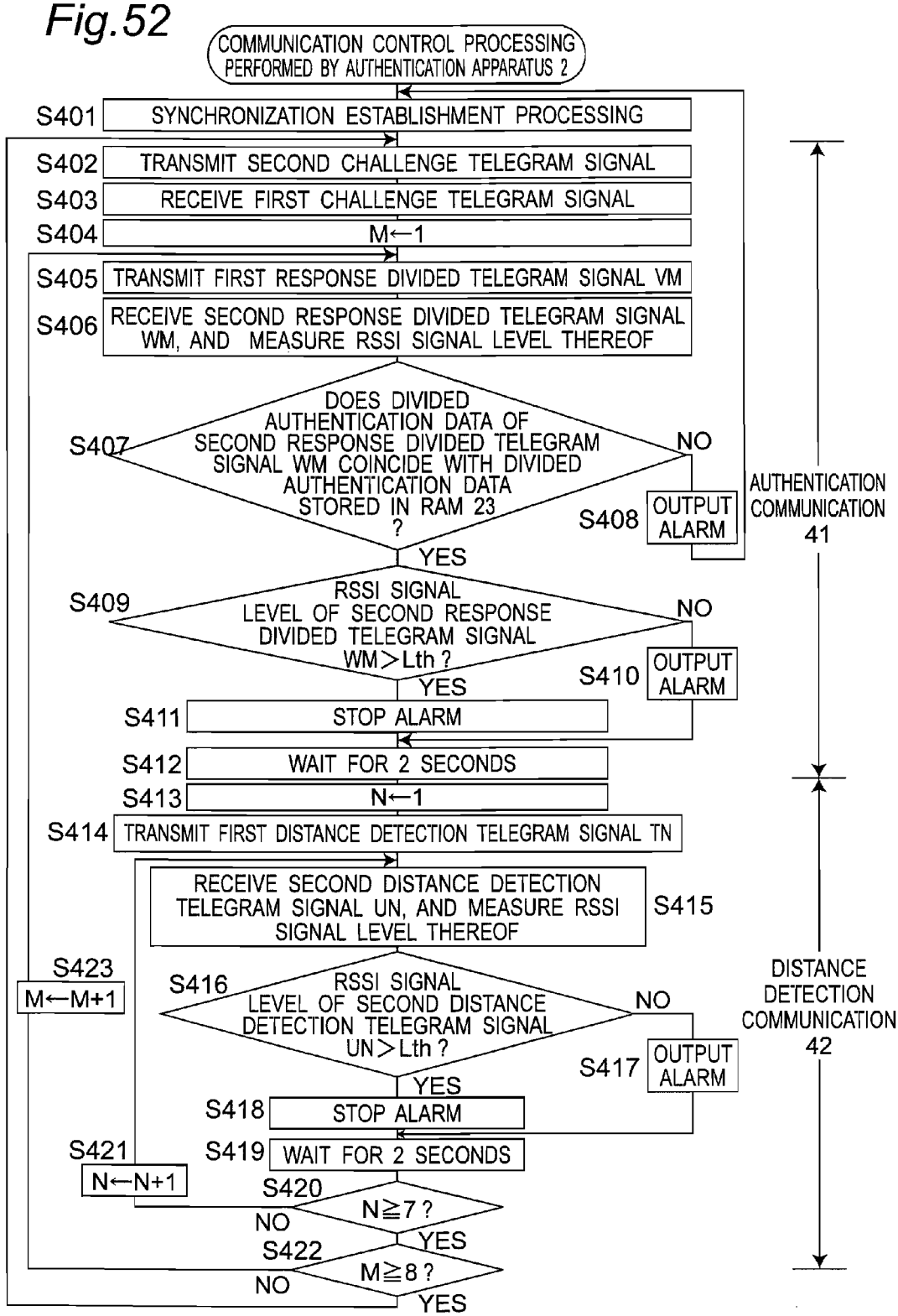

_US 8,145,194 B2_

WIRELESS DEVICE MONITORING SYSTEM INCLUDING UNAUTHORIZED APPARATUS AND AUTHENTICATION APPARATUS WITH SECURITY AUTHENTICATION FUNCTION

TECHNICAL FIELD

The present invention relates to a wireless device monitoring system which includes an unauthorized apparatus including a wireless transceiver such as a mobile telephone, and an authentication apparatus including a wireless transmitter and that authorizes the unauthorized apparatus. In particular, the present invention relates to an electronic apparatus that is the unauthorized apparatus and the authorization apparatus for use in a wireless device monitoring system which includes a security authentication function of temporally continuously monitoring a distance between the unauthorized apparatus and the authorization apparatus and outputting an alarm when the distance is equal to or longer than a predetermined distance.

BACKGROUND ART

In recent years, a number of damage cases has increased in which confidential information, such as personal information (e.g., address book data), recorded in a mobile telephone, such as a mobile telephone or a personal computer, is leaked to the third party resulting from theft or loss of the mobile telephone. In addition, a mobile telephone to which a money payment function (e.g., FeliCa (Registered Trademark)) using wireless communication is added has been popular. The mechanisms for preventing the damage from the theft or loss are desired for such an apparatus.

As one of the mechanisms, there has been known a system in which a mobile telephone and an authentication apparatus are owned separately, and each of the mobile telephone and the authentication apparatus includes a wireless communication function and holds a regular communication with its counterpart, to always monitor a relative distance between the mobile telephone and the authentication apparatus. In such a system, the mobile telephone and the authentication apparatus perform the intermittent communication in synchronous with each other, and the distance to the counterpart apparatus is detected by detecting a received signal level or judging whether or not the received signal level reaches a level at which a received signal can be demodulated instead of detecting the received signal level. If it is judged that the distance is longer than a predetermined distance or the distance is too long to demodulate the received signal, the function of the mobile telephone is stopped (e.g., the payment function is stopped). Furthermore, the authentication apparatus sounds an alarm by pushing a buzzer or the like, and then, this leads to prevention of the theft or loss (See, for example, Patent Document 1).

Patent Document 1: Japanese patent laid-open publication No. JP-10-041936-A.

PROBLEMS TO BE SOLVED BY THE INVENTION

However, the transceiver according to the prior art has problems of large power consumption and difficulty in long-time operation due to a small-sized battery or the like. Namely, when a theft occurs, it is necessary to instantly sound an alarm. To do so, it is necessary to shorten the time interval (communication interval) of the intermittent wireless communication. Further, if authentication is performed by a key-based encrypted communication to enhance authentication safety (security level), a data length of each communication becomes relatively long. Moreover, one authentication accompanies a plurality of communications, and then, this leads to increase in the communication time. As a result, the power consumption is further increased. Accordingly, for the above-stated reasons, the power consumption cannot be reduced with shortening the reaction detection time for detecting that the distance between the mobile telephone and the authentication apparatus becomes longer.

It is an object of the present invention to solve the above-stated problems and to provide a wireless device monitoring system capable of shortening the reaction detection time for detecting that the distance between the unauthorized apparatus of the mobile telephone and the authentication apparatus becomes longer and capable of reducing the power consumption of each apparatus, and electronic apparatuses that are the unauthorized apparatus and the authorization apparatus for use in the wireless device monitoring system.

SUMMARY OF THE INVENTION

According to the first aspect of the present invention, there is provided an electronic apparatus including receiving means, distance detection means, authentication means, and control means. The receiving means intermittently receives a wireless signal from a counterpart electronic apparatus, and the distance detection means executes a distance detection processing for detecting whether or not a distance to the counterpart electronic apparatus exceeds a predetermined threshold distance based on a received level of the received wireless signal. The authentication means executes an authentication processing for judging whether or not the counterpart electronic apparatus is a true electronic apparatus by judging whether or not authentication data included in the received wireless signal is predetermined authentication data, and for authenticating the counterpart electronic apparatus. The control means monitors whether or not a true counterpart electronic apparatus is present within the threshold distance by repeatedly executing the distance detection processing and the authentication processing continuously at a first communication interval and a second communication interval, respectively, and executes one of a processing of outputting an alarm signal and a predetermined control processing when the true counterpart electronic apparatus is not present or when the true counterpart electronic apparatus is apart from the electronic apparatus by a distance longer than the predetermined threshold distance. When first communication time for the distance detection processing is shorter than second communication time for the authentication processing, the first time interval is set to be shorter than the second time interval.

In the above-mentioned electronic apparatus, the authentication data is encrypted authentication data, and the authentication means decodes the encrypted authentication data included in the wireless signal from the counterpart electronic apparatus using a predetermined decoding key, and obtains authentication data.

According to the second aspect of the present invention, there is provided a wireless device monitoring system includes a first electronic apparatus that is the electronic apparatus, and a second electronic apparatus that is a counterpart electronic apparatus to the first electronic apparatus, and that is the above-mentioned electronic apparatus.

According to the third aspect of the present invention, there is provided a wireless device monitoring system including a first electronic apparatus that is the above-mentioned electronic apparatus, and a second electronic apparatus that is a counterpart electronic apparatus to the first electronic apparatus. The second electronic apparatus includes receiving means, authentication means, and control means. The receiving means intermittently receives a wireless signal from the first electronic apparatus. The authentication means executes an authentication processing for judging whether or not the counterpart electronic apparatus is a true electronic apparatus by judging whether or not authentication data included in the received wireless signal is predetermined authentication data, and authenticates the counterpart electronic apparatus. The control means monitors whether or not a true counterpart electronic apparatus is present within the threshold distance by repeatedly executing the authentication processing continuously, and executes one of a processing of outputting an alarm signal and a predetermined control processing when the true counterpart electronic apparatus is apart from the electronic apparatus by a distance longer than the predetermined threshold distance.

According to the fourth aspect of the present invention, there is provided an electronic apparatus including receiving means, authentication means, and control means. The receiving means intermittently receives a wireless signal from a counterpart electronic apparatus, and the wireless signal includes a plurality of divided authentication data into which predetermined authentication data is divided. The authentication means judges whether or not the counterpart electronic apparatus is a true electronic apparatus by judging whether or not each of the divided authentication data included in the received wireless signal is corresponding divided authentication data when the authentication data is divided into the plurality of divided authentication data, and for authenticating the counterpart electronic apparatus. The control means executes one of a processing of outputting an alarm signal and a predetermined control processing when the authentication means does not judge that the counterpart electronic apparatus is the true electronic apparatus.

In the above-mentioned electronic apparatus, the receiving means receives a wireless signal including the predetermined authentication data from the counterpart electronic apparatus before receiving the divided authentication data. The authentication means judges whether or not the counterpart electronic apparatus is the true electronic apparatus by judging that authentication data included in the received wireless signal is the predetermined authentication data, and makes initial authentication of the counterpart electronic apparatus. The control means executes one of the processing of outputting the alarm and the control processing when the authentication means does not judge that the counterpart electronic apparatus is the true electronic apparatus.

In addition, the above-mentioned electronic apparatus further includes distance detection means for detecting whether or not a distance to the counterpart electronic apparatus exceeds a predetermined threshold distance based on a received level of the received wireless signal. The control means executes one of the processing of outputting the alarm signal and the control processing when the true counterpart electronic apparatus authenticated by the authentication means is apart from the electronic apparatus by a distance longer than the threshold distance.

Further, the above-mentioned electronic apparatus further includes distance detection means for detecting whether or not a distance to the counterpart electronic apparatus exceeds a predetermined threshold distance based on a received level of the received wireless signal including a distance detection signal. The control means executes one of the processing of outputting the alarm signal and the control processing when the true counterpart electronic apparatus authenticated by the authentication means is apart from the electronic apparatus by a distance longer than the threshold distance. When first communication time for distance detection processing based on the distance detection signal is shorter than second communication time for the authentication, a first time interval for transmitting the distance detection signal is set to be shorter than a second time interval for transmitting a wireless signal other than the distance detection telegram signal.

Still further, in the above-mentioned electronic apparatus, the authentication data is encrypted authentication data, and the authentication means decodes the encrypted authentication data obtained by combining the respective divided authentication data included in the wireless signal from the counterpart electronic apparatus using a predetermined decoding key, obtains authentication data, and authenticates the counterpart electronic apparatus for each of the authentication data.

According to the fifth aspect of the present invention, there is provided a wireless device monitoring system including first and second electronic apparatuses. The first electronic apparatus is the above-mentioned electronic apparatus. The second electronic apparatus is a counterpart electronic apparatus to the first electronic apparatus, and transmits the wireless signal to the first electronic apparatus.

According to the sixth aspect of the present invention, there is provided a wireless device monitoring system including first and second electronic apparatuses. The first electronic apparatus is the above-mentioned electronic apparatus. The second electronic apparatus is a counterpart electronic apparatus to the first electronic apparatus, the second electronic apparatus transmits the wireless signal to the first electronic apparatus, and the second electronic apparatus is the above-mentioned electronic apparatus. The first electronic apparatus and the second electronic apparatus authenticate each other.

In the above-mentioned wireless device monitoring system, each of the first and second electronic apparatuses uses authentication data obtained by combining respective divided authentication data included in the wireless signal from the counterpart electronic apparatus, as authentication data of a wireless signal to be next transmitted to the counterpart electronic apparatus.

According to the seventh aspect of the present invention, there is provided a control program for use in an electronic apparatus, including the following steps of:

intermittently receiving a wireless signal from a counterpart electronic apparatus;

executing a distance detection processing for detecting whether or not a distance to the counterpart electronic apparatus exceeds a predetermined threshold distance based on a received level of the received wireless signal;

executing an authentication processing for judging whether or not the counterpart electronic apparatus is a true electronic apparatus by judging whether or not authentication data included in the received wireless signal is predetermined authentication data, and for authenticating the counterpart electronic apparatus;

monitoring whether or not a true counterpart electronic apparatus is present within the threshold distance by repeatedly executing the distance detection processing and the authentication processing continuously at a first communication interval and a second communication interval, respectively, and executing one of a processing of outputting an alarm signal and a predetermined control processing when the true counterpart electronic apparatus is not present or when the true counterpart electronic apparatus is apart from the electronic apparatus by a distance longer than the predetermined threshold distance; and setting the first time interval shorter than the second time interval when first communication time for the distance detection processing is shorter than second communication time for the authentication processing.

According to the eighth aspect of the present invention, there is provided a computer readable recording medium for storing the above-mentioned control program for use in the electronic apparatus according to the seventh aspect of the present invention of the present invention.

According to the ninth aspect of the present invention, there is provided a control program for use in an electronic apparatus including the following steps of:

intermittently receiving a wireless signal from a counterpart electronic apparatus, the wireless signal including a plurality of divided authentication data into which predetermined authentication data is divided;

judging whether or not the counterpart electronic apparatus is a true electronic apparatus by judging whether or not each of the divided authentication data included in the received wireless signal is corresponding divided authentication data when the authentication data is divided into the plurality of divided authentication data, and authenticating the counterpart electronic apparatus; and executing one of a processing of outputting an alarm signal and a predetermined control processing when it is not judged that the counterpart electronic apparatus is the true electronic apparatus.

According to the tenth aspect of the present invention, there is provided a computer readable recording medium for storing the control program for use in the electronic apparatus according to the ninth aspect of the present invention.

EFFECTS OF THE INVENTION

According to the present invention, each of the electronic apparatus and the wireless device monitoring system using the electronic apparatus include the control means for monitoring whether or not a true counterpart electronic apparatus is present within the threshold distance by repeatedly executing the distance detection processing and the authentication processing continuously at the first communication interval and the second communication interval, respectively, and for outputting an alarm signal or executing a predetermined control processing when the true counterpart electronic apparatus is not present or when the true counterpart electronic apparatus is apart from the electronic apparatus by a distance longer than the predetermined threshold distance. In this case, when the first communication time for the distance detection processing is shorter than second communication time for the authentication processing, the first time interval is set to be shorter than the second time interval. Therefore, the number of repetition (or frequency) of the communication for the distance detection processing having a short communication time is increased, and the number of repetition (or frequency) for the authentication processing having a longer communication time is reduced. Then, this leads to that the total communication time can be shortened and the power consumption can be remarkably reduced while the detection time is kept short.

In addition, each of the electronic apparatus and the wireless device monitoring system using the electronic apparatus according to the present invention judge whether or not the counterpart electronic apparatus is a true electronic apparatus by judging whether or not each of the divided authentication data included in the received wireless signal is corresponding divided authentication data when the authentication data is divided into the plurality of divided authentication data, and authenticates the counterpart electronic apparatus, then outputs an alarm signal or executes a predetermined control processing when it is not judged that the counterpart electronic apparatus is the true electronic apparatus. Therefore, the authentication data is divided into a plurality of divided authentication data, and the divided authentication data is transmitted intermittently and received by the counterpart electronic apparatus, so that one communication time can be shortened. Accordingly, even if the number of repetition (or frequency) of communication is increased, the power consumption of the transceiver can be reduced, and the detection time for the authentication can be shortened. In other words, it is possible to realize both of reduction in the response time for authentication and detection, and reduction in the battery consumption.

BRIEF DESCRIPTION OF THE DRAWINGS

FIG. 1 is a block diagram showing a configuration of a wireless device monitoring system including a mobile telephone 1 and an authentication apparatus 2, according to a first embodiment of the present invention.

FIG. 2 is a timing chart showing a communication procedure between the mobile telephone 1 and the authentication apparatus 2 shown in FIG. 1.

FIG. 3 is an enlarged view of a part 31 of the communication procedure shown in FIG. 2.

FIG. 4 is an enlarged view of a part 32 of the communication procedure shown in FIG. 2.

FIG. 37 is a timing chart showing a communication procedure between a mobile telephone 1 and an authentication apparatus 2 for use in a wireless device monitoring system according to a seventh embodiment of the present invention.

FIG. 51 is a flowchart showing a communication control processing performed by the controller 20 of the mobile telephone 1 according to the eighth embodiment.

FIG. 52 is a flowchart showing a communication control processing performed by the controller 20 of the authentication apparatus 2 according to the eighth embodiment.

DESCRIPTION OF REFERENCE SYMBOLS

Figure 5:
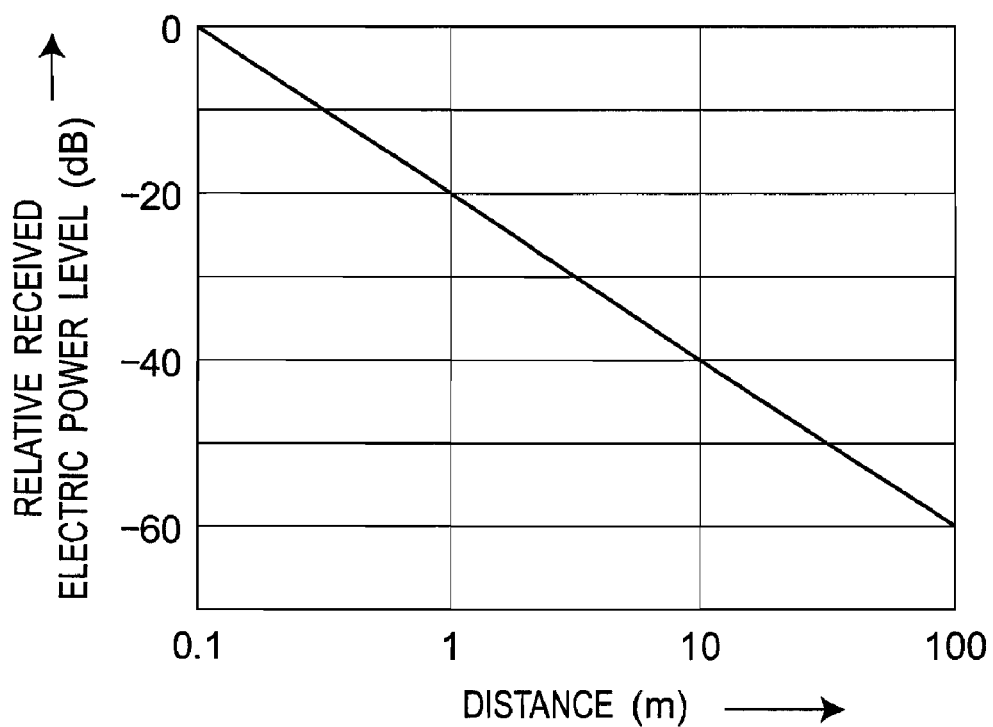
FIG. 5 is a graph showing relative received electric power with respect to distance in a wireless communication of the wireless device monitoring system shown in FIG. 1.

1 . . . Mobile telephone,
2 . . . Authentication apparatus,
10 . . . Controller, 10B ... Bus,
11 ... CPU,
11a ... Communication controller,
11b ... Distance detector,
11c ... Authentication unit,
11d ... Encryption unit,
12 ... ROM,
13 ... RAM,
14 ... Timer circuit,
15 ... Antenna,
16 ... Wireless transceiver circuit,
17 ... Interface,
18 ... User interface,
19 ... Alarm output device,
20 ... Controller,
20B ... Bus,
21 ... CPU,
21a ... Communication controller,
21b ... Distance detector,
21c ... Authentication unit,
21d ... Encryption unit,
22 ... ROM,
23 ... RAM,
24 ... Timer circuit,
25 ... Antenna,
26 ... Wireless transceiver circuit,
27 ... Interface,
29 ... Alarm output device,
41 ... Authentication communication,
42 ... Distance detection communication,
43 ... Initial authentication,
44 ... Continuous authentication,
81 and 91 ... First communication procedure,
82 and 92 ... Second communication procedure,
83 and 93 ... Third communication procedure.

DETAILED DESCRIPTION OF THE INVENTION

Embodiments of the present invention will be described below with reference to the drawings. Similar components are denoted by the same reference symbols.

First Embodiment

FIG. 1 is a block diagram showing a configuration of a wireless device monitoring system including a mobile telephone 1 and an authentication apparatus 2 according to a first embodiment of the present invention. It is to be noted that the apparatus configuration of the wireless device monitoring system shown in FIG. 1 is similarly applied to second to eighth embodiments which will be described later. As shown in FIG. 1, the wireless device monitoring system according to the present embodiment is configured to include the mobile telephone 1 that is an unauthorized apparatus and the authentication apparatus 2 that authenticates the mobile telephone 1.

Referring to FIG. 1, the mobile telephone 1 is configured to include a controller 10 that controls entire operations performed by the mobile telephone 1 (in particular, operations performed by a wireless transceiver circuit 16, an interface 17, and a user interface 18), an antenna 15 receiving a wireless signal from the authentication apparatus 2 and transmitting a wireless signal to the authentication apparatus 2, the wireless transceiver circuit 16 for being in a wireless communication with the authentication apparatus 2 using the antenna 15, the interface 17 that performs a processing for an interface with an alarm output device 19, and the user interface 18 that includes a microphone 18a and a loudspeaker 18b and that performs a processing for a mobile telephone function interface with the user of the mobile telephone 1. Namely, the user interface 18 converts a user's speech input through the microphone 18a into an electric signal, amplifies the electric signal, and outputs the amplified electric signal to the wireless communication circuit 16. Furthermore, the user interface 18 amplifies a speech signal received from and demodulated by the wireless communication circuit 16 and outputs the amplified speech signal through the loudspeaker 18b. Moreover, in the mobile telephone 1, an alarm signal outputted from the controller 10 is inputted to the alarm output device 19 via the interface 17. The alarm output device 19 outputs an alarm. The wireless transceiver circuit 16 includes a wireless transceiver circuit for use in mobile telephone, and a wireless communication wireless transceiver circuit with the authentication apparatus 2. The wireless transceiver circuit 16 for mobile telephone and the wireless communication wireless transceiver circuit perform wireless communication processings, for example, in different radio frequency bands, respectively. In this case, the mobile telephone 1 may include a plurality of antennas corresponding to the respective different wireless communication bands. The alarm output device 19 may be either a built-in device which is located in the mobile telephone 1 or an external device external of the mobile telephone 1. The function of the alarm output device 19 is not limited to output of an alarm by light emission using an LED or the like but to output an alarm message of an alarm sound or a speech-synthesized voice, or an alarm signal. The alarm output device 19 may be further configured to perform a predetermined control processing such as limitation of the functions of an electronic apparatus such as the mobile telephone 1.

The controller 10 of the mobile telephone 1 is constituted by, for example, a microcomputer, and is configured to include a CPU 11, a ROM 12, a RAM 13, and a timer circuit 14. These constituent elements 11 to 14 are connected to one another via a bus 10B. The CPU 11 serves as a main controller that performs a communication control processing which will be described in detail later. The CPU 11 is configured to include a communication controller 11a that controls a mobile telephone function of the mobile telephone 1 and that controls the wireless communication with the authentication apparatus 2, a distance detector 11a that includes a distance detection function of detecting a distance between the mobile telephone 1 and the authentication apparatus 2, an authentication unit 11b that includes an authentication function of authenticating the authentication apparatus 2, and an encryption unit 11c that encrypts a telegram signal in a procedure of the wireless communication with the authentication apparatus 2 and that decodes the encrypted telegram signal. The ROM 12 stores therein programs and authentication ID data for executing each of functional processings performed by the respective constituent elements 11a to 11d of the CPU 11. The RAM 13 is employed as a temporary memory serving as a working memory of the CPU 11. The timer circuit 14 includes a timer for time management of transmission and receiving of telegram signals, and outputs a predetermined clock time (timer time) in a communication control processing to the CPU 11.

Referring further to FIG. 1, the authentication apparatus 2 is configured to include a controller 20 that controls entire operations performed by the authentication apparatus 2 (in particular, operations performed by a wireless transceiver circuit 26 and an interface 27), an antenna 25 for receiving a wireless signal from the mobile telephone 1 and transmitting a wireless signal to the mobile telephone 1, the wireless transceiver circuit 26 for being in the wireless communication with the mobile telephone 1 using the antenna 25, and the interface 27 that performs a processing for an interface with an alarm output device 29. Moreover, the alarm output device 29 that outputs an alarm via the interface 27 is connected to the unauthenticated apparatus 2. The alarm output device 29 may be either a built-in device which is located in the unauthenticated apparatus 2 or an external device external of the unauthenticated apparatus 2. The function of the alarm output device 29 is not limited to output of an alarm by light emission using an LED or the like, but to output an alarm message of an alarm sound or a speech-synthesized voice, or an alarm signal.

The controller 20 of the authentication apparatus 2 is constituted by, for example, a microcomputer, and is configured to include a CPU 21, a ROM 22, a RAM 23, and a timer circuit 24. These constituent elements 21 to 24 are connected to one another via a bus 20B. The CPU 21 serves as a main controller that performs a communication control processing which will be described in detail later. The CPU 21 is configured to include a communication controller 21a that controls the wireless communication with the mobile telephone 1, a distance detector 21a that includes a distance detection function of detecting the distance between the mobile telephone 1 and the authentication apparatus 2, an authentication unit 21b that includes an authentication function of authenticating the mobile telephone 1, and an encryption unit 21c that encrypts a telegram signal in a procedure of the wireless communication with the mobile telephone 1 and that decodes the encrypted telegram signal. The ROM 22 stores therein programs and authentication ID data for executing each of functional processings performed by the respective constituent elements 21a to 21d of the CPU 21. The RAM 23 is employed as a temporary memory serving as a working memory of the CPU 21. The timer circuit 24 includes a timer for time management of transmission and receiving of telegram signals, and outputs a predetermined clock time in a communication control processing to the CPU 21.

The wireless device monitoring system according to the present embodiment is an example of a monitoring system for preventing loss or theft of the mobile telephone 1. The mobile telephone 1 and the authentication apparatus 2 are supposed to be originally owned by a user himself or herself. However, if the mobile telephone 1 and the authentication apparatus 2 are unable to authenticate each other or are apart from each other by a predetermined distance, each of the mobile telephone 1 and the authentication apparatus 2 outputs an alarm or an alarm signal or to be specific, rings a buzzer or performs a predetermined control processing such as limitation of the functions of the mobile telephone 1. If this alarm signal is output, the mobile telephone 1 cannot only display an alarm light and output the alarm sound but also stop functions of displaying and using an address book of the mobile telephone 1, a noncontact IC card function (e.g., money cashing function using an IC card such as FeliCa (Registered Trademark)), and a communication function. In addition, the authentication apparatus 2 displays an alarm light or outputs an alarm sound ("rings a buzzer"), and performs a predetermined control processing such as limitation of the functions of the mobile telephone 1. A processing for outputting the alarm signal performed by each of the apparatuses 1 and 2 is referred to as "alarm processing"

The authentication apparatus 2 is an apparatus built in a security authentication key such as a key holder-type key or a card type key, and is to be always carried by the user of the mobile telephone 1. The authentication apparatus 2 notifies the user that the mobile telephone 1 is away from the user's body by making the alarm output device 29 to output the alarm. It is thereby possible to prevent loss or theft of the mobile telephone 1.

Each of the wireless transceiver circuits 16 and 26 for use in the present embodiment is constituted by a wireless communication circuit in a low electric power radio band, e.g., 400 MHz band, and performs signal processings such as transmission and receiving of wireless signals, frequency conversion, amplification of intermediate frequency, modulation, and demodulation. RSSI signals (Received Signal Strength Indicator Signals; where each of the RSSI signals is a signal indicating an electric field strength (a received electric power level) of a received wireless signal) generated by AGC circuits (or envelope-amplitude detection circuits) in intermediate-frequency amplifiers included in the respective wireless transceiver circuits 16 and 26 are inputted to the distance detectors 11b and 21b included in the CPUs 11 and 21. As described later in detail, the distance detectors 11b and 21b detect the apparatus distance between the mobile telephone 1 and the authentication apparatus 2 using characteristics of the relative received electric power level to the distance shown in FIG. 5. If the detected distance corresponds to an RSSI signal level which is higher than a predetermined judgment threshold value (e.g., the RSSI signal level Lth corresponding to the apparatus distance of 2 meters), each of the distance detectors 11b and 21b determines that the apparatus distance is within a predetermined distance (e.g., within 2 meters).

Moreover, the authentication units 11c and 21c of the respective CPUs 11 and 21 judge that—authentication is completed—when the authentication ID data included in demodulated data demodulated by the wireless transceiver circuits 16 and 26 are compared with corresponding authentication ID data stored in the ROMs 12 and 22 in advance, and these authentication ID data coincide with each other. In the embodiments which will be described later, if the authentication ID data is divided into, for example, eight data items, the authentication units 11c and 21c of the respective CPUs 11 and 21 judge that—authentication of divided items is completed—when divided items of authentication ID data included in the demodulated data demodulated by the wireless transceiver circuits 16 and 26 are compared with corresponding divided items of authentication ID data stored in the ROMs 12 and 22 in advance, and these authentication ID data coincide. Moreover, in the embodiments which will be described later, if the continuous authentication is performed using divided challenge telegrams, the authentication units 11c and 21c of the respective CPUs 11 and 21 judge that—authentication of divided telegrams is completed—when divided challenge telegrams included in the demodulated data demodulated by the wireless transceiver circuits 16 and 26 are compared with corresponding divided challenge telegrams stored in the ROMs 12 and 22 in advance, and these divided challenge telegrams coincide.

In the present embodiment, if the distance detectors 11b and 21b of the respective CPUs 11 and 21 determine that the apparatus distance between the mobile telephone 1 and the authentication apparatus 2 is within the predetermined distance and both of the mobile telephone 1 and the authentication apparatus determine that the authentication data coincide, the mobile telephone 1 stops outputting the alarm. Concretely, the mobile telephone 1 releases the limitation of the functions of the mobile telephone 1 (i.e., the stop of the function of displaying and using the address book of the mobile telephone 1, the noncontact IC card function (e.g., the money cashing function using an IC card such as FeliCa (Registered Trademark)), and the communication function).

In addition, the authentication apparatus 2 stops outputting an alarm. If it is detected that the apparatus distance is equal to or longer than the predetermined distance or both of the mobile telephone 1 and the authentication apparatus determine that the authentication data do not coincide, the apparatuses 1 and 2 output alarm signals for the limitation of the functions and the buzzer operation or the predetermined control processing such as the limitation of the functions of the mobile telephone 1 is performed.

In the present embodiment, an encrypted communication may be done so as to increase the authentication security strength in the wireless communication with the counterpart apparatus 1 or 2. In this case, each of the encryption units 11$d$ and 21$d$ of the respective CPUs 11 and 21 encrypts a telegram signal to be transmitted using a predetermined encryption key and transmits the encrypted telegram signal. In addition, each of the encryption units 11$d$ and 21$d$ of the respective CPUs 11 and 21 receives the telegram signal after decoding the received telegram signal using a predetermined decoding key, and outputs the decoded telegram signal. If the authentication ID data after being decoded does not coincide with the authentication ID data stored in each of the ROMs 11 and 22, the alarm or the alarm signal is output. In this case, the key-based encrypted communication system, for example, needs to be in a plurality of communications such as transmission of key data, transmission of challenge data, and receiving of response data, so that communication time tends to be long. Due to this, the battery consumption is high. The embodiments according to the present invention are characterized in that the battery consumption at this time can be remarkably reduced. A method of reducing the power consumption of each of the apparatuses 1 and 2 will now be described.

FIG. 2 is a timing chart showing a procedure of the communication between the mobile telephone 1 and the authentication apparatus 2 shown in FIG. 1. As shown in FIG. 2, a method of mutual wireless communication between the apparatuses 1 and 2 is adopted. In this case, the synchronous communications are performed for synchronizing the timings so that, at a timing when one of the apparatuses transmits data transmits a signal, another of the apparatuses receive the same signal. In FIG. 2, transmitted data or received data is shown in a form of a band having a width generally depending on a data length.

Referring to FIG. 2, the authentication apparatus 2 intermittently and periodically (regularly) transmits a predetermined telegram signal in a predetermined period, and the mobile telephone 1 receives the telegram signal in synchronous with the transmission timing. Subsequently, the mobile telephone 1 transmits a predetermined response telegram signal and the authentication apparatus 2 receives the response telegram signal in synchronous with transmission of the response telegram signal. In this way, one roundtrip wireless communication is done. It is to be noted that the wireless transceiver circuits 16 and 26 need to be in communication with transmission or receiving timing temporally accurately synchronized with receiving or transmission timing. The synchronous timing processing is performed using timing signals counted by timer circuits 14 and 24 that count the time using crystal oscillators, respectively.

The present embodiment is characterized by separately being in a communication for detecting a distance to the counterpart apparatus and a communication for authenticating an ID of the counterpart apparatus so as to reduce the power consumption. As shown in FIG. 2, a distance detection communication (31 of FIGS. 2 and 42 of FIG. 3) is executed at intervals of T1=2 seconds whereas an authentication communication (32 of FIGS. 2 and 41 of FIG. 3) is executed at intervals of T2=30 seconds.

FIG. 3 is an enlarged view of the part 31 of the communication procedure shown in FIG. 2. FIG. 4 is an enlarged view of the part 32 of the communication procedure shown in FIG. 2. In the distance detection communication 42 shown in FIG. 3, it is detected that the distance to the counterpart apparatus is within a predetermined range by measuring the RSSI signal level which is the electric field intensity level of the received signal. Concretely, the distance detection communication is executed by making the authentication apparatus 2 to receive a distance detection telegram signal D2 from the mobile telephone 1 after transmitting a distance detection telegram signal D1. The time required for one distance detection communication is a time interval T11=2 milliseconds. In the authentication communication 41 shown in FIG. 4, a key-based encrypted communication is done using authentication ID data, it is judged whether or not a communication counterpart apparatus is a true counterpart apparatus, and the validity of the counterpart apparatus is authenticated If the judgment result is YES. Concretely, the authentication apparatus 2 transmits a challenge request telegram signal to the mobile telephone 1, receives a challenge telegram signal from the mobile telephone 1, transmits a response telegram signal including authentication ID data to the mobile telephone 1 in response to the challenge telegram signal, and receives a response acknowledgment telegram signal including authentication ID data from the mobile telephone 1. The time required for two roundtrip communications is a time interval T12=40 milliseconds.

FIG. 5 is a graph showing relative received electric power with respect to distance in a wireless communication of the wireless device monitoring system shown in FIG. 1. As well known, in the wireless communication in free space without obstacles, a received signal level generally attenuates inversely proportionally to the square of the distance between the apparatuses. As shown in FIG. 5, if the distance becomes ten times of the original distance, the relative received electric power level decreases by 20 dB. Accordingly, by measuring a received level (or the RSSI signal level proportional to the received level in the present embodiment) of the wireless signal, the distance to the counterpart apparatus 1 or 2 can be detected.

In the present embodiment, the distance detection communication shown in FIG. 3 is one roundtrip communication at intervals of two seconds. Transmission time and receiving time in the roundtrip communication are as short as 1 millisecond and roundtrip communication time is 2 milliseconds. This is because the received level based on the RSSI signal can be detected in a short time. In the authentication communication 41 for ID authentication of the counterpart apparatus 1 or 2, the key-based encrypted communication is done, and the number of encrypted data bits is 64. Further, two-roundtrip communications including wireless communication of the challenge telegram signal and the response telegram signal are done, and the two-roundtrip communications correspond to a wireless communication of a total of 40 milliseconds. The above-stated wireless communication enables reduction of the power consumption of each of the apparatuses 1 and 2 to one-eighth as compared with the authentication communication at intervals of 2 milliseconds according to the prior art.

Figure 6:
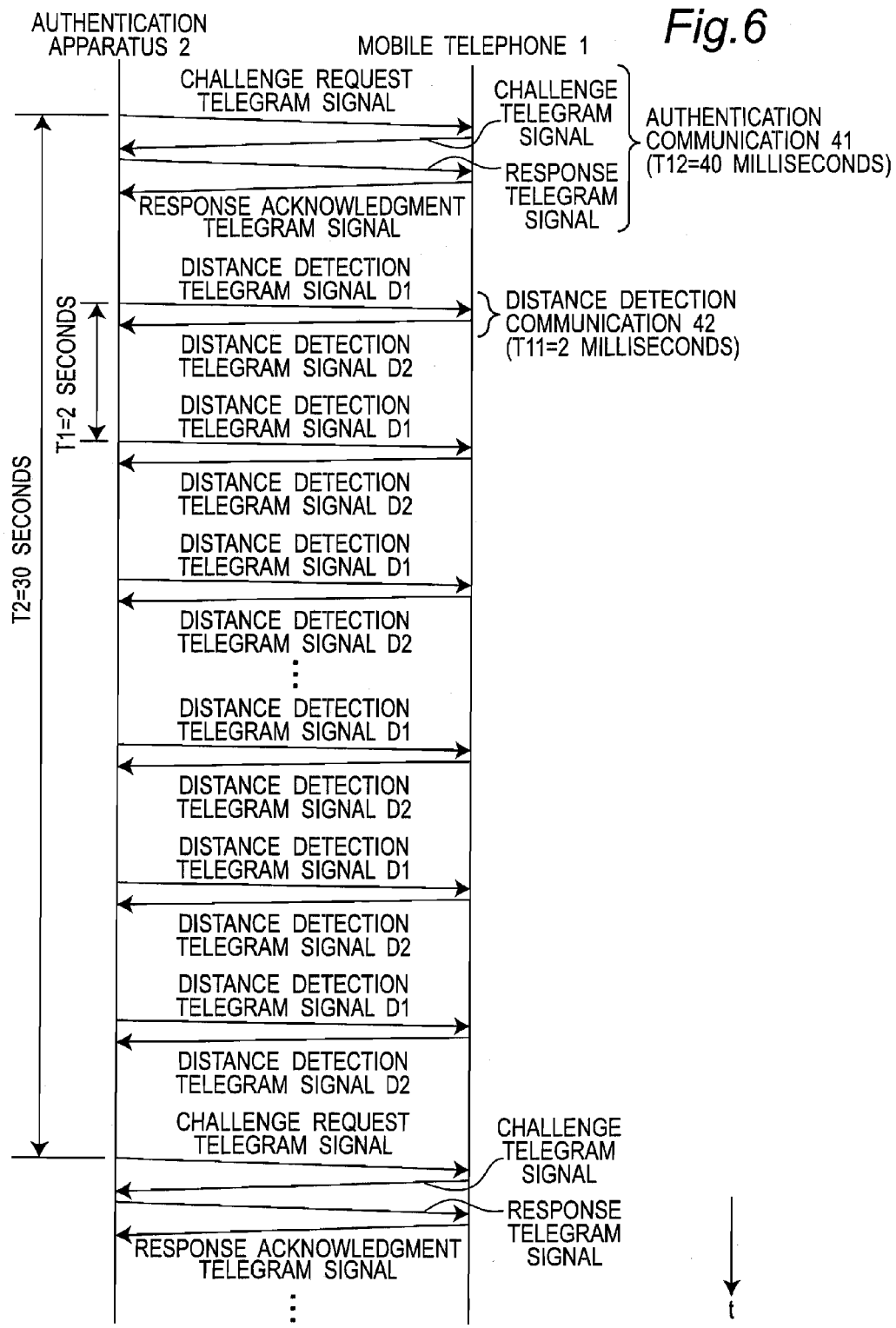
FIG. 6 is a sequence diagram showing a procedure of the communication between the mobile telephone 1 and the authentication apparatus 2 shown in FIG. 2.

FIG. 6 is a sequence diagram showing a procedure of the communication between the mobile telephone 1 and the authentication apparatus 2 shown in FIG. 2. Referring to FIG. 6, two roundtrip authentication communications 41 are done at intervals of T2=30 seconds. In a first authentication communication 41, the authentication apparatus 2 transmits a challenge request telegram signal, and the mobile telephone 1 transmits a challenge telegram signal in response to the challenge request telegram signal. In this case, a challenge telegram included in the challenge telegram signal is a telegram including authentication data that is arbitrary random-number data generated by the encryption unit 11d of the mobile telephone 1, and the generated authentication data is temporarily stored in the RAM 13. Next, the authentication apparatus 2 that receives the challenge telegram signal encrypts the authentication data that is the random-number data based on a preset encryption key, and transmits a response telegram signal including the encrypted authentication data to the mobile telephone 1. It is noted that the authentication data is stored in the RAM 23. Further, in response to the response telegram signal from the authentication apparatus 2, the mobile telephone 1 decodes the encrypted authentication data in the received response telegram signal, and transmits a response acknowledgment telegram signal including encrypted authentication data to the authentication apparatus 2 when the decoded authentication data coincides with the authentication data that is the original random-number data transmitted previously and that is stored in the RAM 13. In response to this, the authentication apparatus 2 decodes the encrypted authentication data included in the response acknowledgment telegram signal and judges again whether or not the decoded authentication data coincides with the original authentication data (stored in the RAM 23). Through a series of authentication communication 41, the apparatuses 1 and 2 authenticate each other.

Moreover, referring to FIG. 6, after the authentication communication 41, one roundtrip distance detection communication 42 is executed at time intervals of T1=2 seconds after two second stop. In the distance detection communication 42, the authentication apparatus 2 transmits a distance detection telegram signal D1, and the mobile telephone 1 receives the distance detection telegram signal D1 in response to this and, at this moment, measures the received level of the signal, i.e., the RSSI signal level. The mobile telephone 1 detects the distance to the counterpart authentication apparatus 2 based on this RSSI signal level, e.g., referring to the graph of FIG. 5. The mobile telephone 1 transmits a distance detection telegram signal D2 to the authentication apparatus 2. In response to this, the authentication apparatus 2 receives the distance detection telegram signal D2, and measures the received level of the distance detection telegram signal D2, i.e., the RSSI signal level, and then this makes it possible to detect the distance to the mobile telephone 1. Such communication results in detecting the distance to the counterpart apparatus 1 or 2. This distance detection communication 42 is executed, for example, fourteen times for a time interval T2=30 seconds. It is thereby possible to almost always monitor whether or not the apparatuses 1 and 2 are not away from each other by a predetermined distance (e.g. 2 meters) or longer.

The communication procedure shown in FIG. 6 will be summarized as follows. The authentication communication 41 for the required time T12=40 milliseconds is repeatedly executed at time intervals of T2=30 seconds. Following the authentication communication 41 executed, first of all, for the time interval of T2=30 seconds, a plurality of distance detection communications 42 each for the required time T11=2 milliseconds is executed at time intervals of T1=2 seconds.

Figure 7:
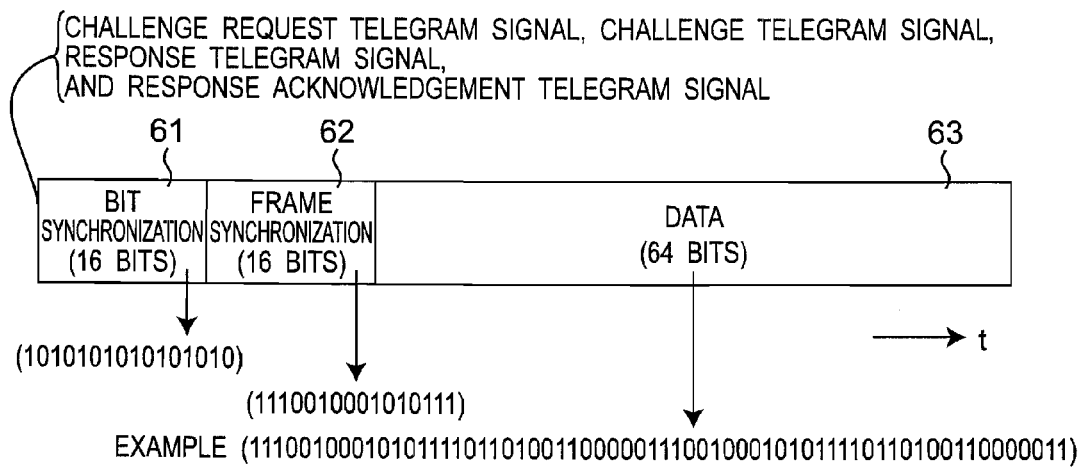
FIG. 7 is a diagram showing signal formats of a challenge request telegram request signal, a challenge telegram signal, a response telegram signal, and a response acknowledgment telegram signal as used in the procedure of the communication between the mobile telephone 1 and the authentication apparatus 2 shown in FIG. 2.
Figure 8:
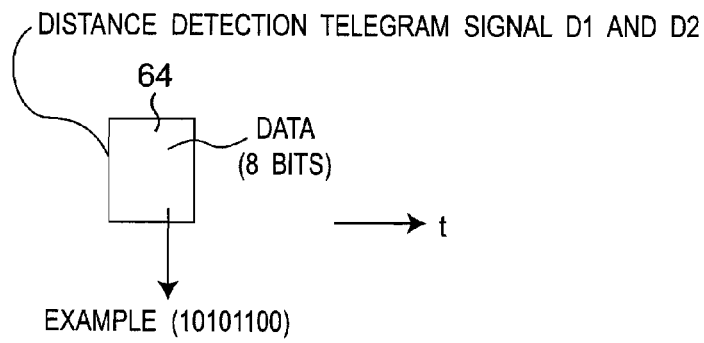
FIG. 8 is a diagram showing signal formats of distance detection telegram signals D1 and D2 as used in the procedure of the communication between the mobile telephone 1 and the authentication apparatus 2 shown in FIG. 2.

FIG. 7 is a diagram showing signal formats of the challenge request telegram request signal, the challenge telegram signal, the response telegram signal, and the response acknowledgment telegram signal as used in the procedure of the communication between the mobile telephone 1 and the authentication apparatus 2 shown in FIG. 2. FIG. 8 is a diagram showing signal formats of the distance detection telegram signals D1 and D2 as used in the procedure of the communication between the mobile telephone 1 and the authentication apparatus 2 shown in FIG. 2.

As shown in FIG. 8, each of the distance detection telegram signals D1 and D2 as used in the distance detection communication 42 for the required time T11=2 milliseconds has a relatively small telegram length configured by a data length of 8 bits. The electric field intensity level is detected using the RSSI signal detected based on an AGC voltage of an intermediate amplifier circuit (or on a detection signal from the envelope-amplitude detection circuit) of each of the wireless transceiver circuits 16 and 26. Therefore, the detection of the electric field intensity can be completed in quite a short time and transmission can be completed in a short time. A content of the telegram may be an arbitrary data string. It is to be noted that the receiver-side apparatus either may demodulate and receive or may not receive the content of the telegram of the distance detection telegram signal D1 or D2. On the other hand, as shown in FIG. 7, each of the challenge request telegram signal, the challenge telegram signal, the response telegram signal, and the response acknowledgment telegram signal as used in the authentication communication 41 for the required time T12=40 milliseconds has the same relatively large length of a telegram length of 96 bits. Each of these telegrams is constituted by data of bit synchronization 61, data of frame synchronization 62, and data 63. The data obtained by encrypting an ID code of the apparatus and the authentication data (authentication ID data) that is the random-number data, and the like are stored in the data 63. The data 63 including the encrypted data for correctly authenticating the counterpart apparatus 1 or 2 is constituted, in particular, by a relatively large bit length of 64 bits.

Figure 9:
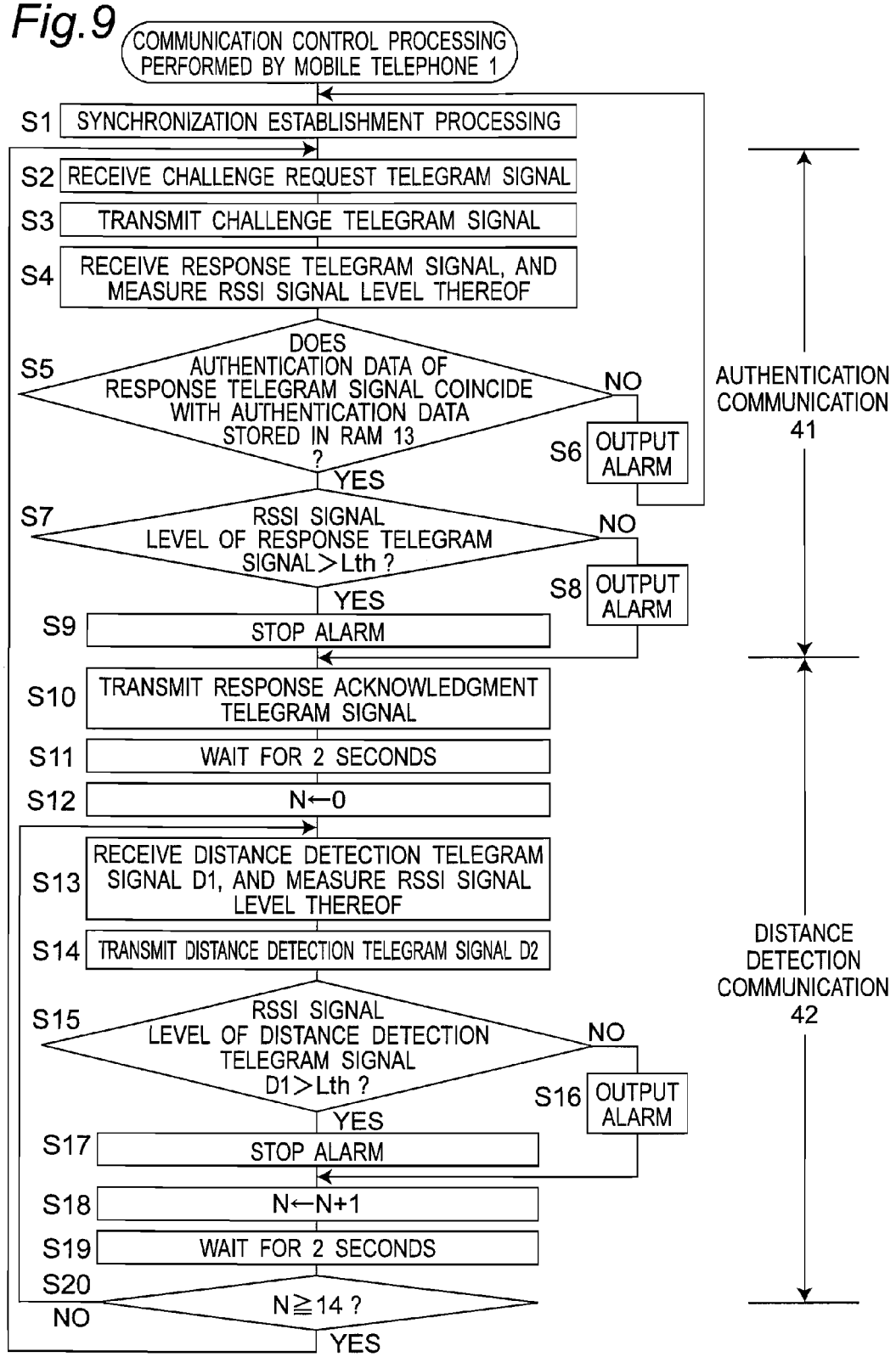
FIG. 9 is a flowchart showing a communication control processing performed by a controller 10 of the mobile telephone 1 according to the first embodiment.
Figure 10:
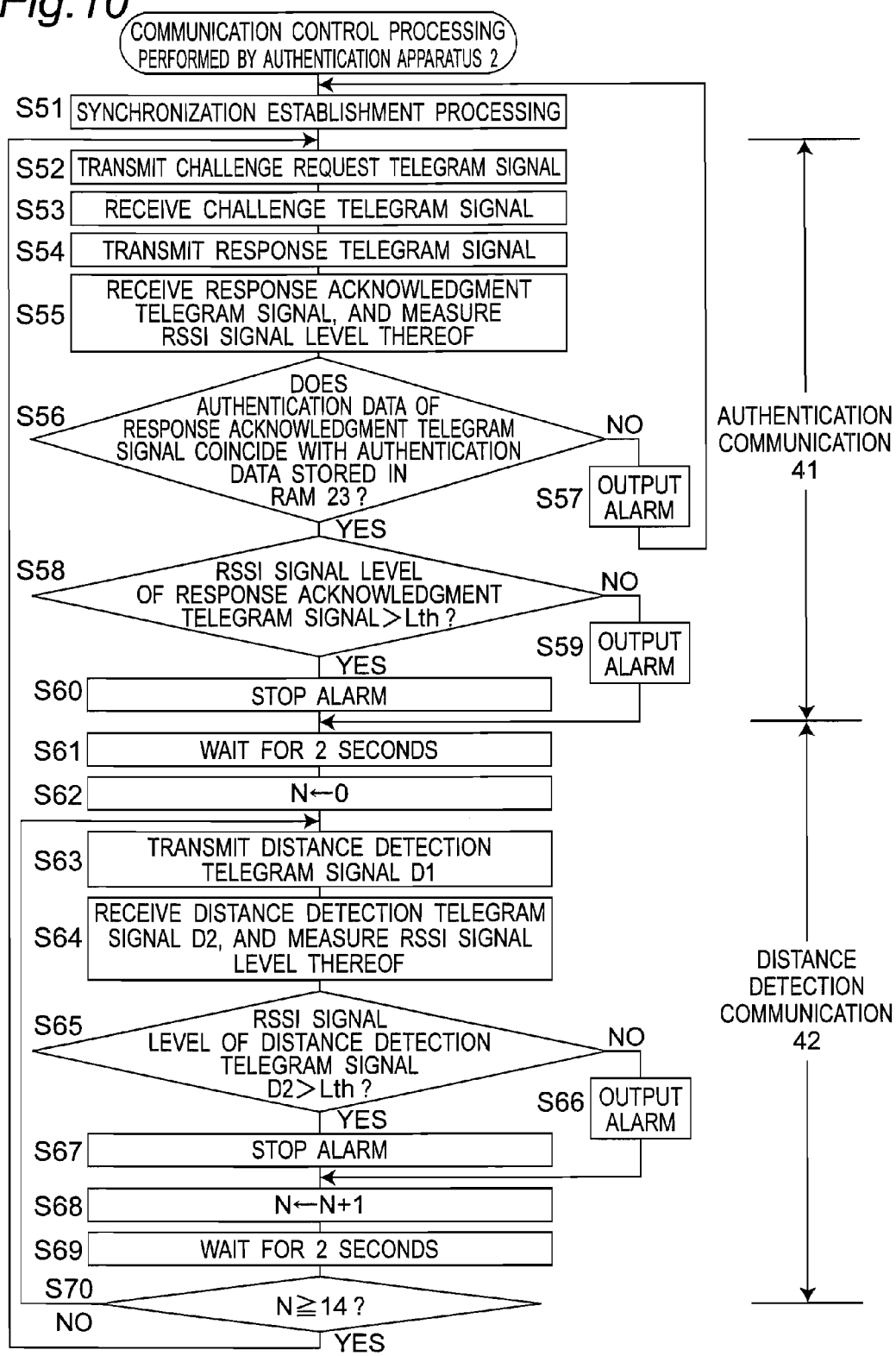
FIG. 10 is a flowchart showing a communication control processing performed by a controller 20 of the authentication apparatus 2 according to the first embodiment.

FIG. 9 is a flowchart showing a communication control processing performed by a controller 10 of the mobile telephone 1 according to the first embodiment. FIG. 10 is a flowchart showing a communication control processing performed by the controller 20 of the authentication apparatus 2 according to the first embodiment.

In the communication control processing performed by the mobile telephone 1 shown in FIG. 9, the mobile telephone 1 performs a synchronization establishment processing in step S1, receives a challenge request telegram signal in step S2, and transmits a challenge telegram signal in step S3. Next, in step S4, the mobile telephone 1 receives a response telegram signal, and measures the RSSI signal level thereof. In step S5, the mobile telephone 1 judges whether or not the authentication data of the response telegram signal coincides with the authentication data stored in the RAM 13. If the judgment result is YES, the processing goes to step S7. On the other hand, if NO, the processing goes to step S6. The mobile telephone 1 outputs an alarm in step S6, and the processing then returns to step S1. On the other hand, the mobile telephone 1 judges whether or not the RSSI signal level of the response telegram signal exceeds a predetermined threshold value Lth, to judge whether or not the distance to the authentication apparatus 2 exceeds a predetermined distance in step S7. If the judgment result is YES, the processing goes to step S9. On the other hand, if NO, the processing goes to step S8. The mobile telephone 1 outputs an alarm in step S8, and the processing then goes to step S10. The mobile telephone 1 stops the alarm in step S9, transmits a response acknowledgment telegram signal in step S10, waits for two seconds in step S11, and resets a parameter "n" to zero in step S12.

Furthermore, the mobile telephone 1 receives the distance detection telegram signal D1, and measures the RSSI signal level thereof in step S13. After transmitting the distance detection telegram signal D2 in step S14, the mobile telephone 1 judges whether or not the RSSI signal level of the distance detection telegram signal D1 exceeds the predetermined threshold value Lth, to judge whether or not the distance to the authentication apparatus 2 exceeds the predetermined distance in step S15. If the judgment result is YES, the processing goes to step S17. On the other hand, if NO, the processing goes to step S16. After the mobile telephone 1 outputs an alarm in step S16, the processing goes to step S18. On the other hand, the mobile telephone 1 stops the alarm in step S17, increments the parameter "n" by one in step S18, waits for two seconds in step S19, and judges whether or not the parameter "n" is equal to or larger than fourteen in step S20. If the judgment result of step S20 is YES, the processing returns to step S2. On the other hand, if NO, the processing returns to step S13.

In the communication control processing performed by the authentication apparatus 2 shown in FIG. 10, the authentication apparatus 2 performs a synchronization establishment processing in step S51, transmits the challenge request telegram signal in step S52, and receives the challenge telegram signal in step S53. Then, the authentication apparatus 2 transmits the response telegram signal in step S54, and then, receives the response acknowledgment telegram signal and measures the RSSI signal level thereof in step S55. Next, the authentication apparatus 2 judges whether or not the authentication data of the response acknowledgment telegram signal coincides with the authentication data stored in the RAM 23 in step S56. If the judgment result is YES, the processing goes to step S57. On the other hand, if NO, the processing goes to step S58. The authentication apparatus 2 outputs an alarm in step S57, and the processing then returns to step S51. On the other hand, the authentication apparatus 2 judges whether or not the RSSI signal level of the response acknowledgment telegram signal exceeds the predetermined threshold value Lth, to judge whether or not the distance to the mobile telephone 1 exceeds the predetermined distance in step S58. If the judgment result is YES, the processing goes to step S60. On the other hand, if NO, the processing goes to step S59. The authentication apparatus 2 stops the alarm in step S59, and the processing then goes to step S61. On the other hand, the authentication apparatus 2 stops outputting an alarm in step S60, waits for two seconds in step 61, and resets the parameter "n" to zero in step S62. Furthermore, the authentication apparatus 2 transmits the distance detection telegram signal D1 in step S63, and then, receives the distance detection telegram signal D2 and measures the RSSI signal level thereof in step S64. The authentication apparatus 2 judges whether or not the RSSI signal level of the distance detection telegram signal D2 exceeds the predetermined level Lth, to judge whether or not the distance to the authentication apparatus 2 exceeds the predetermined distance in step S65. If the judgment result is YES, the processing goes to step S67. On the other hand, if NO, the processing goes to step S66. After the authentication apparatus 2 outputs an alarm in step S66, the processing goes to step S68. The authentication apparatus 2 stops outputting an alarm in step S67, increments the parameter "n" by one in step S68, waits for two seconds in step S69, and judges whether or not the parameter "n" is equal to or larger than fourteen in step S70. If the judgment result is YES, the processing returns to step S52. On the other hand, if NO, the processing returns to step S63.

The communication control processings shown in FIGS. 9 and 10 will next be described in detail with describing the mutual processings between the apparatuses 1 and 2 consecutively.

When each of the apparatuses 1 and 2 executes the communication control processing, the synchronization establishment processing is first performed (steps S1 and S51). Synchronization means to make transmission and receiving timings of the respective wireless transceiver circuits 16 and 26 of the apparatuses 1 and 2 matched to each other, and the synchronization is made by matching timers included in the respective wireless transceiver circuits 16 and 26 to each other. As a synchronization method, an arbitrary method can be used such as the following method. The authentication apparatus 2 intermittently transmits a synchronization telegram and the mobile telephone 1 continuously receives the synchronization telegram for longer time than intermittent time of the synchronization telegram. Upon receiving the telegram signal from the authentication apparatus 2, the mobile telephone 1 instantly transmits a response telegram signal to the authentication apparatus 2. By making the apparatuses 1 and 2 to perform the mutual communication, the timers included in the respective wireless transceiver circuits 16 and 26 are synchronized. A frame synchronization pattern is used for timing judgment, and each included timer is started based on a timing when the frame synchronization pattern is detected.

When synchronization is established, the authentication communication 41 and the distance detection communication 42 are started. When the current is applied to the respective wireless transceiver circuits 16 and 26 during communication, no current is applied thereto in a resting phase in which no wireless communication is done so as to suppress current consumption. Even in the resting phase, the included timers operate. In the authentication communication 41, first, the authentication apparatus 2 transmits the challenge telegram signal to the mobile telephone 1 (step S52), and the mobile telephone 1 receives the challenge request telegram in response to this (step S2). As shown in FIG. 7, the challenge request telegram signal is constituted by a bit synchronization pattern (16 bits), a frame synchronization pattern (16 bits), and the data (64 bits).

Next, the mobile telephone 1 transmits the challenge telegram signal (step S3) and the authentication apparatus 2 receives the challenge telegram signal (step S53). A data length of the challenge telegram signal is that as shown in FIG. 7. The data of the challenge telegram signal is constituted by the random-number data (authentication data) generated by the encryption unit 11d. The authentication apparatus 2 transmits the response telegram signal (step S54), and the mobile telephone 1 receives the response telegram signal in response to this (step S4). The data of the response telegram signal is encrypted data obtained by converting the challenge telegram by a predetermined encryption key. The mobile telephone 1 judges whether or not the data of the received response telegram signal is true (step S5). Namely, the mobile telephone 1 decodes the authentication data of the response telegram signal using an inverse function of the predetermined encryption key (that is, a decoding key or description key). If the decoded authentication data coincides with the challenge telegram, the mobile telephone 1 may judge that the data of the received response telegram signal is true. Alternatively, if the challenge telegram is encrypted and the encrypted challenge telegram coincides with the response signal, the mobile telephone 1 may judge that the response signal is true. If the authentication data of the response telegram signal is true, the mobile telephone 1 transmits the response acknowledgment telegram signal (step S10) and the authentication apparatus 2 receives the response acknowledgment telegram signal (step S55), and this leads to that the authentication apparatus 2 judges that the mobile telephone 1 is a true counterpart apparatus. According to the above-stated successive operations, both of the authentication apparatus 2 and the mobile telephone 1 authenticate that the counterpart apparatuses 1 and 2 are true counterparts. The above-stated authentication procedure is generally used as the authentication method using the key-based encrypted communication, and DES (Data Encryption Standard) encryption and AES (Advanced Encryption Standard) encryption are known.

In the present embodiment, the authentication is performed using the encrypted communication. Alternatively, the authentication can be performed by making both of the apparatuses 1 and 2 to receive the ID data transmitted from the counterparts without using the encryption. In this case, the ID data of the authentication apparatus may be used in the response telegram and the ID data of the mobile telephone 1 may be used in the response acknowledgment telegram, and there is no need to use the challenge request telegram and the challenge telegram.

Meanwhile, when the mobile telephone 1 judges that the content of the received response telegram is not true (NO in step S5), the mobile telephone 1 outputs an alarm (step S6) and returns to the synchronization establishment processing (step S1). In this case, an arbitrary processing can be executed as the operation to be performed by the mobile telephone 1 when the mobile telephone 1 outputs the alarm. For example, a processing can be executed, which is to stop the functions of the mobile telephone 1 (i.e., the mobile telephone 1 is unusable by forbidding the input button) or to notify the user by ringing a buzzer, emitting a light from an LED lamp, calling or sending e-mail, or doing other things. On the other hand, the authentication apparatus 2 similarly judges that the content of the received response telegram is not true (NO in step S56), the authentication apparatus 2 outputs an alarm (step S57) and returns to the synchronization establishment processing (step S51). An arbitrary processing can be executed as an output processing of the alarm. For example, a processing for informing the user of the situation can be performed by ringing a buzzer, emitting a light from an LED lamp, or actuating a vibrator.

Moreover, when receiving the response telegram signal in step S4, the mobile telephone 1 measures the RSSI signal level proportional to the received electric field intensity level. Further, when receiving the response acknowledgment telegram signal in step S55, the authentication apparatus 2 measures the RSSI signal level proportional to the received electric field intensity level. If the RSSI signal level of the received telegram signal is equal to or smaller than the predetermined threshold value Lth (which is the threshold value when it can be confirmed that the received telegram signal has a sufficiently higher level than the noise level), each of the apparatuses 1 and 2 outputs an alarm as stated above (steps S8 and S59). Conversely, if the authentication is normally performed and the RSSI signal level proportional to the received electric field intensity level exceeds the threshold value Lth, each of the apparatuses 1 and 2 does not output an alarm but stops the alarm (steps S9 and S60).

Next, after waiting for two seconds (steps S11 and S61), each of the apparatuses 1 and 2 executes the processing of the distance detection communication 42 for measuring the distance to the counterpart apparatus 1 or 2 at intervals of two seconds, for example, fourteen times. In this case, in the distance detection communication 42, when the mobile telephone 1 receives the distance detection telegram signal D1 from the authentication apparatus 2 (step S13), the mobile telephone 1 measures the RSSI signal level proportional to the electric field intensity level. Thereafter, when receiving the distance detection telegram signal D2, the authentication apparatus 2 measures the RSSI signal level proportional to the electric field intensity level. If the measured RSSI signal levels are equal to or smaller than the threshold value level Lth, the apparatuses 1 and 2 output an alarm (steps S16 and S66).

In this case, the distance detection communication 42 is characterized in that the distance detection telegram signals D1 and D2 are quite short in telegram length. As shown in FIG. 8, each of the distance detection telegram signals D1 and D2 has a length of 8 bits, and this length is considerably smaller than a telegram length of 96 bits of the telegram signal as used in the authentication communication 41. The reason is as follows. Each of the apparatuses 1 and 2 can measure the received electric field intensity level in quite a short time using the RSSI signal level detected by the AGC circuit (or envelope-amplitude detection circuit) in the wireless transceiver circuit 16 or 26. Namely, because each of the apparatuses 1 and 2 detects the RSSI signal level at an intermediate frequency and operates at a higher frequency than the frequency of the detected data, response time is short. Moreover, the time interval T1 for confirming the distance to the counterpart apparatus is two seconds, and this time interval is shorter than the time interval T2=30 seconds of the authentication communication 41. Therefore, the reaction time when the apparatuses 1 and 2 are apart can be reduced and user-friendliness can be enhanced. Further, each of the apparatuses 1 and 2 holds the authentication communication 41 for every time interval T2=30 seconds, to identify that the communication counterpart is the true counterpart and ensuring security-related safety. In other words, it is thereby possible to avoid risk of continuous transmitted waves, malicious spoofing, and the like. Through the above-stated operations, the constitution of the present embodiment can remarkably reduce the power consumption without sacrificing security and user-friendliness. As compared with the instance of performing the authentication communication 41 at intervals of two seconds, the power consumption can be reduced to about one-eighth in the present embodiment.

Functions and advantages of the embodiment configured as stated above will now be described in detail. If it is to be monitored whether lost or theft of an information terminal device such as the mobile telephone 1 occurs, when the mobile telephone 1 is apart from the user, it is necessary to notify the user of the fact by ringing a buzzer or the like instantly. Further, it is necessary to instantly limit the functions of the mobile telephone 1. This is because it is difficult to search the mobile telephone 1 by ringing the buzzer when the mobile telephone 1 moves to a location farther away from the user. Namely, the immediacy is required, and the buzzer is designed to be rung within two seconds according to the present embodiment.

Next, it is necessary to avoid damage from "spoofing" by a malicious third party or erroneous recognition of a terminal with a different ID. In the present embodiment, the authentication communication 41 is done for every time interval of T2=30 seconds. As for the erroneous recognition of a terminal with a different ID, first of all, it can be prevented to a considerable degree by changing a channel available for every terminal device, setting communication synchronization timing different among terminal devices or doing other things. The erroneous recognition is less likely to occur. Nevertheless, the prevention measures are still incomplete, so that the authentication communication is done for every time interval of T2=30 seconds. It is thereby possible to ensure completely satisfactory security level practically. As for the spoofing, even if the malicious third party spoofs and transmits a signal at synchronization timing, it can be authenticated whether the terminal ID is true within 30 seconds. It is thereby possible to ensure completely satisfactory security level practically.

As stated so far, according to the present embodiment, as shown in FIGS. 2 to 4, the relationship between the communication time T12 for the authentication communication 41 for authenticating the authentication data (authentication ID data) and the communication time T11 for the distance detection communication is set to T11<T12 using the fact that the communication time T11 is far shorter than the communication time T12. In addition, the relationship between the communication interval T1 for the distance detection communication 42 and the communication interval T2 for the authentication communication 41 is set to T1<T2. It is thereby possible to remarkably reduce the power consumption.

When the transmitted data as used in the distance detection communication 42 may be kept unmodulated, a bit synchronization signal or a synchronization pattern for correcting a synchronization error between the wireless transceiver circuits 16 and 26 of the apparatuses 1 and 2 (that is, an arbitrary synchronization correction data pattern such as a frame synchronization signal) can be used. If the bit synchronization signal or the synchronization pattern is used, it is possible to continuously perform the intermittent communication with correcting the synchronization error between the wireless transceiver circuits 16 and 26. Moreover, the authentication data (authentication ID data) may be wirelessly transmitted and received without encrypting the authentication data using the key. In this case, the authentication can be performed by one roundtrip wireless communication, so that the communication time can be advantageously reduced.

In addition, in the present embodiment, the apparatuses 1 and 2 include the distance detectors 11b and 21b and the authentication units 11c and 21c, respectively. Alternatively, one of the apparatuses 1 and 2 may be configured to include the distance detector and the authentication unit. In this case, output of the alarm is executed only by the apparatus including the distance detector and the authentication unit, and this leads to that the circuit configuration can be simplified. In another alternative, both of the apparatuses 1 and 2 may include the distance detector or only one of the apparatuses 1 and 2 may be configured to output an alarm or an alarm signal. Further, both of the wireless transceiver circuits 16 and 26 include the transmission and receiving functions, respectively in the present embodiment. Alternatively, the wireless transceiver circuits 16 and 26 may be configured to include one of the transmission and receiving functions. In this case, the wireless communication becomes unidirectional communication, however, when the apparatuses 1 and 2 are apart from each other, it is possible to realize one of operations of instantly ringing a buzzer and limiting the functions of the apparatuses 1 and 2. The wireless communication circuits can be thereby simplified.

Moreover, in the present embodiment, the time intervals T1 and T2 of the respective communications 41 and 42 are fixed. However, the present invention is not limited to these. The time intervals T1 and T2 may be temporally changed at random or according to an arbitrary rule. If the time intervals T1 and T2 of the respective communications 41 and 42 are fixed, a communication failure such as crosstalk may possibly occur for relatively long time when the communication interval of the other apparatus in a similar system is overlapped with the time interval T1 or T2. By making the communication intervals variable, such a communication failure can be avoided. Further, each of the alarm output devices 19 and 29 may output an alarm instantly when it is detected that the distance to the counterpart apparatus 1 or 2 is long. Alternatively, each of the alarm output devices 19 and 29 may be configured to output an alarm after confirming that the distance is long continuously in a plurality of communications.

Moreover, in the present embodiment, the wireless device monitoring system including the mobile telephone 1 and the authentication apparatus 2 has been described. However, the present invention is not limited to this. The present invention is applicable to an arbitrary system, in which the mobile telephone 1 is an electronic apparatus that is a terminal device for other purposes, and in which the authentication apparatus 2 is a predetermined electronic apparatus that intermittently and continuously performs the distance detection and the ID authentication.

Furthermore, in the present embodiment, the radio frequency in the low-electric-power radio band of 400 MHz is used. Alternatively, an arbitrary radio band such as a weak radio frequency band of 300 MHz, a 900-MHz band or an ISM band can be used. Further, in the present embodiment, the wireless device monitoring system is configured to continuously monitor whether the counterpart apparatus is within the predetermined distance. Alternatively, the wireless device monitoring system may be configured as an authentication system that monitors the distance for only short time or authenticates the counterpart apparatus only once. Namely, transmission of wireless signals is not limited to regular or periodic transmission but may be intermittent transmission.

Moreover, the programs for the communication control processings included in the ROMs 12 and 22 of the respective controllers 10 and 20 in the present embodiment may be stored in a computer-readable recording medium (e.g., a CD-R, a DVD-R, a flash memory or a hard disk memory) and, if necessary, executed by being loaded to, for example, the ROMs 12 and 22 that are EEPROMs.

The above-stated modified embodiments of the first embodiment may be applied to the other subsequent embodiments if necessary.

Second Embodiment

Figure 11:
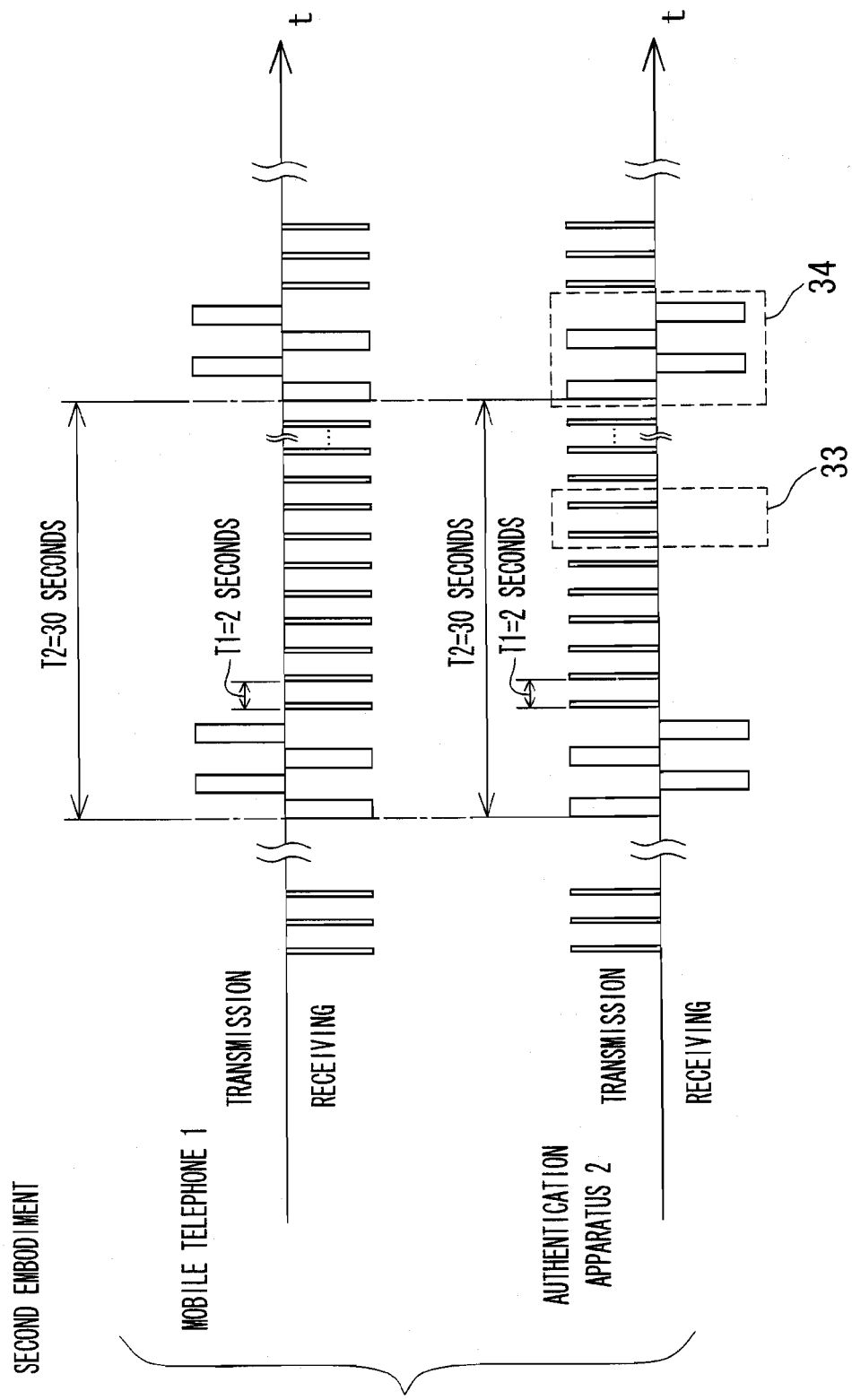
FIG. 11 is a timing chart showing a communication procedure between a mobile telephone 1 and an authentication apparatus 2 for use in a wireless device monitoring system according to a second embodiment of the present invention.
Figure 12:
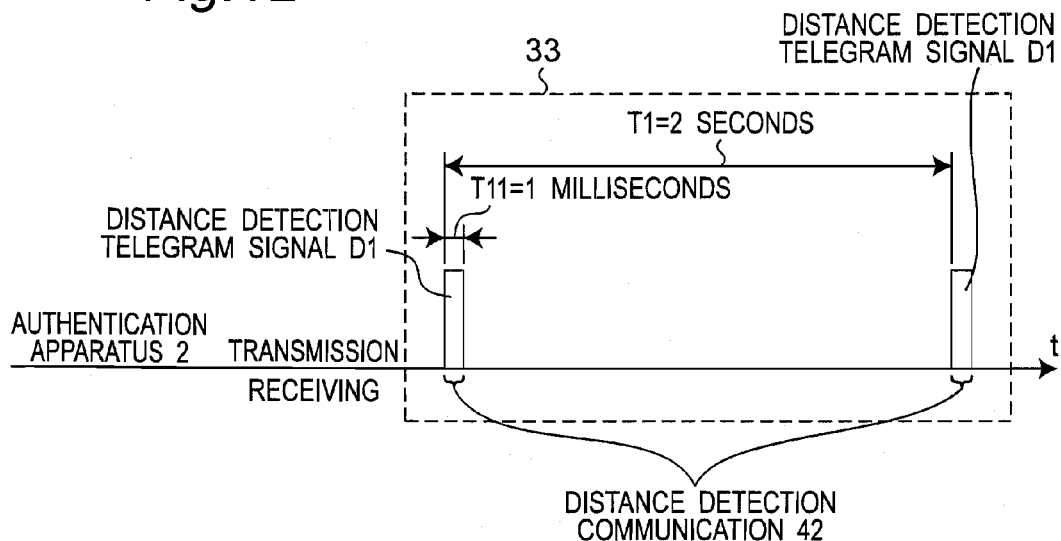
FIG. 12 is an enlarged view of a part 33 of the communication procedure shown in FIG. 11.
Figure 13:
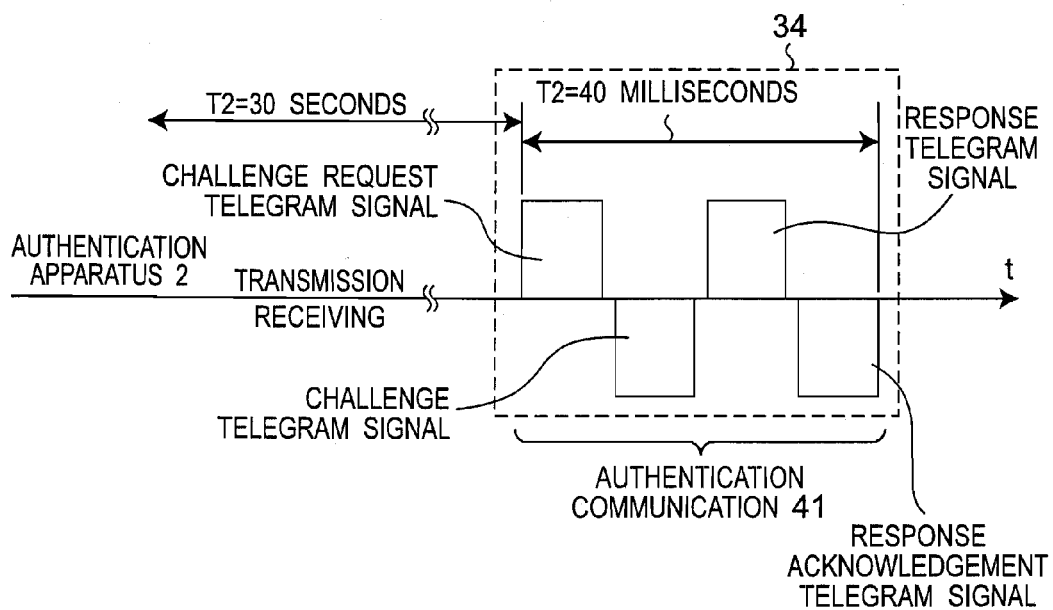
FIG. 13 is an enlarged view of a part 34 of the communication procedure shown in FIG. 11.
Figure 14:
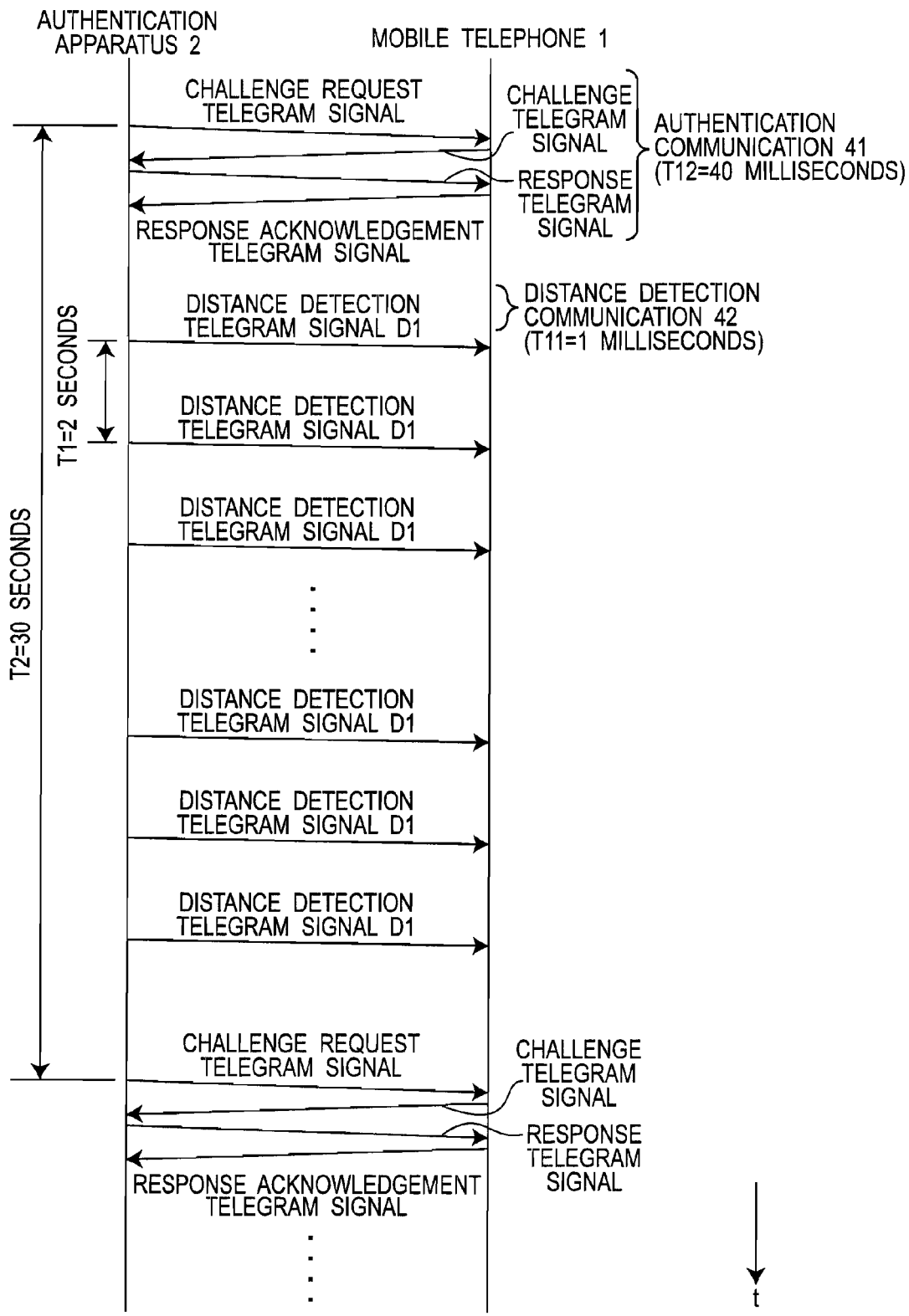
FIG. 14 is a sequence diagram showing a procedure of the communication between the mobile telephone 1 and the authentication apparatus 2 shown in FIG. 11.

FIG. 11 is a timing chart showing a communication procedure between a mobile telephone 1 and an authentication apparatus 2 for use in a wireless device monitoring system according to a second embodiment of the present invention. FIG. 12 is an enlarged view of a part 33 of the communication procedure shown in FIG. 11. FIG. 13 is an enlarged view of a part 34 of the communication procedure shown in FIG. 11. FIG. 14 is a sequence diagram showing a procedure of the communication between the mobile telephone 1 and the authentication apparatus 2 shown in FIG. 11.

The wireless device monitoring system according to the second embodiment is characterized as follows, as compared with the wireless device monitoring system according to the first embodiment. The wireless device monitoring system according to the second embodiment is similar in apparatus configuration to that shown in FIG. 1. The distance detection communication 42 repeated fourteen times intervals of T1=2 seconds is executed by the bidirectional communication according to the first embodiment. According to the second embodiment, the distance detection communication 42 is executed by a unidirectional communication from the authentication apparatus 2 to the mobile telephone 1. Namely, the authentication apparatus 2 transmits a distance detection telegram signal D1 at intervals of T1=2 seconds whereas the mobile telephone 1 does not transmit a distance detection telegram signal D2. It is thereby possible to further reduce the power consumptions of the authentication apparatus 2 and the mobile telephone 1.

Because the authentication communication 41 for every time interval of T2=30 seconds is done in a manner similar to that of the first embodiment, authentication certainty is equivalent to that according to the first embodiment. Then, the mobile telephone 1 always grasps the distance to the authentication apparatus 2. The mobile telephone 1 can thereby output an alarm instantly when the distance becomes long. Processings for limitation of functions of the mobile telephone 1 and the like can be thereby promptly performed. This is because it is necessary to execute processings for outputting an alarm, limiting the functions and the like in particular when the mobile telephone 1 is apart from a user. The power consumption of the distance detection operation can be reduced to about half of that according to the first embodiment.

Figure 15:
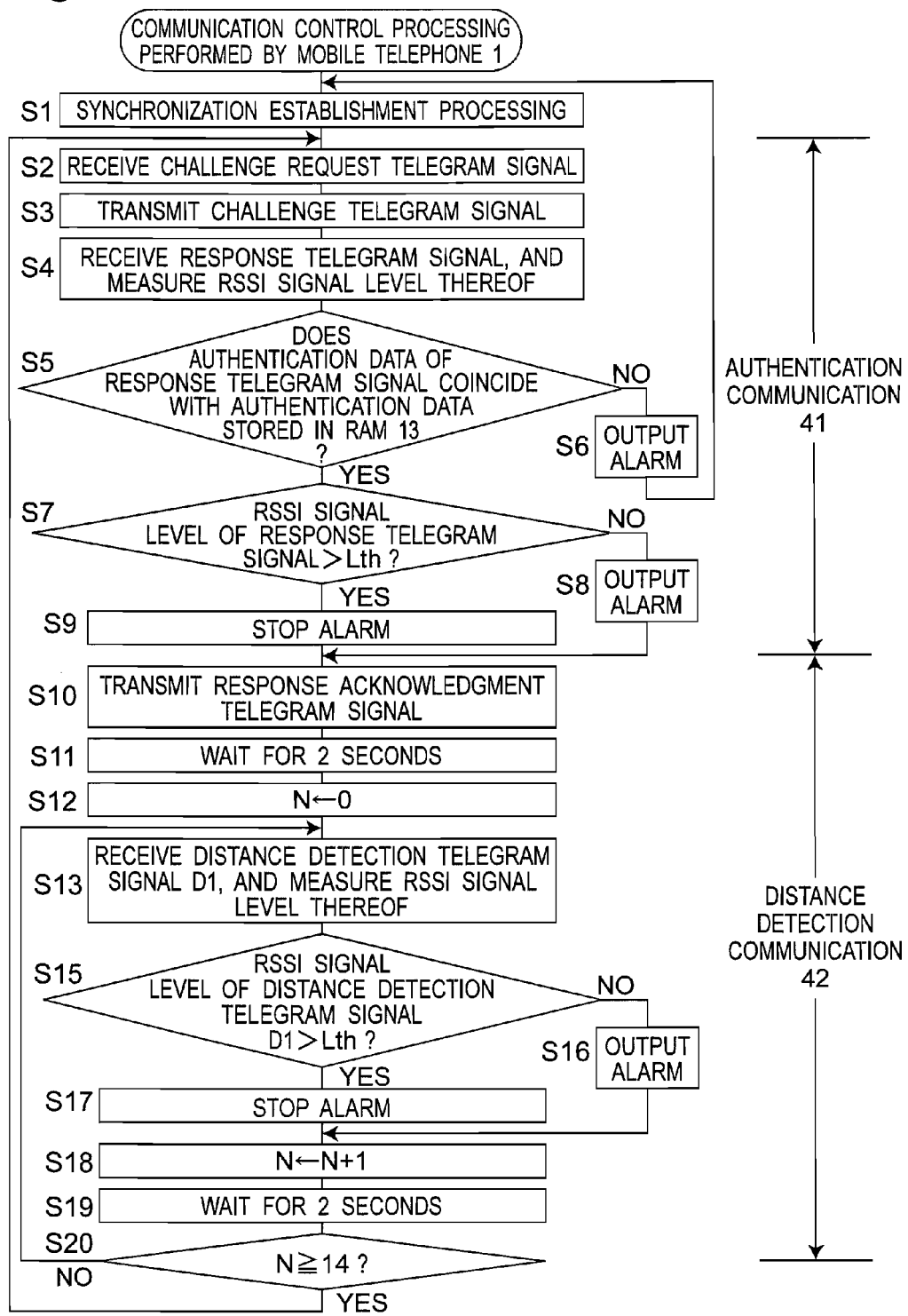
FIG. 15 is a flowchart showing a communication control processing performed by the controller 20 of the mobile telephone 1 according to the second embodiment.
Figure 16:
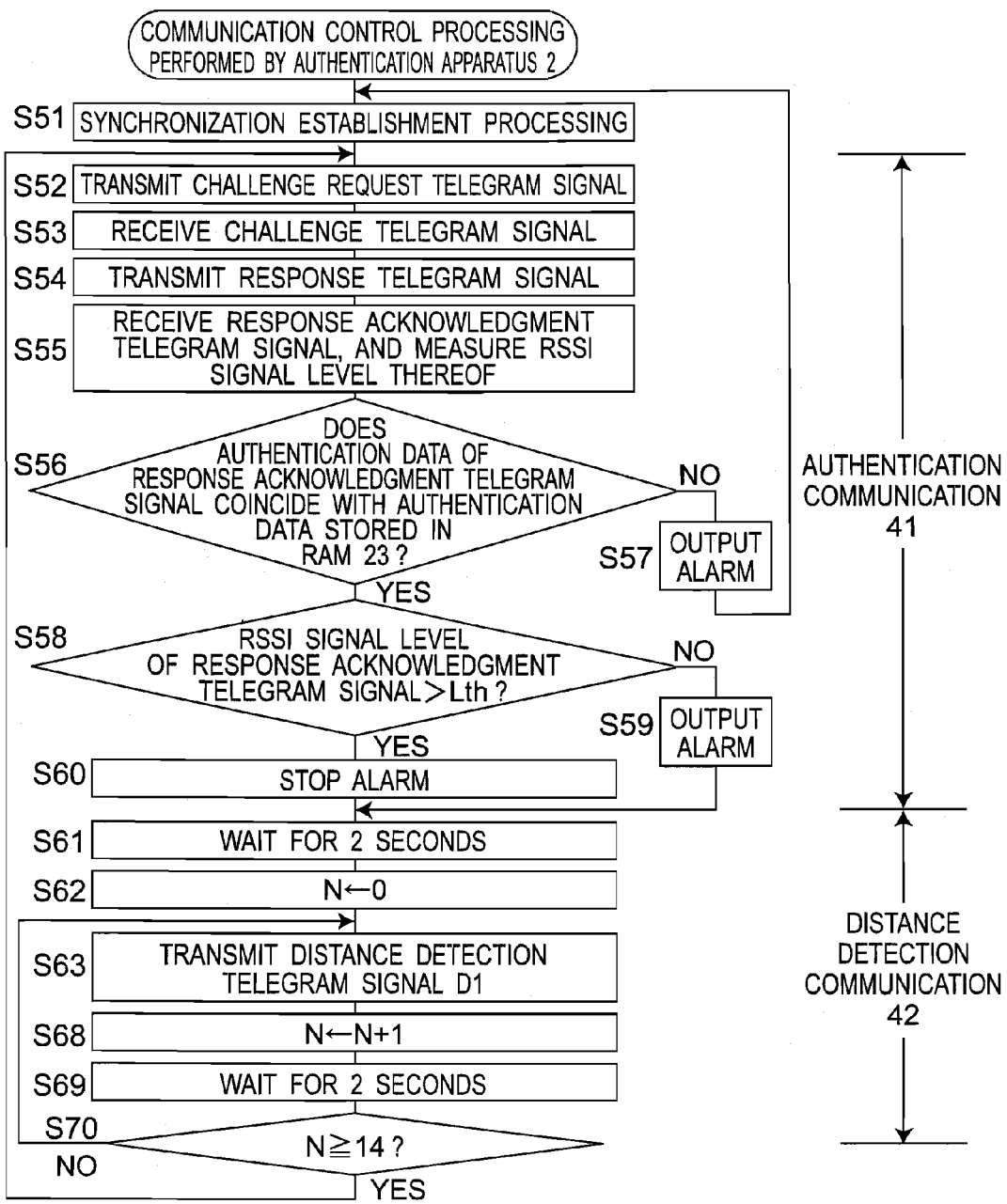
FIG. 16 is a flowchart showing a communication control processing performed by the controller 20 of the authentication apparatus 2 according to the second embodiment.

FIG. 15 is a flowchart showing a communication control processing performed by the controller 20 of the mobile telephone 1 according to the second embodiment. FIG. 16 is a flowchart showing a communication control processing performed by the controller 20 of the authentication apparatus 2 according to the second embodiment. The communication control processing performed by the mobile telephone 1 shown in FIG. 15 is characterized, as compared with the communication control processing shown in FIG. 9, by deleting the processing of step S14. The communication control processing performed by the authentication apparatus 2 shown in FIG. 16 is characterized, as compared with the communication control processing shown in FIG. 10, by deleting the processings of steps S64 to S67.

As stated so far, in the second embodiment, the distance detection telegram signal D1 is transmitted but the distance detection telegram signal D2 is not transmitted, as compared with the first embodiment. Only the distance detection telegram signal D1 enables attaining the object of outputting an alarm from the mobile telephone 1 and, for example, limiting the functions. Therefore, when the second embodiment can further reduce the power consumption as compared with the first embodiment, it is possible to ensure the necessary security function. In the present embodiment, the authentication communication is done by continuously performing from transmission of a challenge request telegram signal to receiving of a response acknowledgment telegram signal. Alternatively, the authentication communication can be done by inserting a distance detection communication 42 between the receiving of the challenge telegram signal and transmission of the response telegram signal shown in FIG. 13. In this alternative, it takes sixty seconds to complete the authentication communication. However, the first half communication using the challenge request telegram signal and the challenge telegram signal and the second half communication using the response telegram and the response acknowledgment can include authentication functions, respectively. Namely, because the challenge request telegram includes an identification code, the mobile telephone 1 can identify that the authentication apparatus 2 is located near the mobile telephone 1. After identification, the mobile telephone 1 transmits the challenge telegram. Therefore, by receiving the challenge telegram, the authentication apparatus 2 can recognize that the mobile telephone 1 is located near the authentication apparatus 2. In addition, in the both communications, it is possible to detect the distance and recognize that the counterpart apparatuses are within a predetermined distance. At this moment, the apparatuses 1 and 2 can authenticate each other to some extent. After 30 seconds, the communication is done using the response telegram and the response acknowledgment telegram, at this moment, the authentication is completed certainly. Accordingly, even if the distance detection communication 42 is inserted between the receiving of the challenge telegram signal and the transmission of the response telegram signal, authentication communication strength does no weaken so remarkably. Moreover, because the time required for the authentication communication can be reduced almost by half, the power consumption can be reduced.

Third Embodiment

Figure 17:
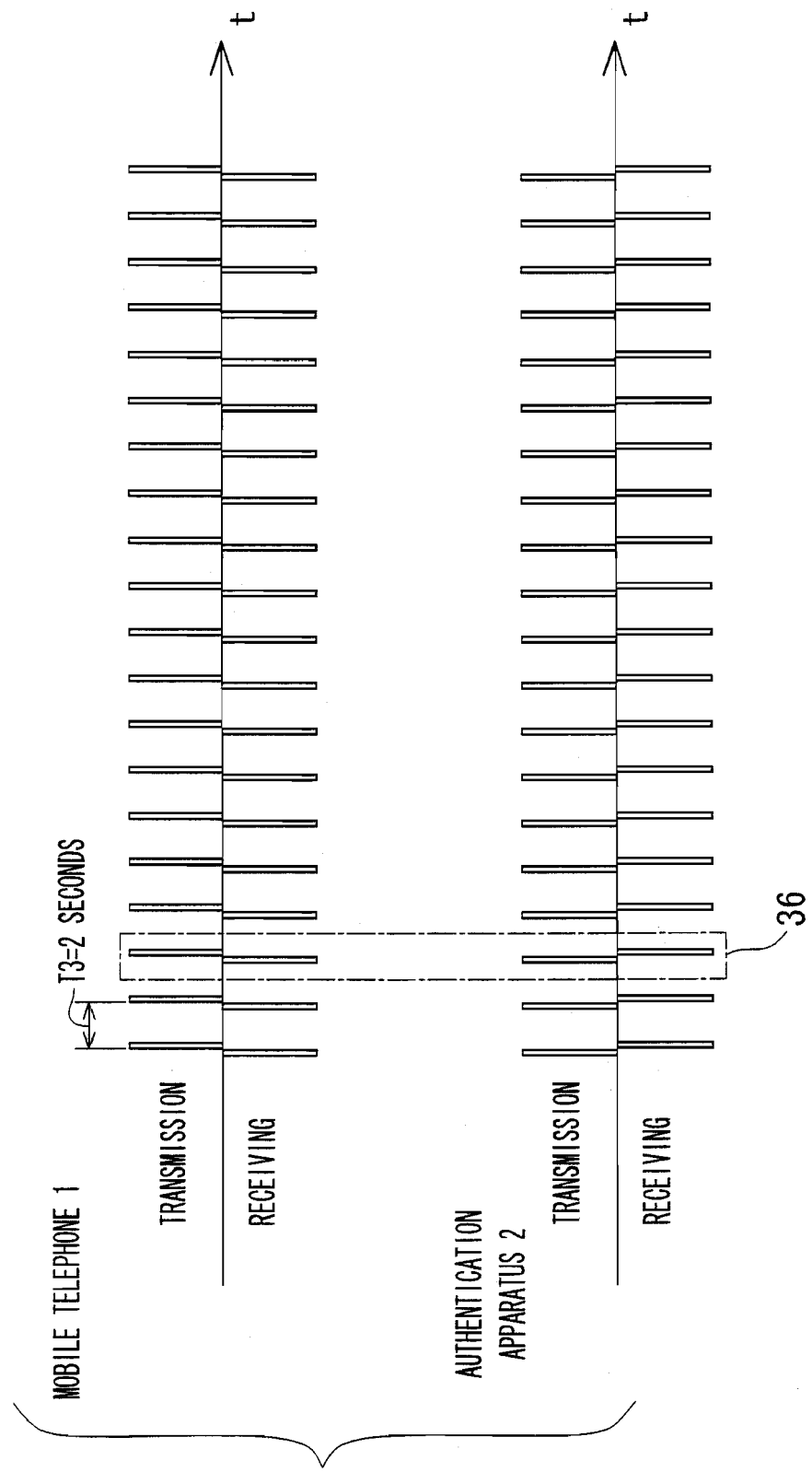
FIG. 17 is a timing chart showing a communication procedure between a mobile telephone 1 and an authentication apparatus 2 for use in a wireless device monitoring system according to a third embodiment of the present invention.
Figure 18:
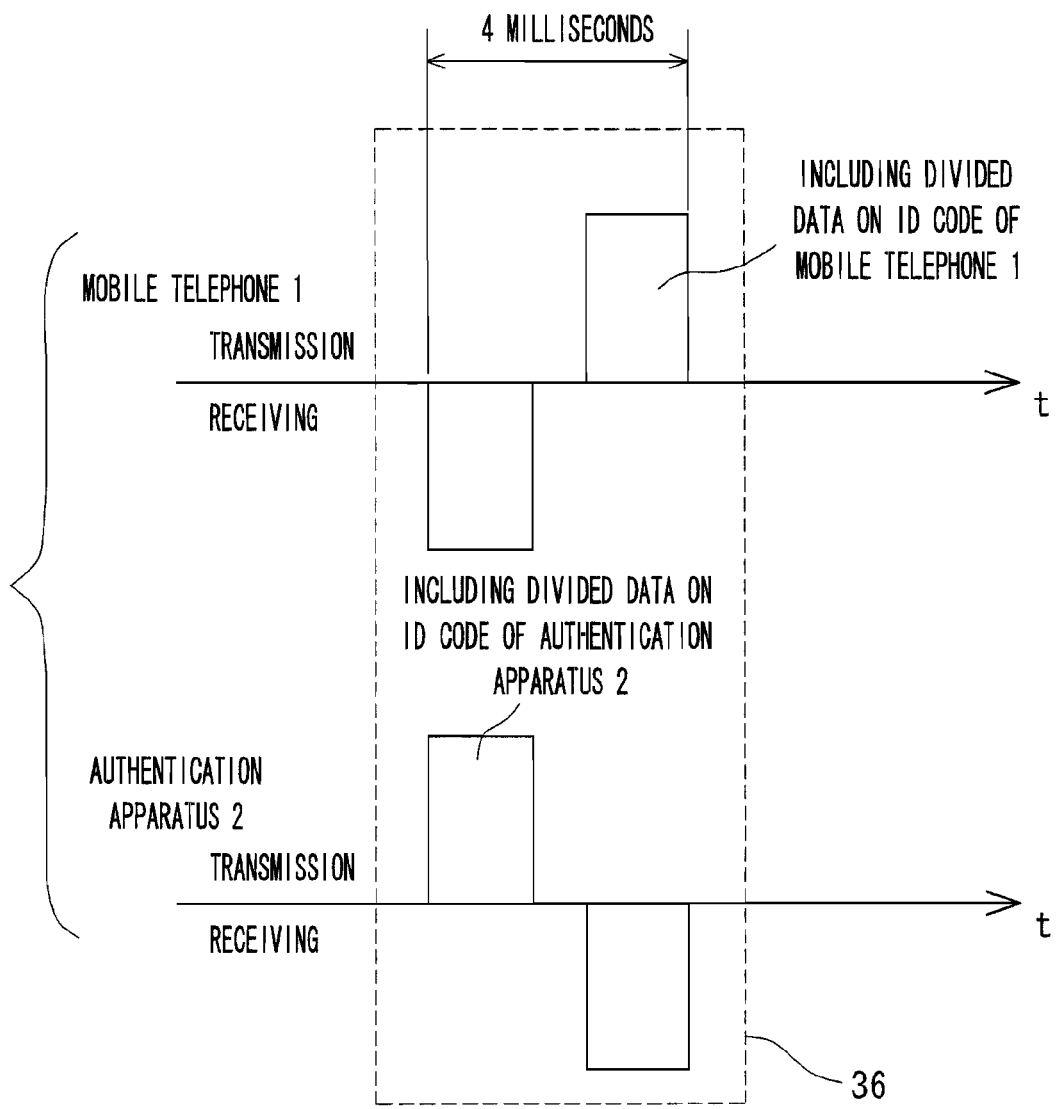
FIG. 18 is an enlarged view of a part 36 of the communication procedure shown in FIG. 17.
Figure 19:
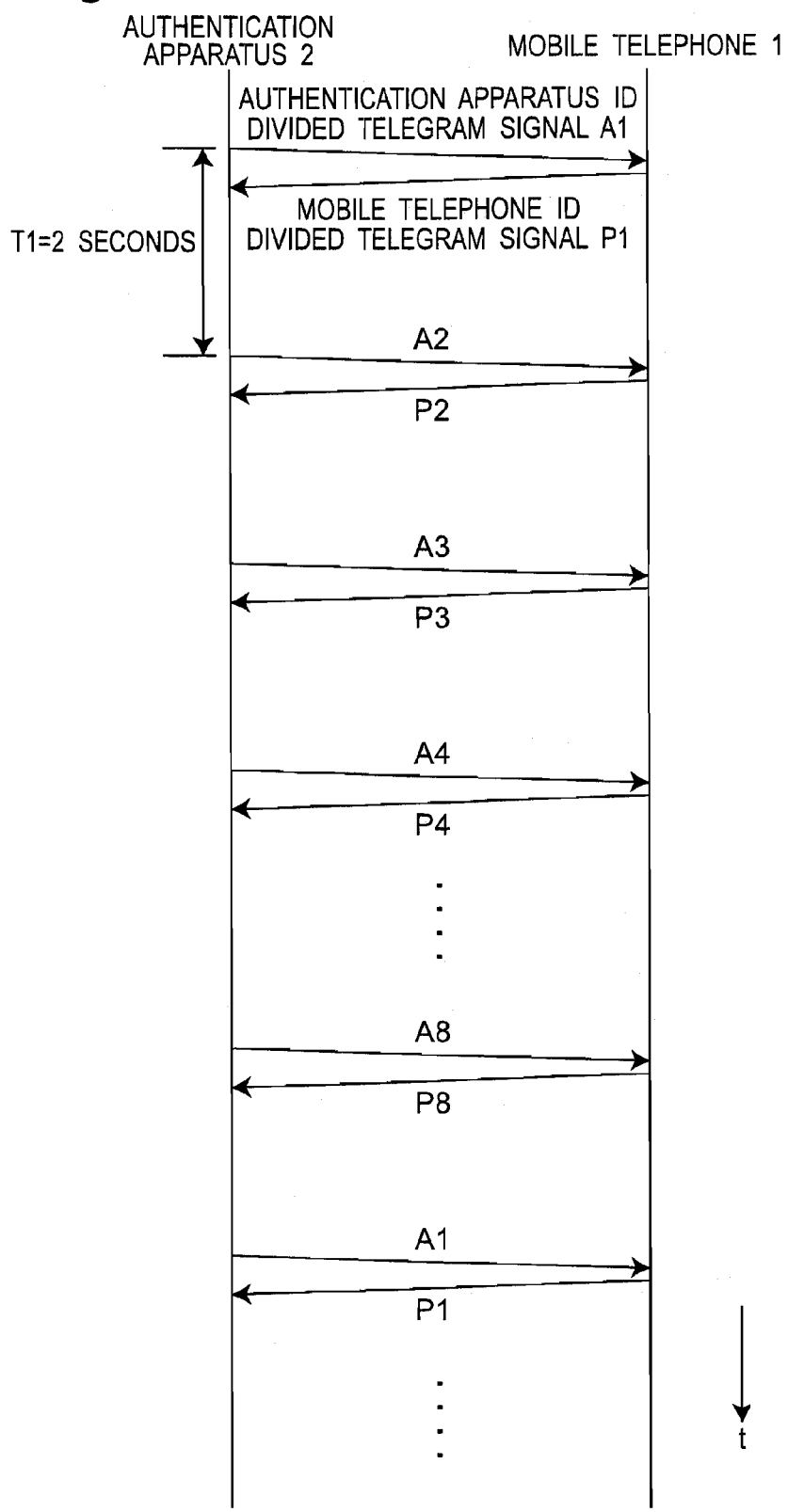
FIG. 19 is a sequence diagram showing a procedure of the communication between the mobile telephone 1 and the authentication apparatus 2 shown in FIG. 17.

FIG. 17 is a timing chart showing a communication procedure between a mobile telephone 1 and an authentication apparatus 2 for use in a wireless device monitoring system according to a third embodiment of the present invention. FIG. 18 is an enlarged view of a part 36 of the communication procedure shown in FIG. 17. FIG. 19 is a sequence diagram showing a procedure of the communication between the mobile telephone 1 and the authentication apparatus 2 shown in FIG. 17. The wireless device monitoring system according to the third embodiment is characterized as follows. The wireless device monitoring system according to the third embodiment is similar in apparatus configuration to that shown in FIG. 1. The differently from the first embodiment, an ID code that is an authentication code to be transmitted to a counterpart apparatus is divided and transmitted.

In the present embodiment, the ID code having a data length of 64 bits is divided into, for example, eight divided data, and each divided data has a data length of 8 bits. Actually, data to which a bit synchronization code and a frame synchronization code for demodulation synchronization are added is transmitted before each divided data (See FIG. 20). By way of example, the bit synchronization code has a data length of 4 bits and the frame synchronization code has a data length of 4 bits, and this leads to that the total data length including that of the divided code can be made 16 bits. The total data length of 16 bits is an example, and the number of divisions of the authentication code and the synchronization codes to be added may be arbitrarily selected. As shown in FIG. 19, each of the eight divided data obtained by dividing the authentication code is transmitted eight times at time intervals of T3=2 seconds, respectively, and data having the data length of 64 bits is transmitted from the authentication apparatus 2 to the mobile telephone 1. Namely, referring to FIG. 19, the authentication apparatus ID divided telegram signals An (n=1, 2, . . . , 8) transmitted from the authentication apparatus 2 include divided codes obtained by dividing the ID code of the authentication apparatus 2, respectively. The mobile telephone ID divided telegram signals Pn (n=1, 2, . . . , 8) transmitted from the mobile telephone 1 include divided data of the ID code of the mobile telephone 1, respectively. By thus dividing the ID code to reduce the data length and performing the communication at short time intervals, the detection time for detecting the distance to the counterpart apparatus 1 or 2 is reduced and the power consumption is reduced. That is, the distance detectors 11b and 21b can detect received levels in a short time because of using the RSSI signal, and it is preferable to reduce the communication time to reduce the power consumption. Therefore, by dividing the authentication code, the communication time for one communication is reduced. If the authentication code is divided, it takes time to authenticate the counterpart apparatus 1 or 2. However, because the authentication can be regularly performed, any problem does not occur practically.

Moreover, in transmission and receiving of signals shown in FIG. 18, key-based encrypted communication can improve authentication security strength. For example, an instance of performing an encrypted communication with an encryption code length of 64 bits will be described. The authentication apparatus 2 divides a challenge code having a code length of 64 bits by eight to create eight divided challenge codes. The divided challenge codes are transmitted at time intervals of T3=2 seconds. In synchronous with the transmission, the mobile telephone 1 receives the divided challenge codes.

As apparent from FIG. 19, the authentication apparatus 2 and the mobile telephone 1 alternately transmit and receive data in synchronous with each other. The mobile telephone 1 obtains an encrypted code of 64 bits after receiving the divided codes eight times. The mobile telephone 1 decodes the encrypted code into a response code of 64 bits using a predetermined decoding key, and divides the decoded response code into eight divided response codes. Then, the mobile telephone 1 transmits the eight divided response codes at intervals of two seconds. In this case, it takes 32 seconds from transmission of a challenge telegram signal (in particular, transmission of an authentication apparatus ID divided telegram signal A1) to receiving of a response telegram signal (in particular, a mobile telephone ID divided telegram signal P8). However, the power consumption can be reduced to one-eighth of that in the case of no code division.

Figure 20:
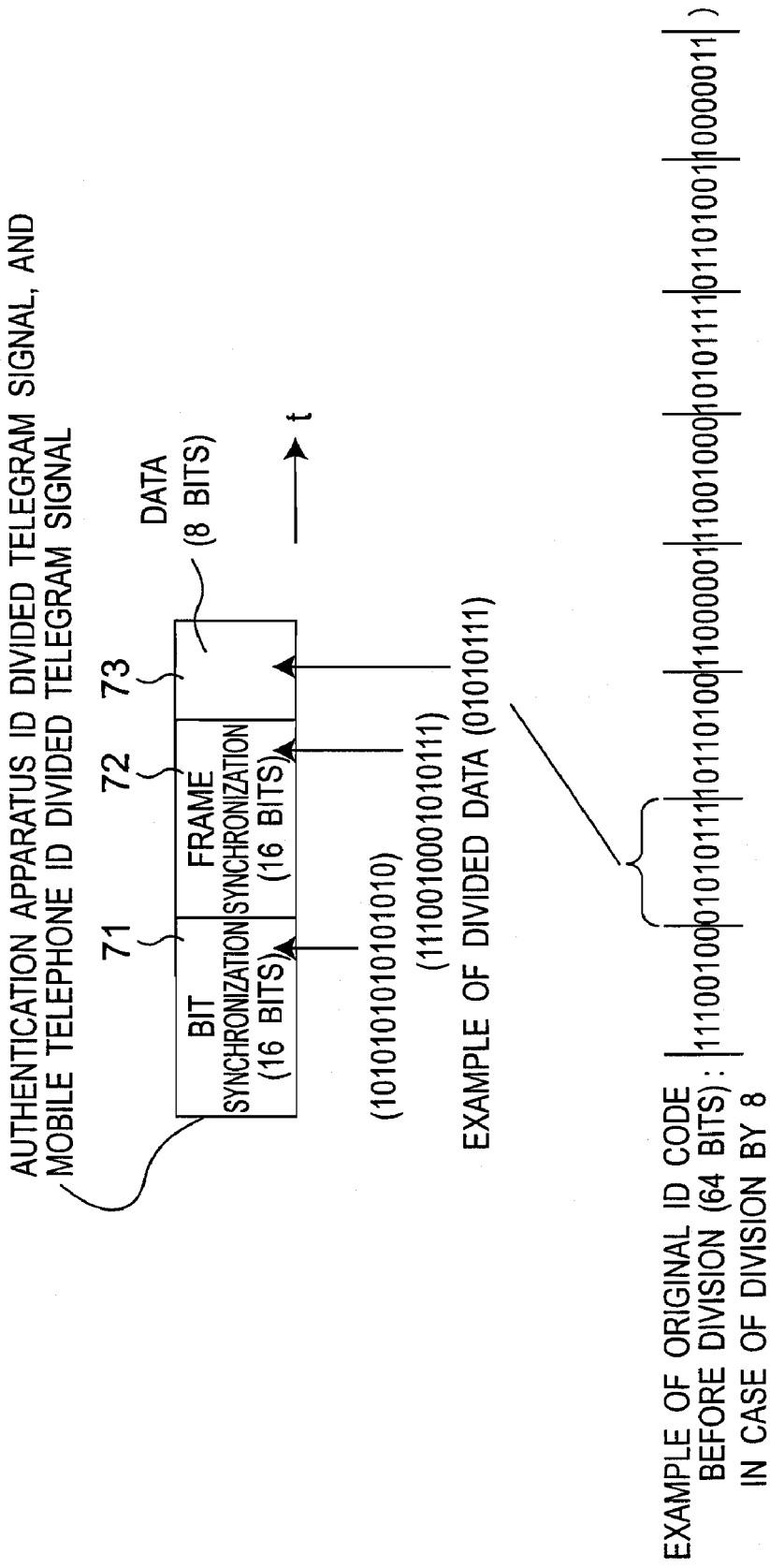
FIG. 20 is a diagram showing signal formats of an authentication apparatus ID divided telegram signal and a mobile telephone ID divided telegram signal as used in the procedure of the communication between the mobile telephone 1 and the authentication apparatus 2 shown in FIG. 17.

FIG. 20 is a diagram showing signal formats of an authentication apparatus ID divided telegram signal, and a mobile telephone ID divided telegram signal as used in the procedure of the communication between the mobile telephone 1 and the authentication apparatus 2 shown in FIG. 17. As shown in FIG. 20, the original ID code before division has a code length of 64 bits and the original ID code is divided by eight to constitute eight divided data 73 each having a data length of 8 bits. By adding bit synchronization data (16 bits) 71 and the frame synchronization data (16 bits) 72 to each divided data 73, a telegram signal of 40 bits is constituted. Because the data length is reduced by the division, communication time is shortened, and the power consumption can be reduced. Moreover, a data length of data transmitted each time is as small as 8 bits because of the division. However, since different data is transmitted respective times, there is no probability of weakening security. That is, it is advantageously possible to remarkably reduce the power consumption with maintaining the security strength.

Figure 21:
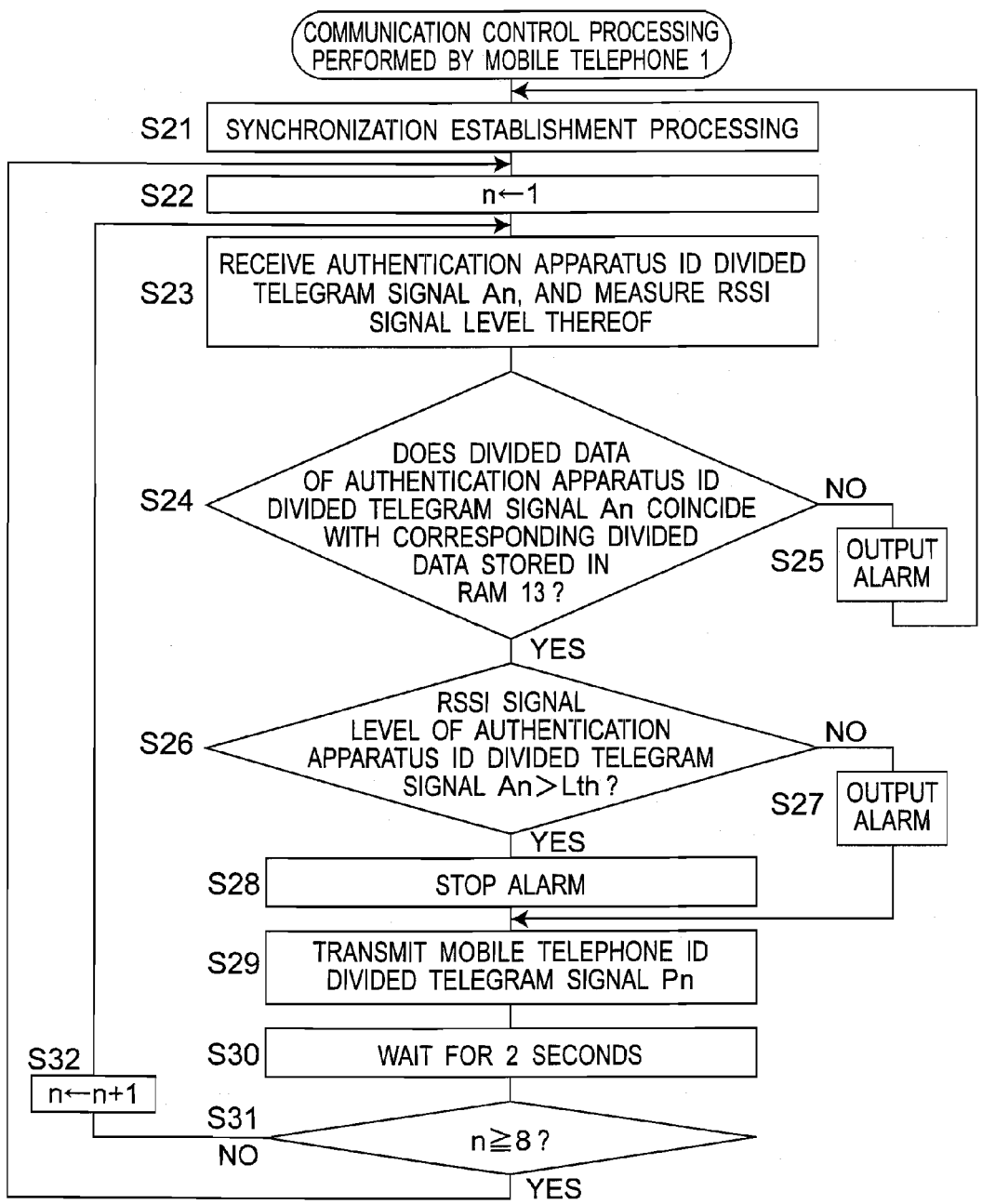
FIG. 21 is a flowchart showing a communication control processing performed by the controller 20 of the mobile telephone 1 according to the third embodiment.

FIG. 21 is a flowchart showing a communication control processing performed by the controller 20 of the mobile telephone 1 according to the third embodiment.

The mobile telephone 1 performs a synchronization establishment processing, first of all, in step S21 shown in FIG. 21, resets a parameter "n" to one in step S22, and then, receives an authentication apparatus ID divided telegram signal An and measures the RSSI signal level thereof in step S23. Further, the mobile telephone 1 judges whether or not divided data of the authentication apparatus ID divided telegram signal An coincides with corresponding divided data in a RAM 13 in step S24. If the judgment result is YES, the processing goes to step S26. On the other hand, if NO, the processing goes to step S25. After the mobile telephone 1 outputs an alarm in step S25, the processing goes to step S21. On the other hand, the mobile telephone 1 judges whether or not the RSSI signal level of the authentication apparatus ID divided telegram signal An exceeds a predetermined threshold value Lth in step S26. If the judgment result is YES, the processing goes to step S28. On the other hand, if NO, the processing goes to step S27. After the mobile telephone 1 outputs an alarm in step S27, the processing goes to step S29. On the other hand, after stopping the alarm in step S28, the mobile telephone 1 transmits a mobile telephone ID divided telegram signal Pn in step S29, wait for two seconds in step S30, and judges whether or not the parameter "n" is equal to or larger than eight in step S31. If the judgment result is YES, the processing returns to step S22. On the other hand, if NO, the processing goes to step S32. After the mobile telephone 1 increments the parameter "n" by one in step S32, the processing returns to step S23.

Figure 22:
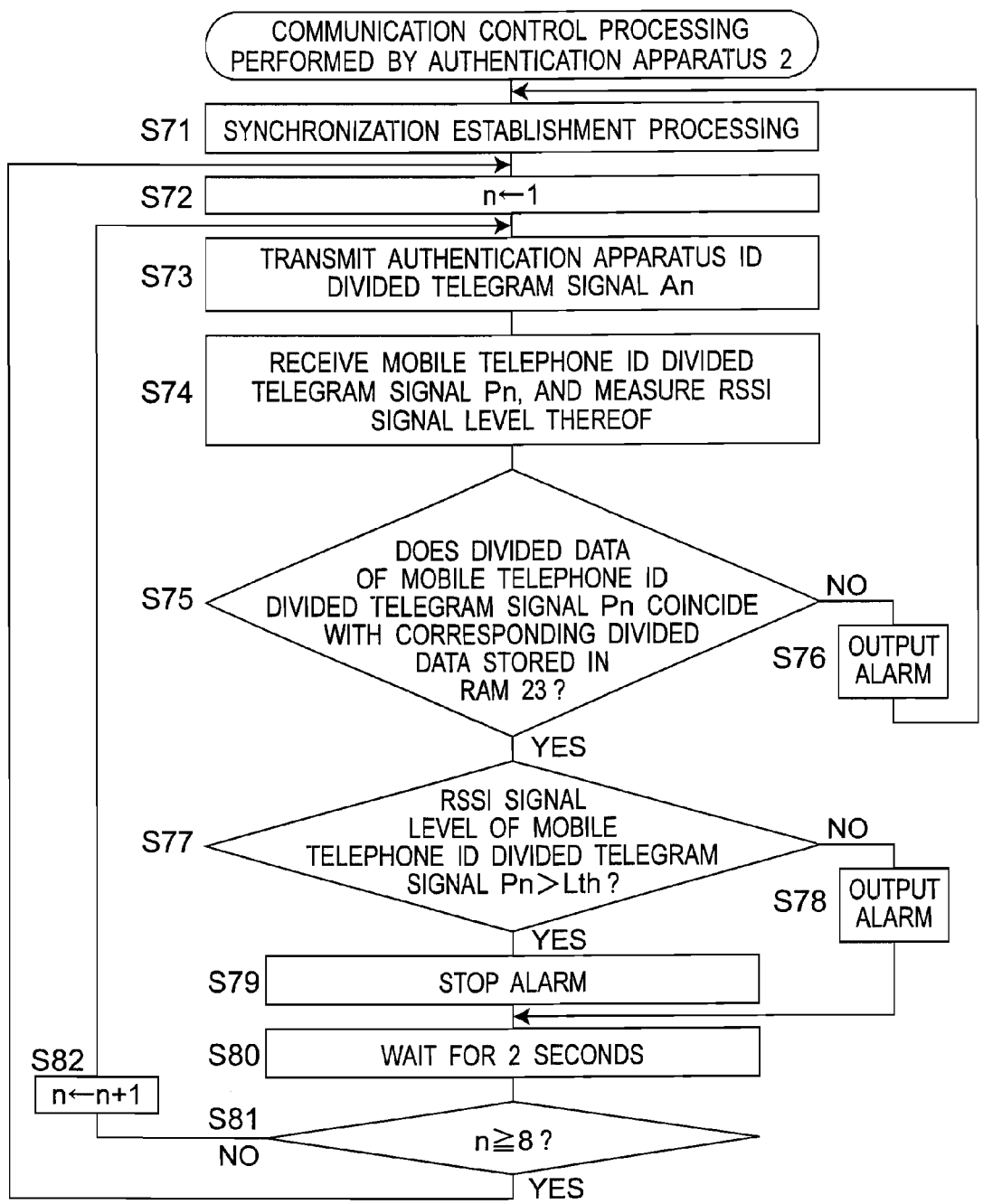
FIG. 22 is a flowchart showing a communication control processing performed by the controller 20 of the authentication apparatus 2 according to the third embodiment.

FIG. 22 is a flowchart showing a communication control processing performed by the controller 20 of the authentication apparatus 2 according to the third embodiment.

In the communication control processing performed by the authentication apparatus 2 shown in FIG. 22, the authentication apparatus 2, first, performs a synchronization establishment processing in step S71, resets the parameter "n" to one in step S72, and transmits the authentication apparatus ID divided telegram signal An in step S73. The authentication apparatus 2 receives the mobile telephone ID divided telegram signal Pn, and measures the RSSI signal level thereof in step S74. Further, the authentication apparatus 2 judges whether or not divided data of the mobile telephone ID divided telegram signal Pn coincides with corresponding divided data in a RAM 23 in step S75. If the judgment result is YES, the processing goes to step S77. On the other hand, if NO, the processing goes to step S76. After the authentication apparatus 2 outputs an alarm in step S76, the processing goes to step S71. On the other hand, the authentication apparatus 2 judges whether or not the RSSI signal level of the mobile telephone ID divided telegram signal Pn exceeds the predetermined threshold value Lth in step S77. If the judgment result is YES, the processing goes to step S79. On the other hand, if NO, the processing goes to step S78. After the authentication apparatus 2 outputs an alarm in step S78, the processing goes to step S80. The authentication apparatus 2 stops the alarm in step S79, waits for two seconds in step S80, and judges whether or not the parameter "n" is equal to or larger than eight in step S81. If the judgment result is YES, the processing returns to step S72. On the other hand, if NO, the processing goes to step S82. The authentication apparatus 2 increments the parameter "n" by one in step S82, and the processing then returns to step S73.

As apparent from the communication control processings shown in FIGS. 21 and 22, the RSSI signal level of each divided telegram signal is measured when each divided telegram signal is received, and the ID data is checked to perform the authentication, to judge whether to output an alarm or not.

The unique functions and advantageous effects of the present embodiment will now be described. If it is to be monitored whether lost or theft of the mobile telephone 1 occurs, when the mobile telephone 1 is apart from the user, it is necessary to notify the user of the fact by ringing a buzzer or the like instantly. Further, it is necessary to instantly limit the functions of the mobile telephone 1. In the present embodiment, wireless transmission and receiving are performed at intervals of two seconds, so that the buzzer can be rung within two seconds after the mobile telephone 1 is apart from the user or the functions of the mobile telephone 1 can be limited.

In this case, the time interval until the authentication of the authentication code of the counterpart apparatus is repeatedly completed is relatively long. However, any problem does not occur practically. For example, it is necessary to avoid damage from "spoofing" by a malicious third party or erroneous recognition of a terminal with a different ID. In the present embodiment, the ID authentication is performed at intervals of 32 seconds. As for the erroneous recognition of a terminal with a different ID, first, it can be prevented to a considerable degree by changing a channel available for every terminal device, setting communication synchronization timing different among terminal devices or doing other things. The erroneous recognition is less likely to occur. Moreover, by performing the authentication at intervals of 32 seconds, it is possible to ensure completely satisfactory security strength practically. As for the "spoofing", even if the malicious third party spoofs and transmits a signal at synchronization timing, it can be authenticated whether the terminal ID is true within 32 seconds. It is thereby possible to ensure completely satisfactory security strength practically. In this manner, it is possible to satisfy both immediacy for detecting that the counterpart apparatus 1 or 2 is apart from each other, the security strength, and the power consumption.

Fourth Embodiment

Figure 23:
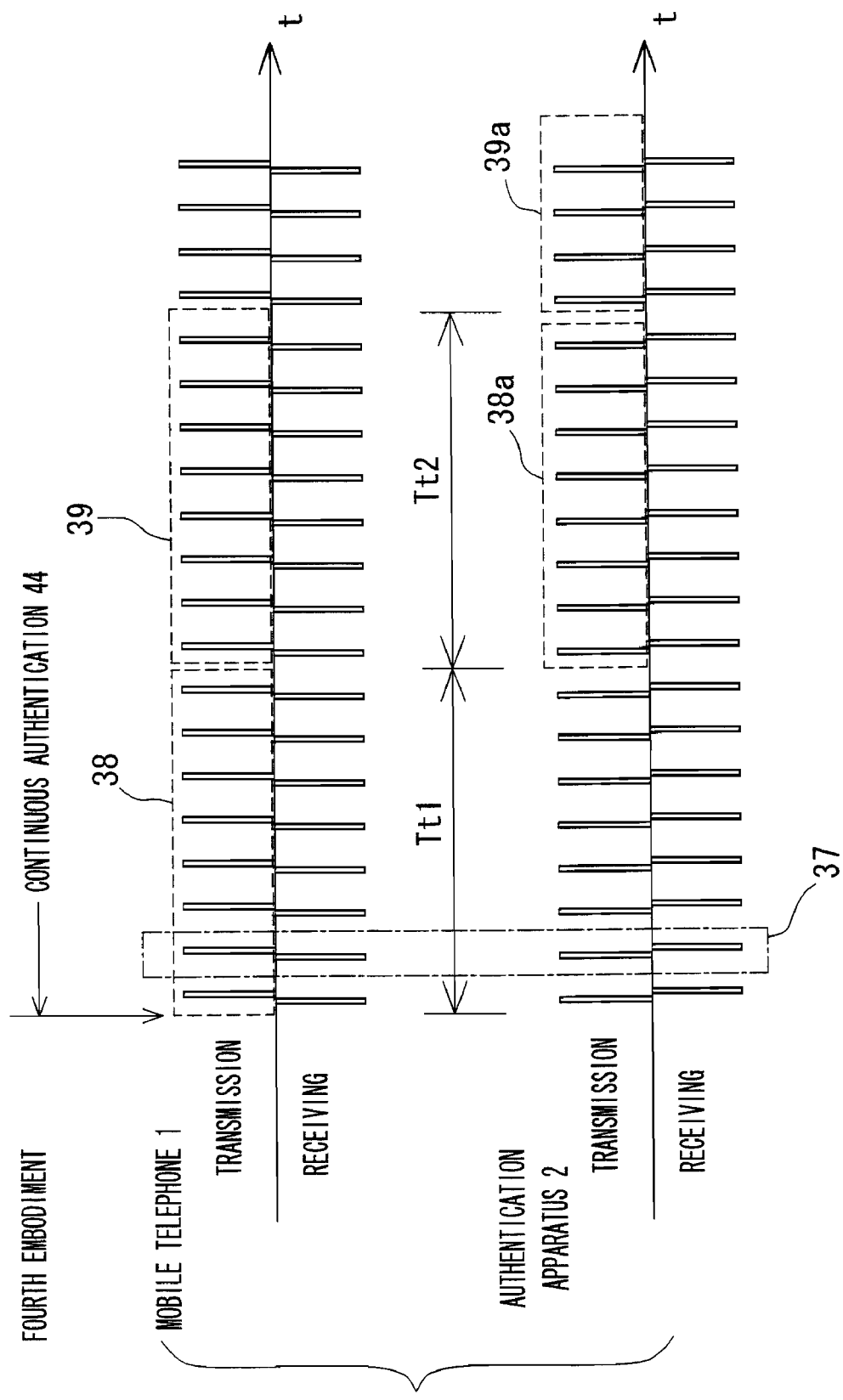
FIG. 23 is a timing chart showing a communication procedure between a mobile telephone 1 and an authentication apparatus 2 for use in a wireless device monitoring system according to a fourth embodiment of the present invention.
Figure 24:
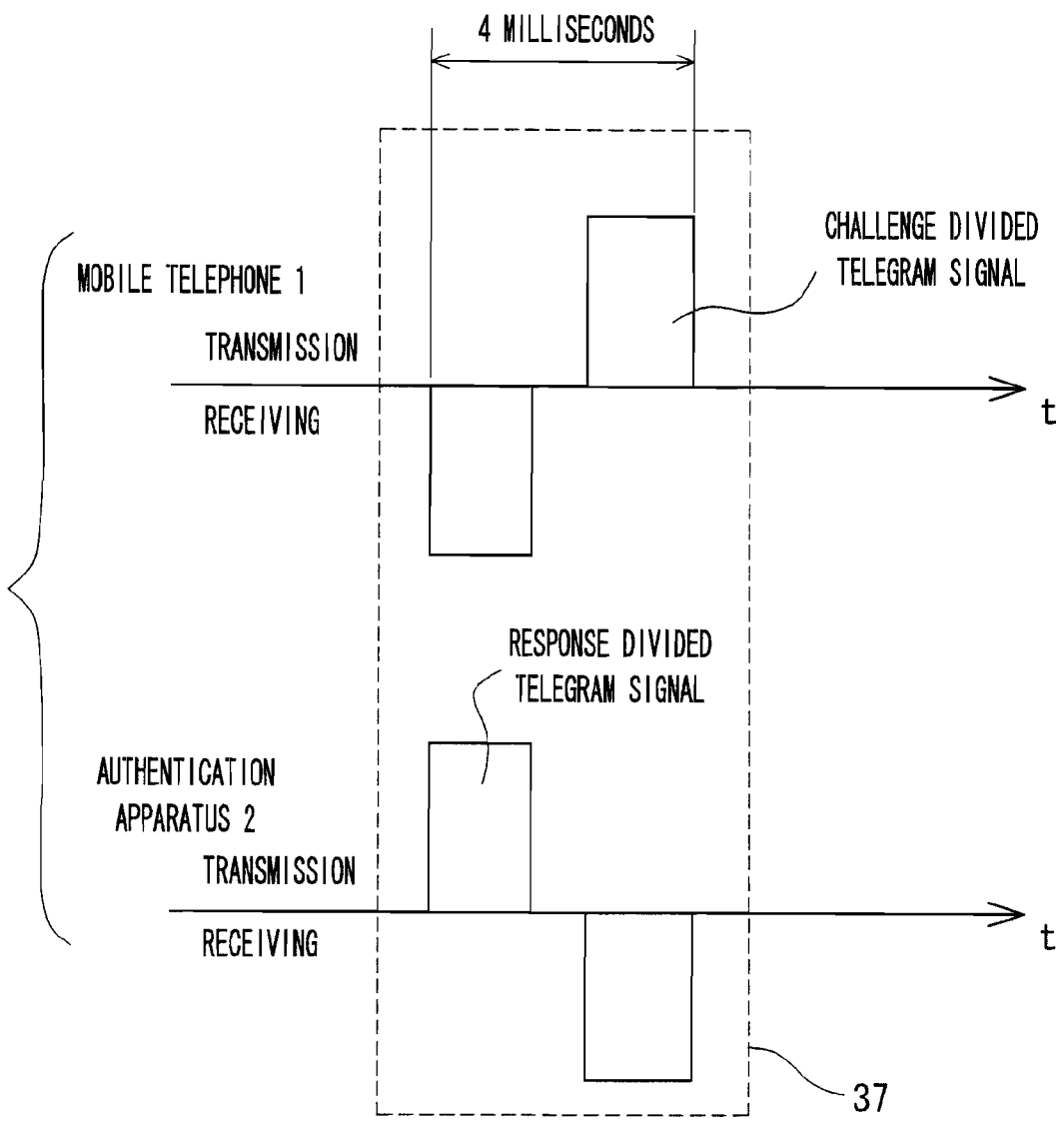
FIG. 24 is an enlarged view of a part 37 of the communication procedure shown in FIG. 23.
Figure 25:
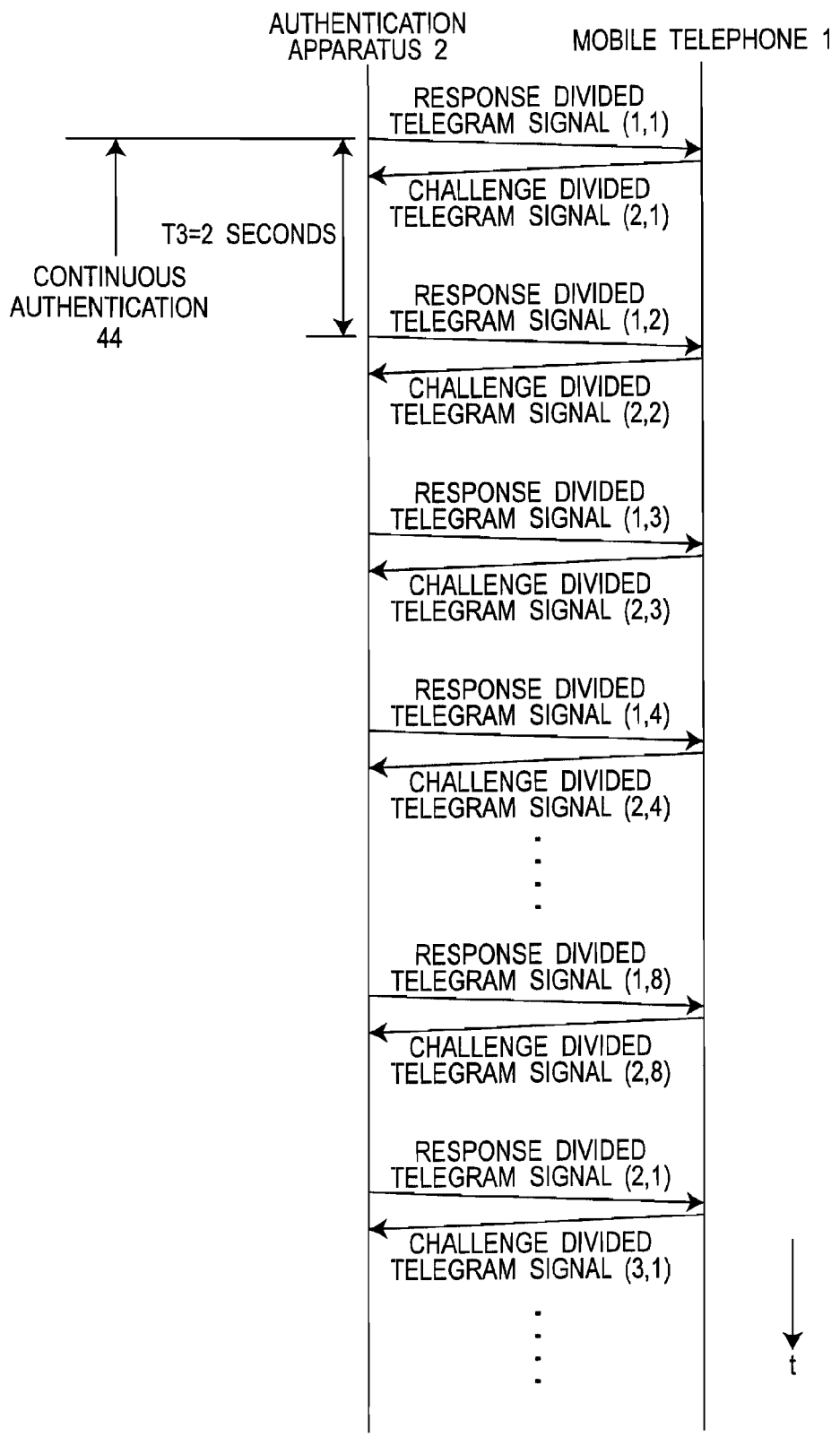
FIG. 25 is a sequence diagram showing a procedure of the communication between the mobile telephone 1 and the authentication apparatus 2 shown in FIG. 24.
Figure 27:
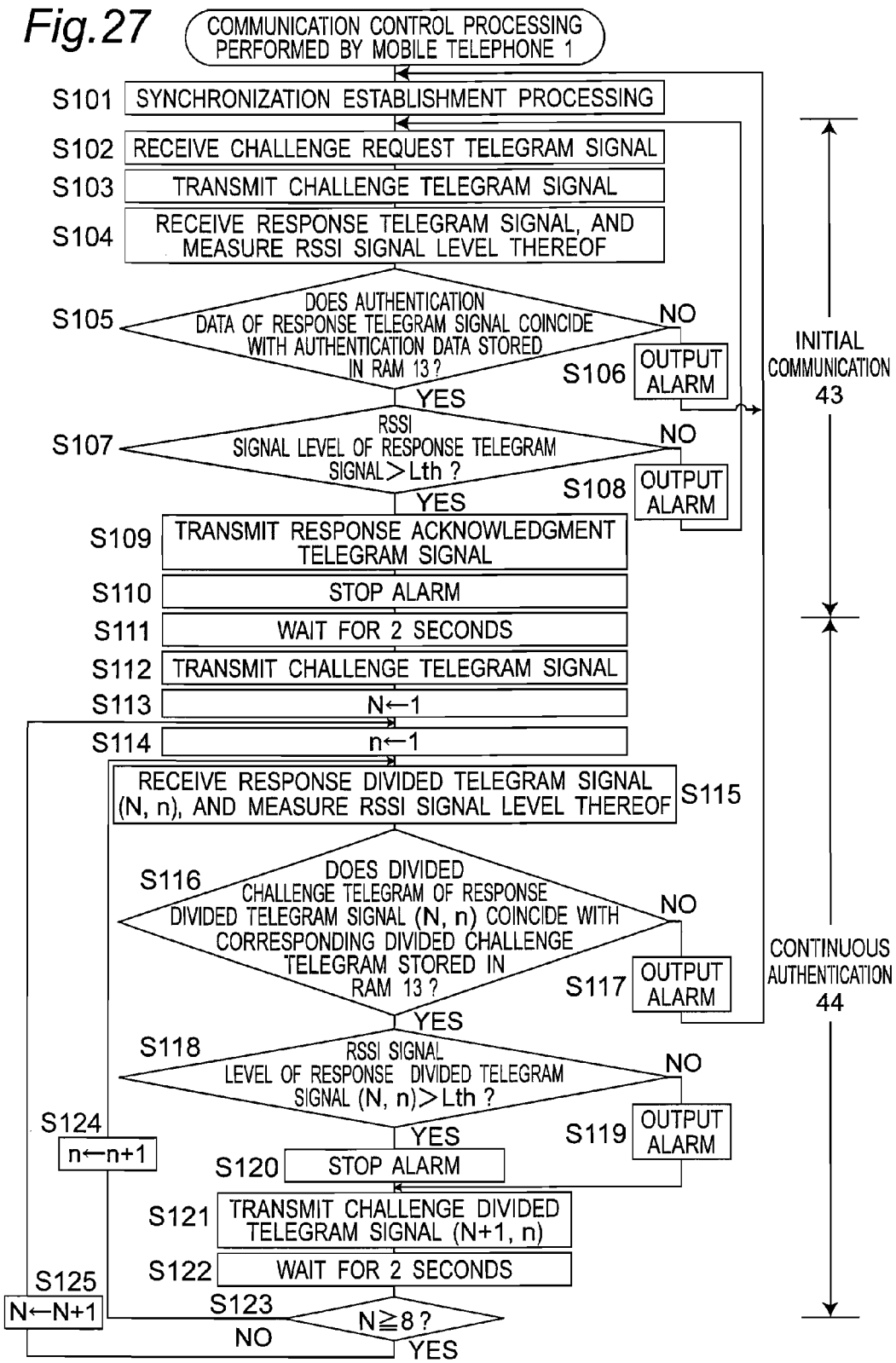
FIG. 27 is a flowchart showing a communication control processing performed by the controller 20 of the mobile telephone 1 according to the fourth embodiment.
Figure 28:
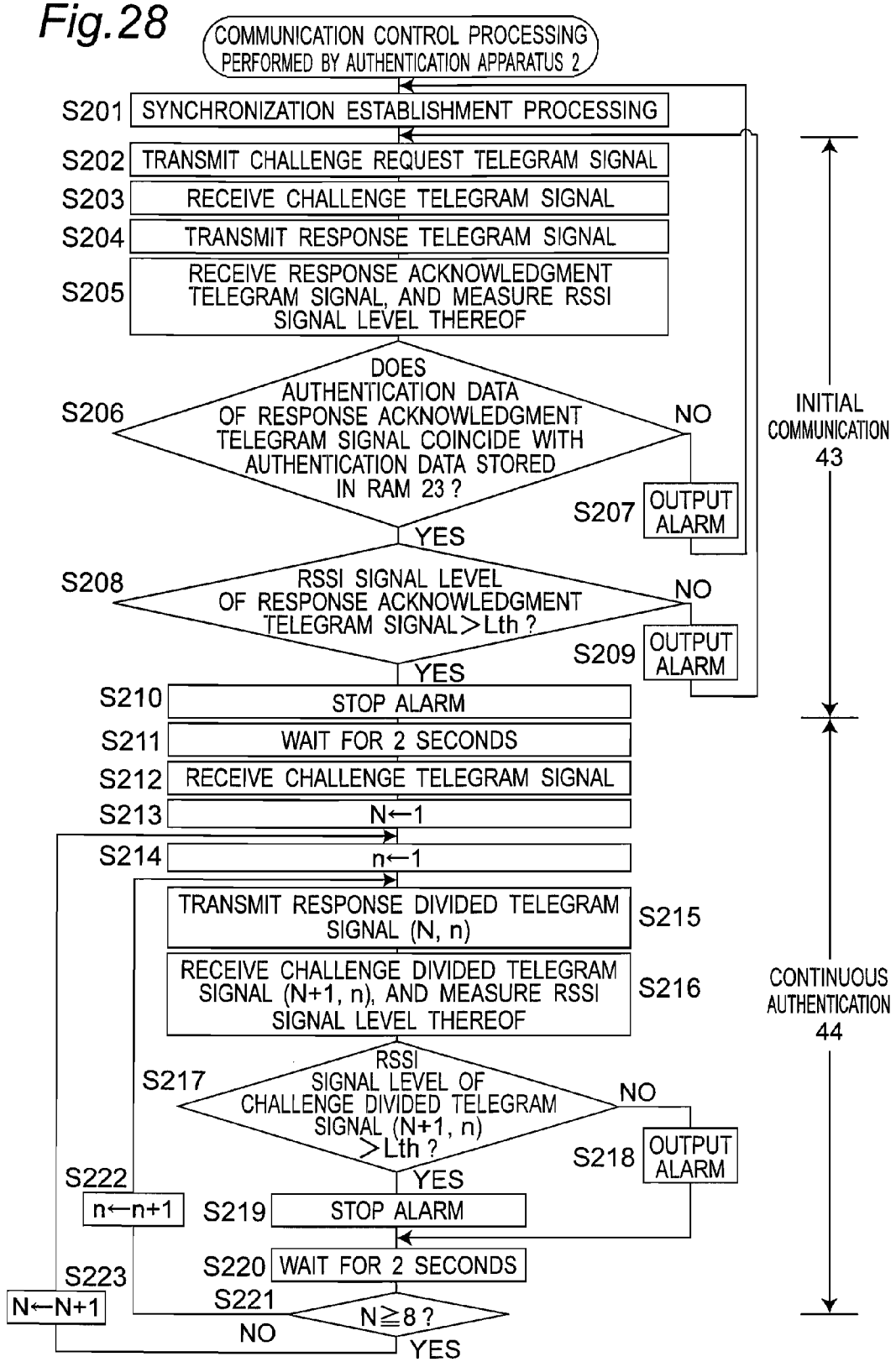
FIG. 28 is a flowchart showing a communication control processing performed by the controller 20 of the authentication apparatus 2 according to the fourth embodiment.

FIG. 23 is a timing chart showing a communication procedure between a mobile telephone 1 and an authentication apparatus 2 for use in a wireless device monitoring system according to a fourth embodiment of the present invention. FIG. 24 is an enlarged view of a part 37 of the communication procedure shown in FIG. 23. FIG. 25 is a sequence diagram showing a procedure of the communication between the mobile telephone 1 and the authentication apparatus 2 shown in FIG. 24. The wireless device monitoring system according to the fourth embodiment is characterized as follows. The wireless device monitoring system according to the fourth embodiment is similar in apparatus configuration to that shown in FIG. 1. As compared with the third embodiment, the wireless device monitoring system according to the fourth embodiment uses divided telegrams when performing the key-based encrypted communication. As shown in FIGS. 27 and 28 which will be described later, the communication procedure according to the fourth embodiment is divided into a time interval of initial authentication 43 and a time interval of continuous authentication 44. In FIGS. 23 to 26, only the latter continuous authentication 44 is shown.

Referring to FIG. 23, a time interval Tt1 is a transmission interval of transmitting, first of all, challenge divided telegram signals and a time interval Tt2 is a transmission interval of transmitting second challenge divided telegram signals. In a time interval 38 shown in FIG. 23, the mobile telephone 1 transmits the challenge divided telegram signals. In a time interval 38a', the authentication apparatus 2 transmits response divided telegram signals. In a transmission interval 39 at this time, the mobile telephone 1 transmits next challenge divided telegram signals. Namely, the mobile telephone 1 transmits challenge divided telegram signals at appropriate time, and the authentication apparatus 2 transmits response divided telegram signals at appropriate time, to maintain an authentication state. As apparent from FIG. 24, because of short transmission and receiving time, the power consumption can be remarkably suppressed. Moreover, as shown in FIG. 25, the authentication apparatus 2 transmits response divided telegram signals to the mobile telephone 1. In response to this, the mobile telephone 1 transmits challenge divided telegram signals to the authentication apparatus 2. In the present embodiment, this communication procedure is repeated.

Figure 26:
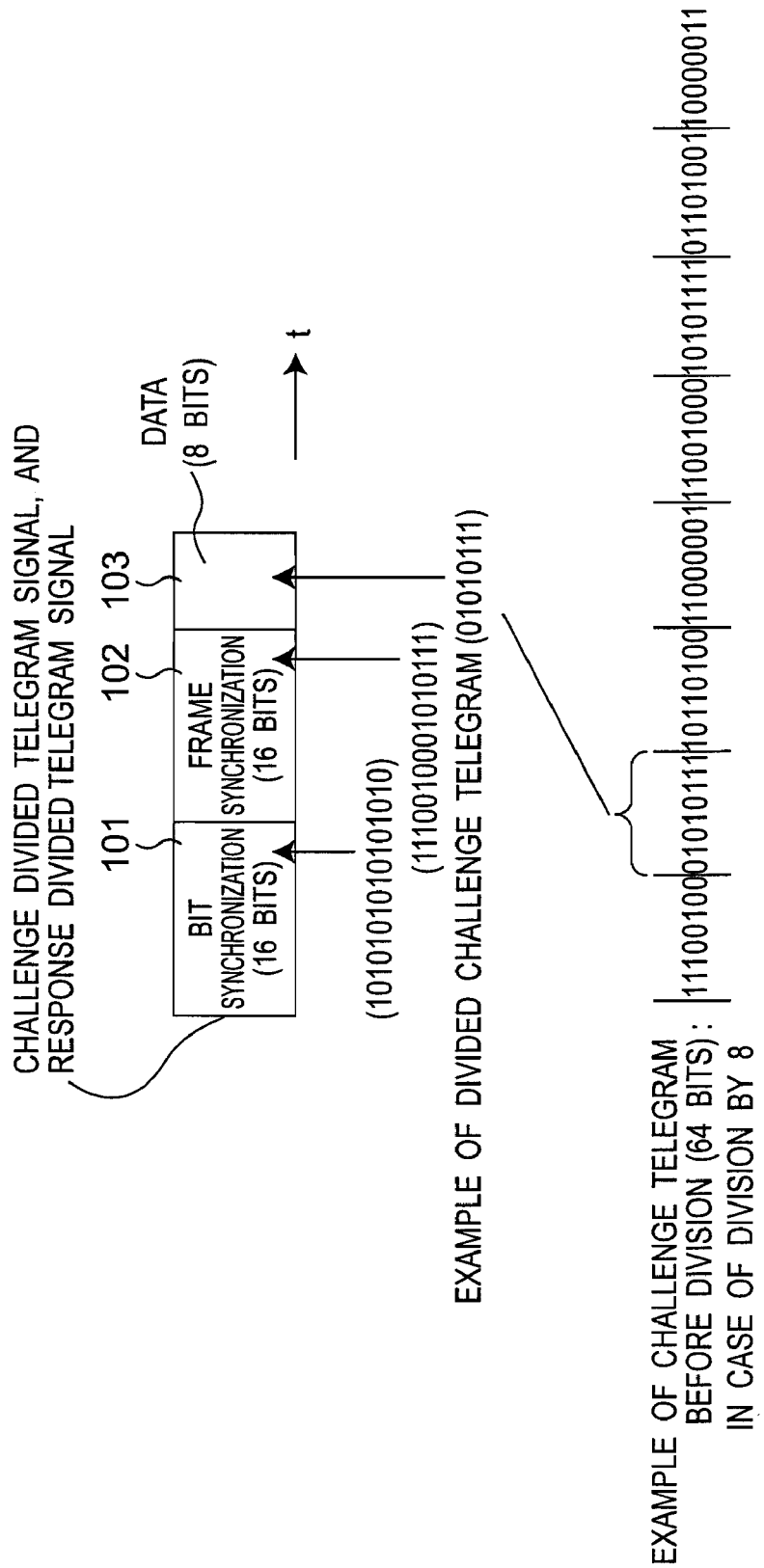
FIG. 26 is a diagram showing signal formats of a challenge divided telegram signal and a response divided telegram signal as used in the procedure of the communication between the mobile telephone 1 and the authentication apparatus 2 shown in FIG. 24.

FIG. 26 is a diagram showing signal formats of the challenge divided telegram signal and the response divided telegram signal as used in the procedure of the communication between the mobile telephone 1 and the authentication apparatus 2 shown in FIG. 24. As apparent from FIG. 26, the divided data is characterized by having a short data bit length of 8 bits. Each of the challenge divided telegram signal and the response divided telegram signal is configured to include bit synchronization (16 bits) 101, frame synchronization (16 bits) 102, and data (8 bits) 103.

FIG. 27 is a flowchart showing a communication control processing performed by the controller 20 of the mobile telephone 1 according to the fourth embodiment.

In the communication control processing performed by the mobile telephone 1 shown in FIG. 27, the mobile telephone 1, first, performs a synchronization establishment processing in step S101, receives a challenge request telegram signal in step S102, transmits a challenge telegram signal in step S103, and then, receives a response telegram signal and measures the RSSI signal level thereof in step S104. Next, the mobile telephone 1 judges whether or not authentication data of the response telegram signal coincides with corresponding authentication data in a RAM 13 in step S105. If the judgment result is YES, the processing goes to step S107. On the other hand, if NO, the processing goes to step S106. After the mobile telephone 1 outputs an alarm in step S106, the processing returns to step S101. On the other hand, the mobile telephone 1 judges whether or not the RSSI signal level of the response telegram signal exceeds a predetermined threshold value Lth in step S107. If the judgment result is YES, the processing goes to step S109. On the other hand, if NO, the processing goes to step S108. After the mobile telephone 1 outputs an alarm in step S108, the processing returns to step S102. On the other hand, the mobile telephone 1 transmits a response acknowledgment telegram signal in step S109, stops the alarm in step S110, and waits for two seconds in step S111. In step S112, the mobile telephone 1 transmits a challenge telegram signal.

Next, the mobile telephone 1 resets a parameter "N" to one in step S113, and resets a parameter "n" to one in step S114. The mobile telephone 1 receives a response divided telegram signal (N, n), and measures the RSSI signal level thereof in step S115. Further, the mobile telephone 1 judges whether or not authentication data of the response divided telegram signal (N, n) coincides with corresponding divided challenge telegram in the RAM 13 in step S116. If the judgment result is YES, the processing goes to step S118. On the other hand, if NO, the processing goes to step S117. After the mobile telephone 1 outputs an alarm in step S117, the processing returns to step S101. On the other hand, the mobile telephone 1 judges whether or not the RSSI signal level of the response divided telegram signal (N, n) exceeds the predetermined threshold value Lth in step S117. If the judgment result is YES, the processing goes to step S120. On the other hand, if NO, the processing goes to step S119. After the mobile telephone 1 outputs an alarm in step S119, the processing goes to step S121. On the other hand, the mobile telephone 1 stops the alarm in step S120, transmits a challenge divided telegram signal (N+1, n) in step S121, waits for two seconds in step S122, and judges whether or not the parameter "n" is equal to or larger than eight in step S123. If the judgment result is YES, the processing returns to step S125. On the other hand, if NO, the processing goes to step S124. After the mobile telephone 1 increments the parameter "n" by one in step S124, the processing goes to step S115. On the other hand, the mobile telephone 1 increments the parameter "n" by one in step S125, the processing returns to step S114.

FIG. 28 is a flowchart showing a communication control processing performed by the controller 20 of the authentication apparatus 2 according to the fourth embodiment.

In the communication control processing performed by the authentication apparatus 2 shown in FIG. 28, the authentication apparatus 2, first, performs a synchronization establishment processing in step S201, transmits the challenge request telegram signal in step S202, receives the challenge telegram signal in step S203, and transmits the response telegram signal in step S204. Next, the authentication apparatus 2 receives the response acknowledgment telegram signal, and measures the RSSI signal level thereof in step S205. The authentication apparatus 2 judges whether or not authentication data of the response acknowledgment telegram signal coincides with corresponding authentication data in a RAM 23 in step S206. If the judgment result is YES, the processing goes to step S208. On the other hand, if NO, the processing goes to step S207. After the authentication apparatus 2 outputs an alarm in step S207, the processing returns to step S201. Next, the authentication apparatus 2 judges whether or not the RSSI signal level of the response acknowledgment telegram signal exceeds the predetermined threshold value Lth in step S208. If the judgment result is YES, the processing goes to step S210. On the other hand, if NO, the processing goes to step S209. After the authentication apparatus 2 outputs an alarm in step S209, the processing returns to step S202. The authentication apparatus 2 stops the alarm in step S210, waits for two seconds in step S211, and receives the challenge telegram signal in step S212.

Next, the authentication apparatus 2 resets the parameter "n" to one in step S213, and resets the parameter "n" to one in step S214. The authentication apparatus 2 transmits the response divided telegram signal (N, n) in step S215, receives the challenge divided telegram signal (N+1, n), and measures the RSSI signal level thereof in step S216. The authentication apparatus 2 judges whether or not the RSSI signal level of the challenge divided telegram signal (N+1, n) exceeds the predetermined threshold value Lth in step S217. If the judgment result is YES, the processing goes to step S219. On the other hand, if NO, the processing goes to step S218. After the authentication apparatus 2 outputs an alarm in step S218, the processing goes to step S220. On the other hand, the authentication apparatus 2 stops the alarm in step S219, waits for two seconds in step S220, and judges whether or not the parameter "n" is equal to or larger than eight in step S221. If the judgment result is YES, the processing goes to step S223. On the other hand, if NO, the processing goes to step S222. After the authentication apparatus 2 increments the parameter "n" by one in step S222, the processing returns to step S215. On the other hand, the authentication apparatus 2 increments the parameter "n" by one in step S223, the processing returns to step S214.

Figure 29:
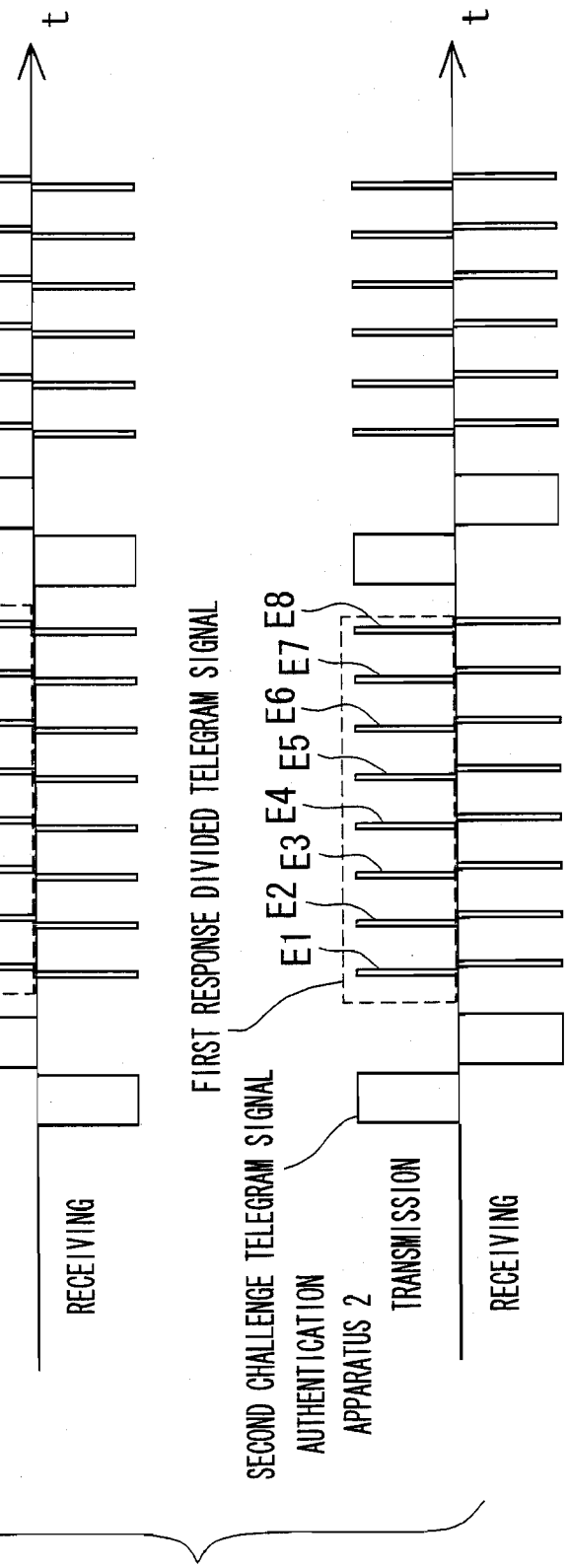
FIG. 29 is a timing chart showing a communication procedure between a mobile telephone 1 and an authentication apparatus 2 for use in a wireless device monitoring system according to a fifth embodiment of the present invention.

As apparent from FIGS. 28 and 29, the initial authentication 43 that is the first authentication communication after establishing synchronization employs undivided telegrams. However, in the continuous authentication 44 that is the authentication communication subsequent to the first authentication communication, a processing for repeating communication using divided telegrams is performed.

Functions and advantages of the fourth embodiment configured as stated above will next be described. The wireless device monitoring system according to the fourth embodiment can instantly authenticate that the counterpart apparatus is not any true counterpart when the counterpart apparatus is not any true counterpart. Namely, as shown in FIG. 23, for the transmission time interval Tt1 of transmitting the first challenge divided telegram signals, the authentication apparatus 2 transmits the eight divided challenge codes obtained by dividing the first challenge code by eight at intervals of two seconds eight times separately (for the time interval 38 shown in FIG. 23). On the other hand, the mobile telephone 1 combines the eight divided challenge codes to constitute the first challenge code, and encrypts the first challenge code thus constituted using a predetermined encryption key, to create the first response code. The mobile telephone 1 divides the created first response code into eight divided codes, and transmits the eight divided codes at a timing of a response to the transmission from the authentication apparatus 2 in the transmission time interval Tt2 of transmitting the second challenge divided telegram signals at the next timing (for the time interval 39 of FIG. 23). Likewise, the second response code in response to the second challenge code (for the time interval 38a of FIG. 23) is transmitted from the mobile telephone 1 to the authentication apparatus 2 eight times separately in the third challenge code transmission interval subsequent to the second transmission time interval Tt2 of transmitting the challenge divided telegram signals (for the time interval 39a of FIG. 23).

In this case, the key for encryption (generally, a private key cryptography-based key can be used) is shared between the mobile telephone 1 and the authentication apparatus 2. Due to this, the authentication apparatus 2 knows the response code in advance before receiving the response code from the mobile telephone 1. Accordingly, if even a part of the divided response codes differ from the correct codes when receiving the divided response codes from the mobile telephone 1, the authentication apparatus 2 can instantly detects that the divided response codes differ from the correct codes. In the present embodiment, the number of divisions of the challenge code and that of divisions of the response codes are equally eight. Alternatively, the number of divisions of the challenge code may differ from that of divisions of the response codes. In this case, the authentication apparatus 2 can receive the response code earlier if the challenge code is transmitted in shorter time. Therefore, the number of divisions of the challenge code can be set to a smaller number, and that of divisions of the response code can be set to a larger number.

As stated so far, according to the present embodiment, even a singe divided response code enables attaining the authentication advantage. Therefore, it is possible to quickly authenticate whether or not the counterpart apparatus is a true counterpart. Moreover, the number of divisions of the challenge code can be set to one, that is, the challenge code may remain undivided.

Fifth Embodiment

Figure 30:
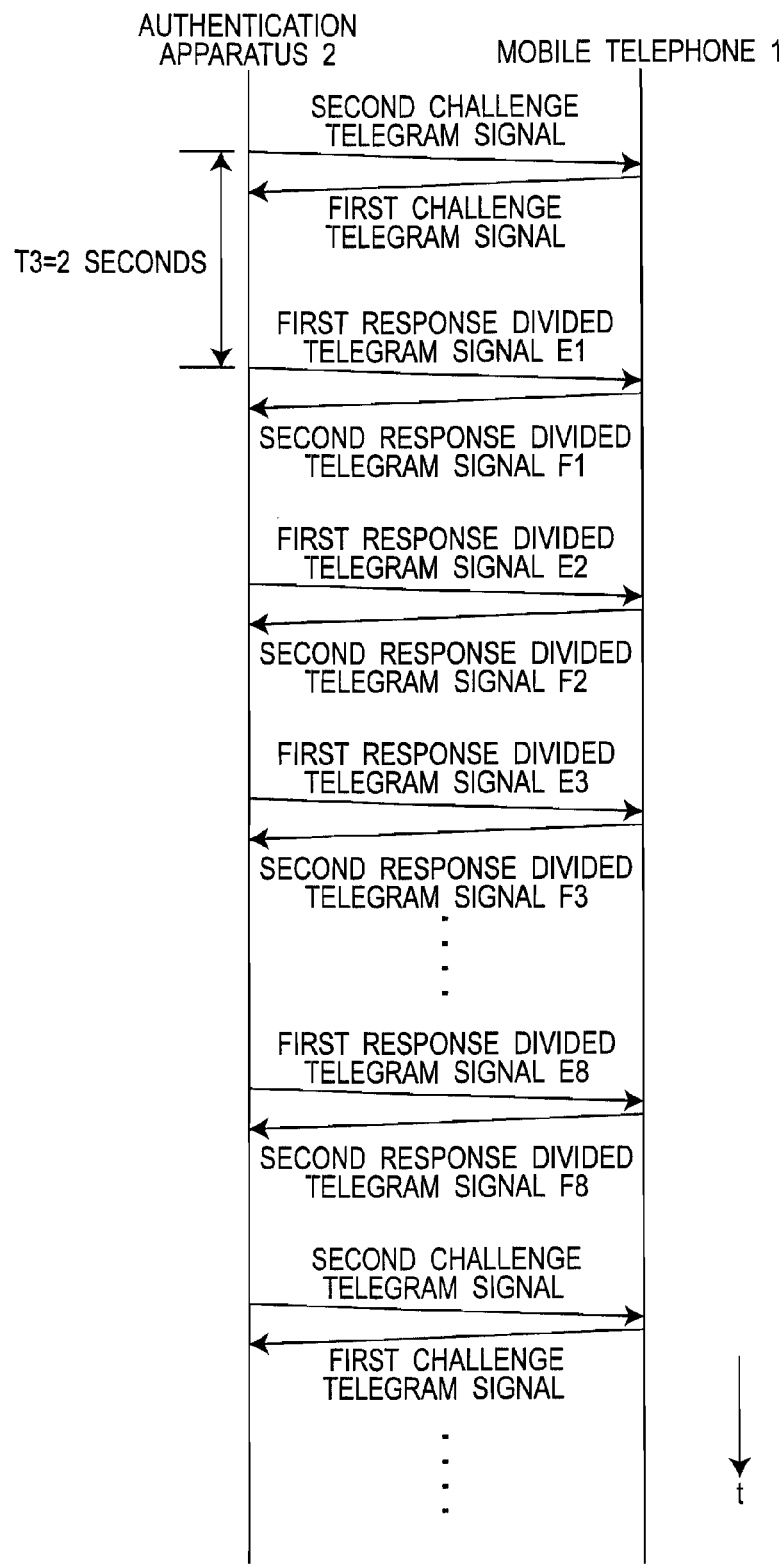
FIG. 30 is a sequence diagram showing a procedure of the communication between the mobile telephone 1 and the authentication apparatus 2 shown in FIG. 29.

FIG. 29 is a timing chart showing a communication procedure between a mobile telephone 1 and an authentication apparatus 2 for use in a wireless device monitoring system according to a fifth embodiment of the present invention. FIG. 30 is a sequence diagram showing a procedure of the communication between the mobile telephone 1 and the authentication apparatus 2 shown in FIG. 29. The wireless device monitoring system according to the fifth embodiment is characterized as follows. The wireless device monitoring system according to the fifth embodiment is similar in apparatus configuration to that shown in FIG. 1. As compared with the third and fourth embodiments, each of the mobile telephone 1 and the authentication apparatus 2 transmits a challenge telegram signal and receives a response telegram signal, and then, this leads to that each of the mobile telephone 1 and the authentication apparatus 2 authenticates its counterpart apparatus. In the third and fourth embodiments, only the mobile telephone 1 verifies authenticity of the authentication apparatus 2. In the present embodiment, the challenge telegram is not divided and the response telegram is divided into eight divided telegrams. In addition, because both of the apparatuses 1 and 2 authenticate each other, it is characteristically and advantageously possible for each of the mobile telephone 1 and the authentication apparatus 2 to maintain the state of verifying the authenticity of the counterpart apparatus 1 or 2.

Referring to FIG. 30, the authentication apparatus 2 transmits the second challenge telegram signal to the mobile telephone 1, and the mobile telephone 1 transmits the first challenge telegram signal to the authentication apparatus 2 in response to the second challenge telegram signal. Next, the authentication apparatus 2 transmits the first response divided telegram signal En to the mobile telephone 1 at time intervals of T3=2 seconds, and the mobile telephone 1 transmits the second response divided telegram signal Fn to the authentication apparatus 2 (where n=1, 2, . . . , 8) in response to the first response divided telegram signal En. Transmission of the first response divided telegram signal En and that of the second response telegram signal Fn are repeated eight times.

Figure 31:
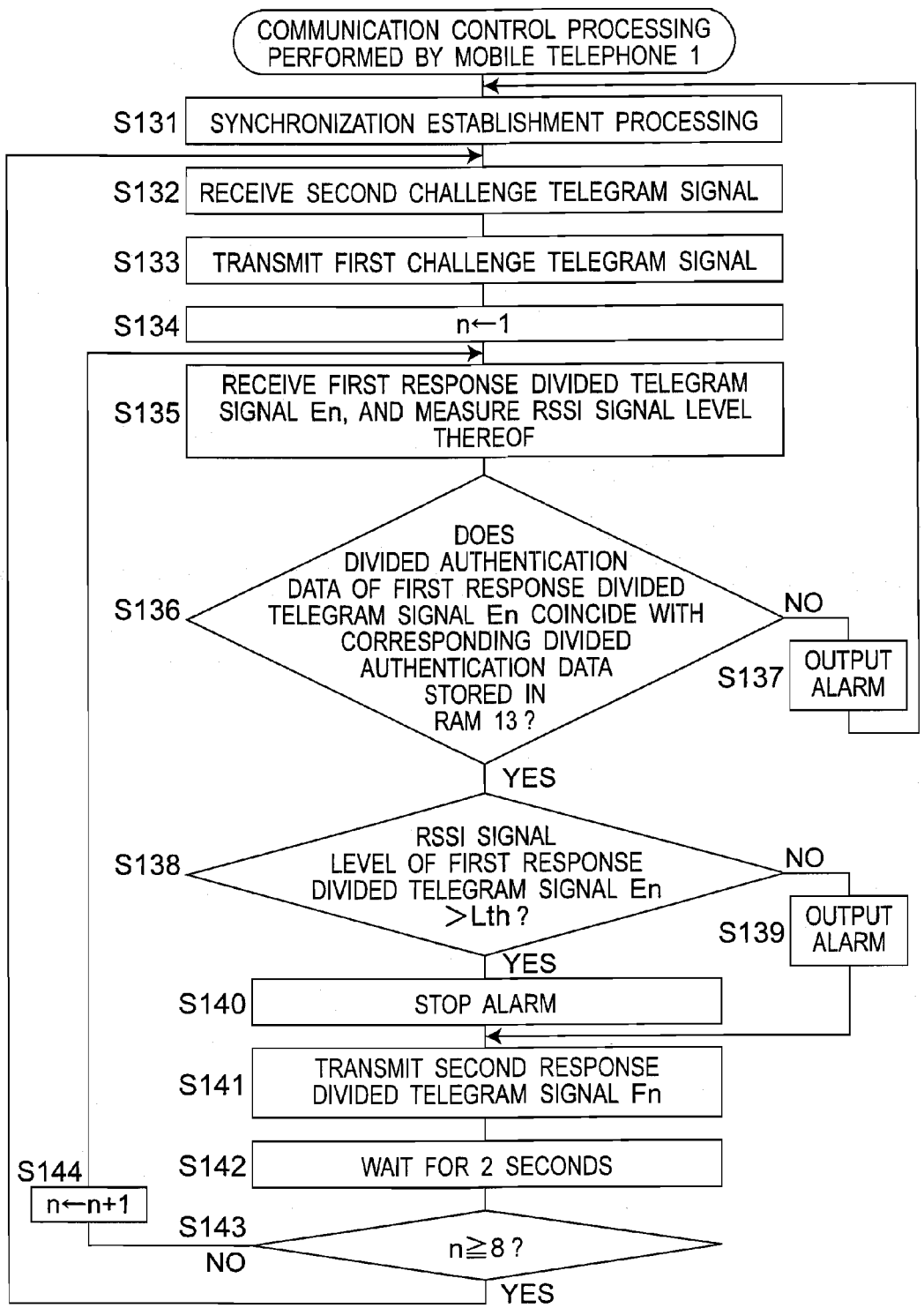
FIG. 31 is a flowchart showing a communication control processing performed by the controller 20 of the mobile telephone 1 according to the fifth embodiment.

FIG. 31 is a flowchart showing a communication control processing performed by the controller 20 of the mobile telephone 1 according to the fifth embodiment.

In the communication control processing performed by the mobile telephone 1 shown in FIG. 31, the mobile telephone 1, first, performs a synchronization establishment processing in step S131, receives the second challenge telegram signal in step S132, and transmits the first challenge telegram signal in step S133. Next, the mobile telephone 1 resets a parameter "n" to one in step S134, and then, receives the first response divided telegram signal En and measures the RSSI signal level thereof in a step S135. Then the mobile telephone 1 judges whether or not divided authentication data of the first response divided telegram signal En coincides with corresponding divided authentication data in a RAM 13 in step S136. If the judgment result is YES, the processing goes to step S138. On the other hand, if NO, the processing goes to step S137. After the mobile telephone 1 outputs an alarm in step S137, the processing returns to step S131. Next, the mobile telephone 1 judges whether or not the RSSI signal level of the first response divided telegram signal En exceeds a predetermined threshold value Lth in step S138. If the judgment result is YES, the processing goes to step S140. On the other hand, if NO, the processing goes to step S139. After the mobile telephone 1 outputs an alarm in step S139, the processing goes to step S141. The mobile telephone 1 stops the alarm in step S140, transmits the second response telegram signal Fn in step S141, waits for two seconds in step S142, and judges whether or not the parameter "n" is equal to or larger than eight in step S143. If the judgment result is YES, the processing returns to step S132. On the other hand, if NO, the processing goes to step S144. After the mobile telephone 1 increments the parameter "n" by one in step S144, the processing returns to step S135.

Figure 32:
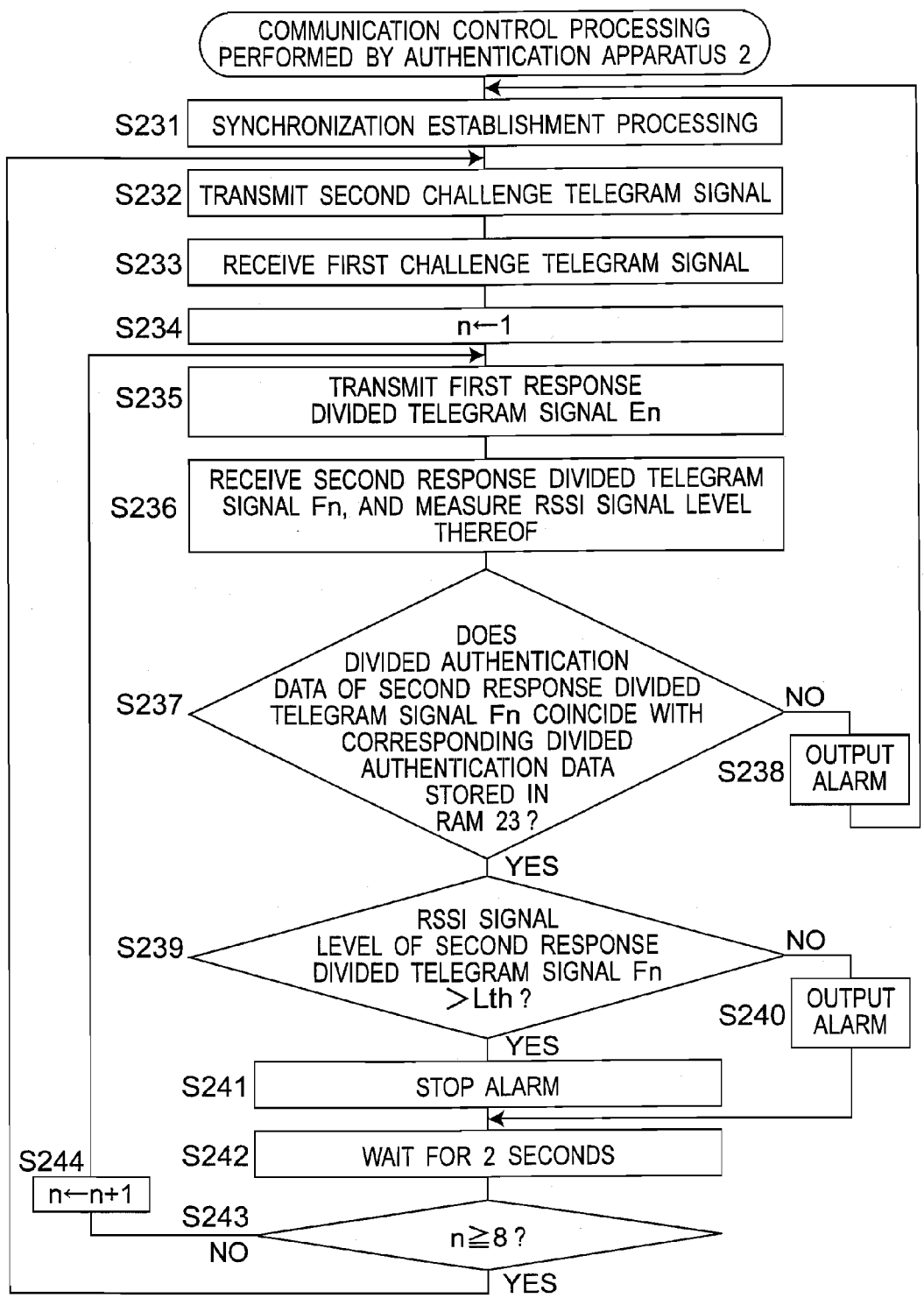
FIG. 32 is a flowchart showing a communication control processing performed by the controller 20 of the authentication apparatus 2 according to the fifth embodiment.

FIG. 32 is a flowchart showing a communication control processing performed by the controller 20 of the authentication apparatus 2 according to the fifth embodiment.

In the communication control processing performed by the authentication apparatus 2 shown in FIG. 32, the authentication apparatus 2, first, performs a synchronization establishment processing in step S231, transmits the second challenge telegram signal in step S232, and receives the first challenge telegram signal in step S233. Next, the authentication apparatus 2 resets the parameter "n" to one in step S234, transmits the first response divided telegram signal En in step S235, then receives the second response divided telegram signal Fn and measures the RSSI signal level thereof in step S236. Then the authentication apparatus 2 judges whether or not divided authentication data of the second response divided telegram signal Fn coincides with corresponding divided authentication data in a RAM 23 in step S237. If the judgment result is YES, the processing goes to step S239. On the other hand, if NO, the processing goes to step S238. After the authentication apparatus 2 outputs an alarm in step S238, the processing returns to step S231. The authentication apparatus 2 judges whether or not the RSSI signal level of the second response divided telegram signal Fn exceeds the predetermined threshold value Lth in step S239. If the judgment result is YES, the processing goes to step S241. On the other hand, if NO, the processing goes to step S240. After the authentication apparatus 2 outputs an alarm in step S240, the processing goes to step S242. The authentication apparatus 2 stops the alarm in step S241, waits for two seconds in step S242, and judges whether or not the parameter "n" is equal to or larger than eight in step S243. If the judgment result is YES, the processing returns to step S232. On the other hand, if NO, the processing goes to step S244. After the authentication apparatus 2 increments the parameter "n" by one in step S244, the processing returns to step S235.

Functions and advantages of the wireless device monitoring system configured as stated above according to the fifth embodiment will be described below.

The wireless device monitoring system according to the present embodiment is characterized in that because each of the authentication apparatus 2 and the mobile telephone 1 transmits and receives the challenge code and the response code, it is possible for each of the authentication apparatus 2 and the mobile telephone 1 to continuously authenticate the counterpart apparatus 1 or 2. Namely, the mobile telephone 1 can continuously perform the operation of authenticating the authentication apparatus 2, and the authentication apparatus 2 can continuously perform the operation of authenticating the mobile telephone 1. For example, the present embodiment is quite effective if being applied to the wireless device monitoring system including the mobile telephone 1 and the authentication apparatus 2 as stated in each of the preceding embodiments. The mobile telephone 1 can always keep the authentication apparatus 2 in an authenticated state, and the authentication apparatus 2 can always keep the mobile telephone 1 in an authenticated state. Then, each of the apparatuses 1 and 2 can make a judgment such as instantly ringing a buzzer for alarm or limiting the functions of the mobile telephone 1 when either the apparatus 1 or 2 is not in the authenticated state and turns into an unauthenticated state.

As shown in FIG. 29, in the present embodiment, the mobile telephone 1 and the authentication apparatus 2 transmit the first challenge telegram signal and the second challenge telegram signal, respectively. In this case, wireless transceiver circuits 16 and 26 of the mobile telephone 1 and the authentication apparatus 2 execute transmission and receiving processings in synchronous with each other. Then, the mobile telephone 1 and the authentication apparatus 2 encrypt authentication codes of the received second and first challenge telegram signals using a predetermined encryption key, to create first and second response codes and dividing the first and second response codes by, for example, 8 to create divided codes, respectively. The mobile telephone 1 and the authentication apparatus 2 intermittently transmit the divided codes, respectively.

The encryption key data for creating the first and second response codes from the first and second challenge codes may be either identical to or different from that used by encryption units 11d and 21d shown in FIG. 1. Moreover, the encryption methods may be different between the first challenge code and the second challenge code.

As stated so far, according to the fifth embodiment, because each of the mobile telephone 1 and the authentication apparatus 2 transmits and receives the challenge code and the response code, each of the mobile telephone 1 and the authentication apparatus 2 can advantageously and continuously authenticate the counterpart apparatus 1 or 2.

Sixth Embodiment

Figure 33:
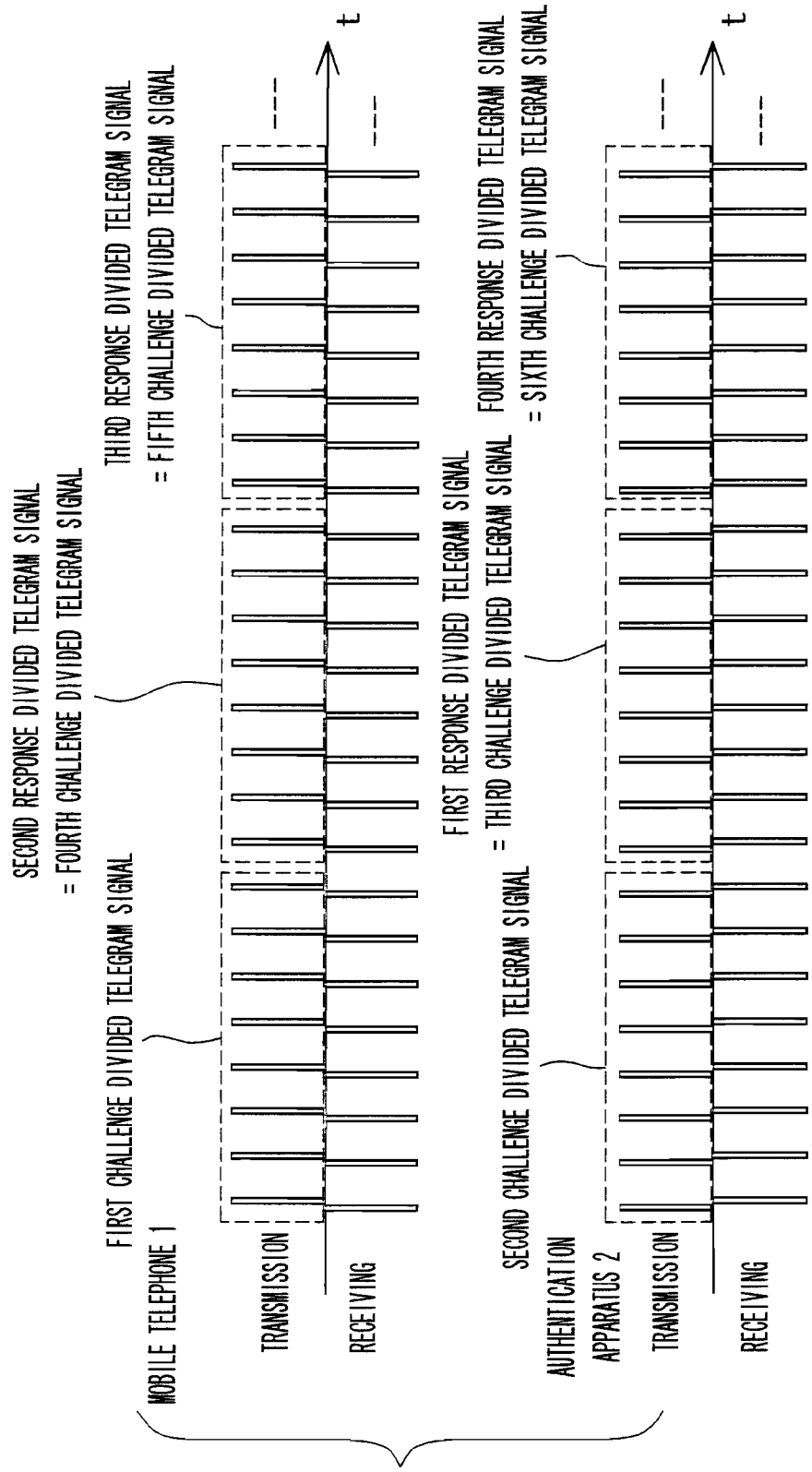
FIG. 33 is a timing chart showing a communication procedure between a mobile telephone 1 and an authentication apparatus 2 for use in a wireless device monitoring system according to a sixth embodiment of the present invention.
Figure 34:
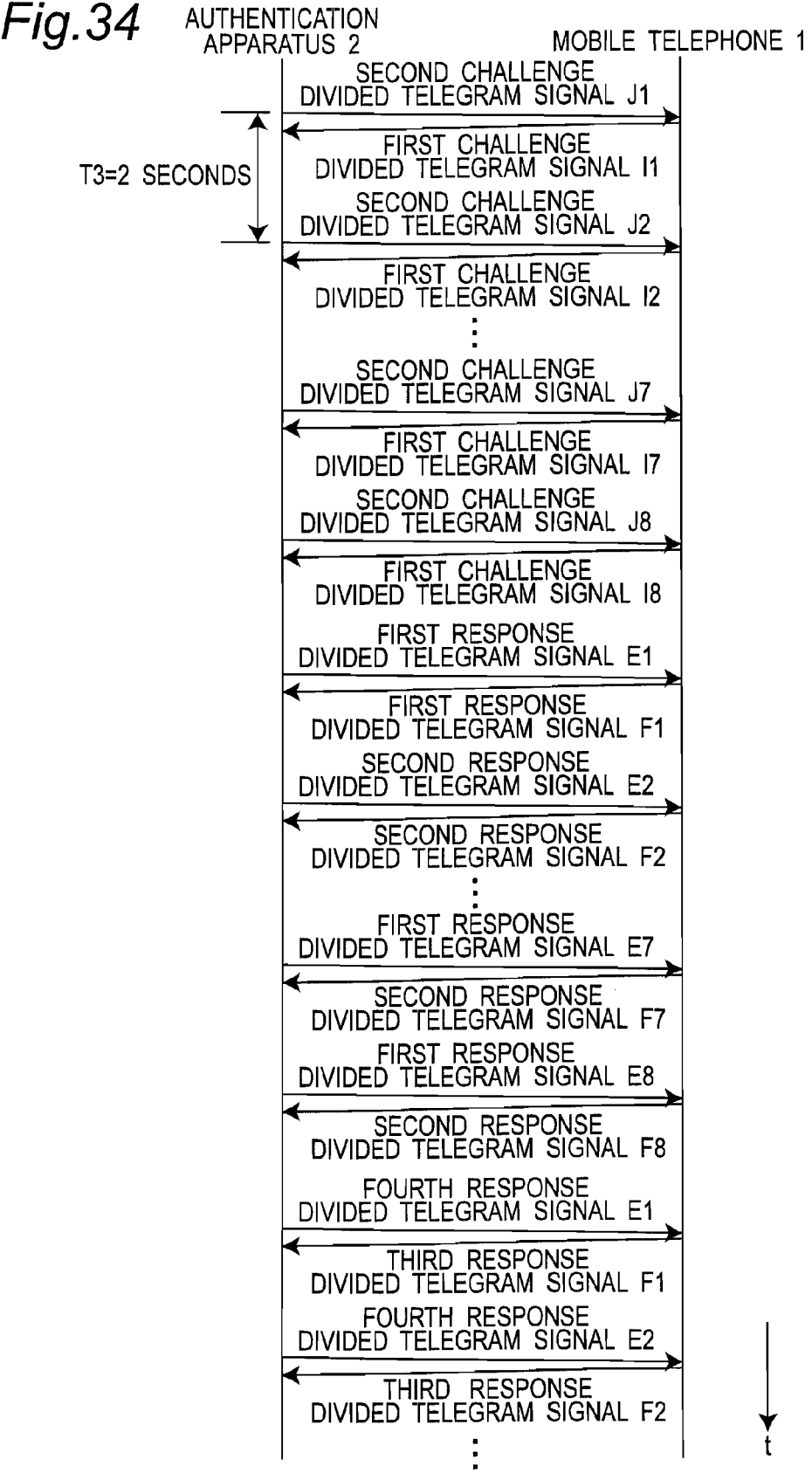
FIG. 34 is a sequence diagram showing a procedure of the communication between the mobile telephone 1 and the authentication apparatus 2 shown in FIG. 33.

FIG. 33 is a timing chart showing a communication procedure between a mobile telephone 1 and an authentication apparatus 2 for use in a wireless device monitoring system according to a sixth embodiment of the present invention. FIG. 34 is a sequence diagram showing a procedure of the communication between the mobile telephone 1 and the authentication apparatus 2 shown in FIG. 33. The wireless device monitoring system according to the sixth embodiment is similar in apparatus configuration to that shown in FIG. 1, and each of the mobile telephone 1 and the authentication apparatus 2 authenticates the counterpart apparatus 1 or 2 as in the fifth embodiment. The wireless device monitoring system according to the sixth embodiment differs in configuration of the challenge telegram signal from that according to the fourth embodiment. Concretely, as shown in FIG. 33, in the present embodiment, each of the apparatuses 1 and 2 does not transmit a challenge telegram but regards a response telegram transmitted from the counterpart apparatus 1 or 2 as a challenge telegram, and uses a telegram obtained by encrypting the response telegram as a next response telegram. Both of the challenge telegram and the response telegram are divided, to shorten the communication time and suppressing the power consumption. Namely, in the present embodiment, each of the mobile telephone 1 and the authentication apparatus 2 can continuously authenticate the counterpart apparatus 1 or 2, and the power consumption caused by the wireless communication can be suppressed. As compared with the preceding fifth embodiment, it is possible to dispense with the wireless communication of transmitting and receiving the challenge code, and then, this makes it possible to further reduce the power consumption.

Referring to FIGS. 33 and 34, the communication procedure will be described. First of all, the mobile telephone 1 and the authentication apparatus 2 intermittently transmit first and second challenge divided telegram signals including divided challenge codes to the counterpart apparatuses 1 and 2, respectively. At this time, the apparatuses 1 and 2 receive the first and second challenge divided telegram signals in synchronous with each other, detect a distance between the apparatuses 1 and 2, and receive data of the telegram signals transmitted from the counterpart apparatuses 1 and 2.

Next, the mobile telephone 1 and the authentication apparatus 2 combines eight divided codes in the received second and first challenge divided telegram signals to create challenge codes, create second and first response codes using predetermined encryption key data based on the created challenge codes, divide the second and first response code by, for example, 8 to each create eight divided codes, and create second and first response divided telegram signals including the divided codes, respectively. As shown in FIGS. 33 and 34, the mobile telephone 1 and the authentication apparatus 2 intermittently transmit the second and first response divided telegram signals and the apparatuses 2 and 1 receive the second and first response divided telegram signals, respectively. Each of the mobile telephone 1 and the authentication apparatus 2 combines the eight divided codes in the received first or second response divided telegram signals to create the first or second response code, decodes the first or second response code using predetermined decoding key data. Then, each of the mobile telephone 1 and the authentication apparatus 2 compares the decoded first or second response code with a correct first or second response code stored in each of the mobile telephone 1 and the authentication apparatus 2, to authenticate the counterpart apparatus 1 or 2. The mobile telephone 1 and the authentication apparatus 2 regard the received first and second response codes as third and fourth challenge codes, and encrypt the third and fourth challenge codes using the encryption key data, to create the third and fourth response codes, respectively. The mobile telephone 1 and the authentication apparatus 2 divide the third and fourth response codes each into eight divided codes, and intermittently transmit the divided codes, respectively.

Therefore, as shown in FIG. 33, in the present embodiment, second response divided telegram signals transmitted from the mobile telephone 1 become fourth challenge divided telegram signals, first response divided telegram signals transmitted from the authentication apparatus 2 become third challenge divided telegram signals. Moreover, third response divided telegram signals transmitted from the mobile telephone 1 become fifth challenge divided telegram signals, fourth response divided telegram signals transmitted from the authentication apparatus 2 become sixth challenge divided telegram signals.

Figure 35:
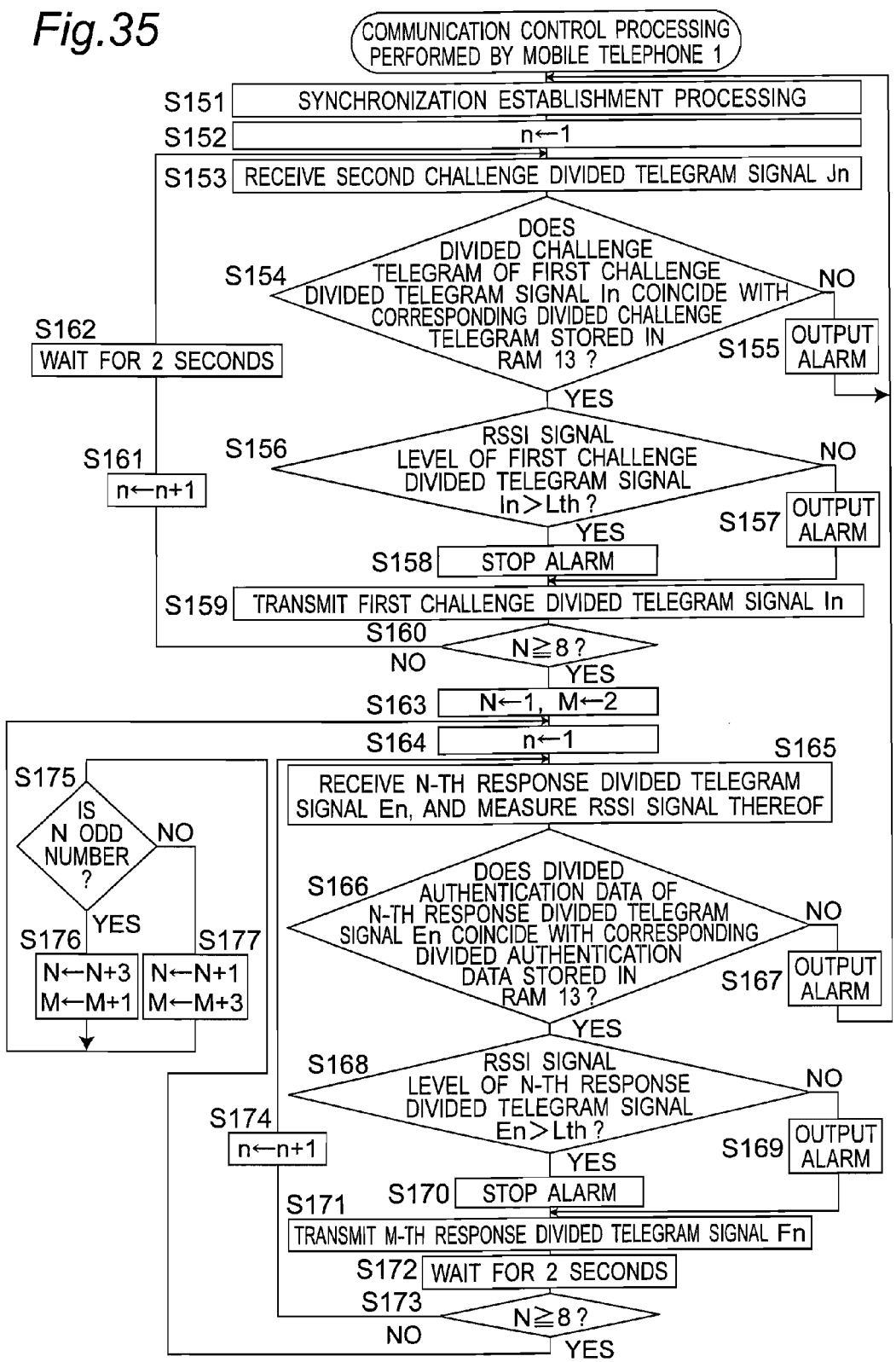
FIG. 35 is a flowchart showing a communication control processing performed by the controller 20 of the mobile telephone 1 according to the sixth embodiment.

FIG. 35 is a flowchart showing a communication control processing performed by the controller 20 of the mobile telephone 1 according to the sixth embodiment.

In the communication control processing performed by the mobile telephone 1 shown in FIG. 35, the mobile telephone 1, first, performs a synchronization establishment processing in step S151, resets a parameter "n" to one in step S152, receives the second challenge divided telegram signal Jn in step S153, and judges whether or not a divided challenge telegram of the first divided challenge telegram signal. In coincides with a corresponding divided challenge telegram in a RAM 13 in step S154. If the judgment result is YES, the processing goes to step S156. On the other hand, if NO, the processing goes to step S155. After the mobile telephone 1 outputs an alarm in step S155, the processing returns to step S151. On the other hand, the mobile telephone 1 judges whether or not the RSSI signal level of the first challenge divided telegram signal In exceeds a predetermined threshold value Lth in step S156. If the judgment result is YES, the processing goes to step S158. On the other hand, if NO, the processing goes to step S157. The mobile telephone 1 outputs an alarm in step S157, and the processing then goes to step S159. The mobile telephone 1 stops the alarm in step S158, transmits the first challenge divided telegram signal In in step S159, and judges whether or not the parameter "n" is equal to or larger than eight in step S160. If the judgment result is YES, the processing goes to step S163. On the other hand, if NO, the processing goes to step S161. The mobile telephone 1 increments the parameter "n" by one in step S161, waits for two seconds in step S162, and goes to step S153.

Next, the mobile telephone 1 resets a parameter "n" to one and resets a parameter "M" to two in step S163, resets the parameter "n" to one in step S164, and then, receives an N-th response divided telegram signal En, and measures the RSSI signal level thereof in step S165. Further, the mobile telephone 1 judges whether or not divided authentication data of the N-th response divided telegram signal En coincides with corresponding divided authentication data stored in the RAM 13 in step S166. If the judgment result is YES, the processing goes to step S168. On the other hand, if NO, the processing goes to step S167. The mobile telephone 1 outputs an alarm in step S167, and the processing returns to step S151. The mobile telephone 1 judges whether or not the RSSI signal level of the N-th response divided telegram signal En exceeds the predetermined threshold value Lth in step S168. If the judgment result is YES, the processing goes to step S170. On the other hand, if NO, the processing goes to step S169. After the mobile telephone 1 outputs an alarm in step S169, the processing goes to step S171. The mobile telephone 1 stops the alarm in step S170, transmits an M-th response divided telegram signal Fn in step S171, waits for two seconds in step S172, and judges whether or not the parameter "n" is equal to or larger than eight in step S173. If the judgment result is YES, the processing goes to step S175. On the other hand, if NO, the processing goes to step S174. The mobile telephone 1 increments the parameter "n" by one in step S174, and the processing returns to step S165. The mobile telephone 1 judges whether or not the parameter "n" is odd in step S175. If the judgment result is YES, the processing goes to step S176. On the other hand, if NO, the processing goes to step S177. After the mobile telephone 1 substitutes an addition result obtained by adding three to the parameter "n", into the parameter "n" in step S176, the processing returns to step S164. On the other hand, after the mobile telephone 1 substitutes an addition result obtained by adding one to the parameter "M", into the parameter "M" in step S177, the processing returns to step S164.

Figure 36:
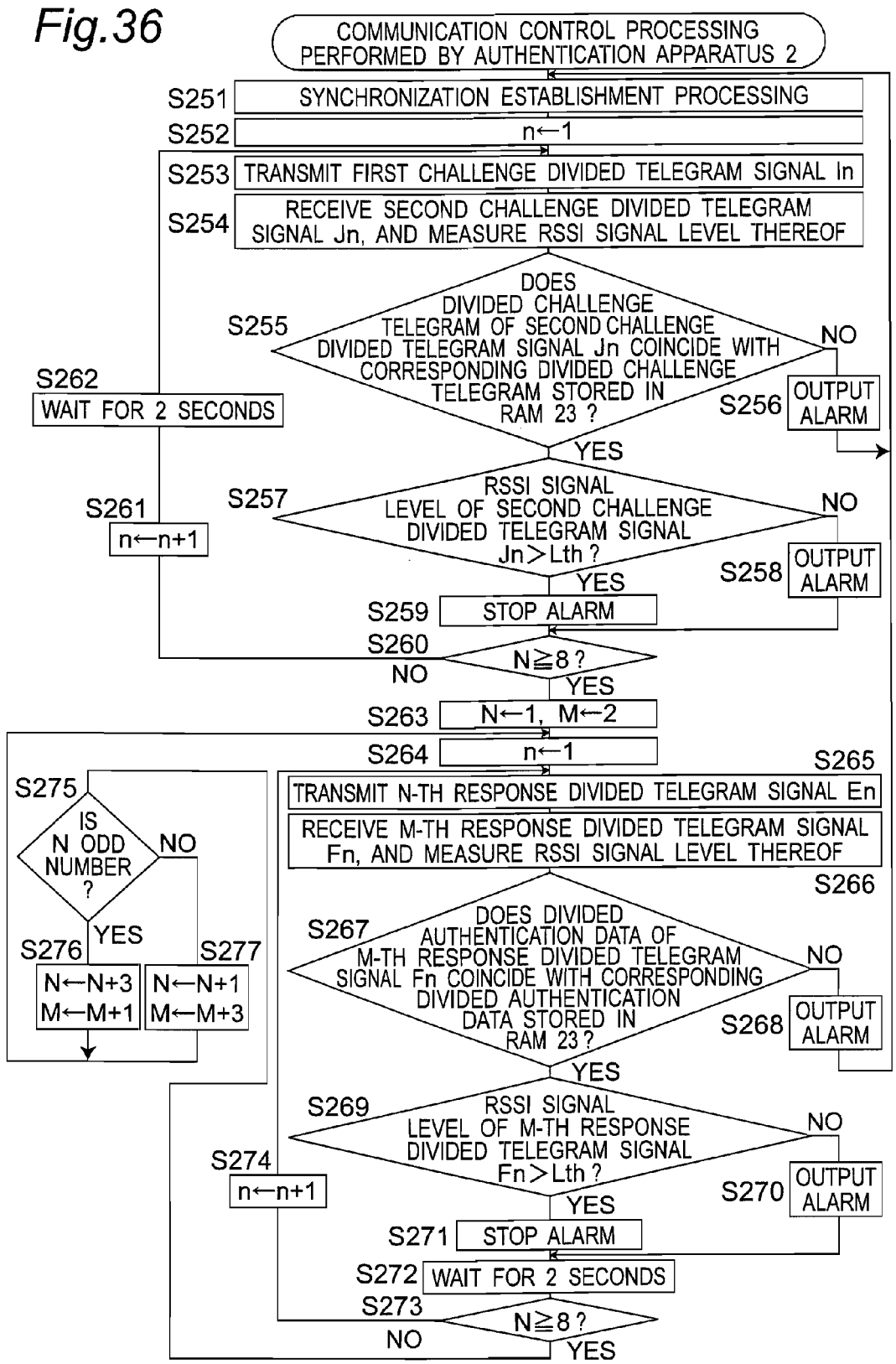
FIG. 36 is a flowchart showing a communication control processing performed by the controller 20 of the authentication apparatus 2 according to the sixth embodiment.

FIG. 36 is a flowchart showing a communication control processing performed by the controller 20 of the authentication apparatus 2 according to the sixth embodiment.

In the communication control processing performed by the authentication apparatus 2 shown in FIG. 36, the authentication apparatus 2, first, performs a synchronization establishment processing in step S251, resets the parameter "n" to one in step S252, and transmits the first challenge divided telegram signal In in step S253. Then, the authentication apparatus 2 receives the second challenge divided telegram signal Jn, and measures the RSSI signal level thereof in step S254. Then the authentication apparatus 2 judges whether or not a divided challenge telegram of the second divided challenge telegram signal Jn coincides with a corresponding divided challenge telegram in a RAM 23 in step S255. If the judgment result is YES, the processing goes to step S257. On the other hand, if NO, the processing goes to step S256. The authentication apparatus 2 outputs an alarm in step S256, and the processing then returns to step S251. On the other hand, the authentication apparatus 2 judges whether or not the RSSI signal level of the second challenge divided telegram signal Jn exceeds the predetermined threshold value Lth in step S257. If the judgment result is YES, the processing goes to step S259. On the other hand, if NO, the processing goes to step S258. After the authentication apparatus 2 outputs an alarm in step S258, the processing goes to step S260. The authentication apparatus 2 stops the alarm in step S259, and judges whether or not the parameter "n" is equal to or larger than eight in step S260. If the judgment result is YES, the processing goes to step S263. On the other hand, if NO, the processing goes to step S261. The authentication apparatus 2 increments the parameter "n" by one in step S261, waits for two seconds in step S262, and goes to step S253.

Next, the authentication apparatus 2 resets the parameter "N" to one and resets the parameter "M" to two in step S263, resets the parameter "n" to one in step S264, transmits the N-th response divided telegram signal En in step S265, and then, receives an M-th response divided telegram signal Fn and measures the RSSI signal level thereof in step S266. Further, the authentication apparatus 2 judges whether or not divided authentication data of the M-th response divided telegram signal Fn coincides with corresponding divided authentication data stored in the RAM 23 in step S267. If the judgment result is YES, the processing goes to step S269. On the other hand, if NO, the processing goes to step S268. After the authentication apparatus 2 outputs an alarm in step S268, the processing returns to step S251. The authentication apparatus 2 judges whether or not the RSSI signal level of the M-th response divided telegram signal Fn exceeds the predetermined threshold value Lth in step S269. If the judgment result is YES, the processing goes to step S271. On the other hand, if NO, the processing goes to step S270. The authentication apparatus 2 outputs an alarm in step S270, the processing goes to step S272. On the other hand, the authentication apparatus 2 stops the alarm in step S271, waits for two seconds in step S272, and judges whether or not the parameter "n" is equal to or larger than eight in step S273. If the judgment result is YES, the processing goes to step S275. On the other hand, if NO, the processing goes to step S274. After the authentication apparatus 2 increments the parameter "n" by one in step S274, the processing goes to step S265. The authentication apparatus 2 judges whether or not the parameter "n" is odd in step S275. If the judgment result is YES, the processing goes to step S276. On the other hand, if NO, the processing goes to step S277. After the authentication apparatus 2 substitutes an addition result obtained by adding three to the parameter "n", into the parameter "n" in step S276, the processing returns to step S264. On the other hand, after the authentication apparatus 2 substitutes an addition result obtained by adding one to the parameter "M", into the parameter "M" in step S277, the processing returns to step S264.

According to the sixth embodiment configured as stated above, the communication procedure is repeated, and continuously performs the authentication of the counterpart apparatus 1 or 2 and detection of the distance to the counterpart apparatus 1 or 2. As stated above, by using each response code as the next challenge code, communication time for transmitting the challenge code can be saved. Therefore, the power consumption can be further reduced.

Seventh Embodiment

Figure 37:
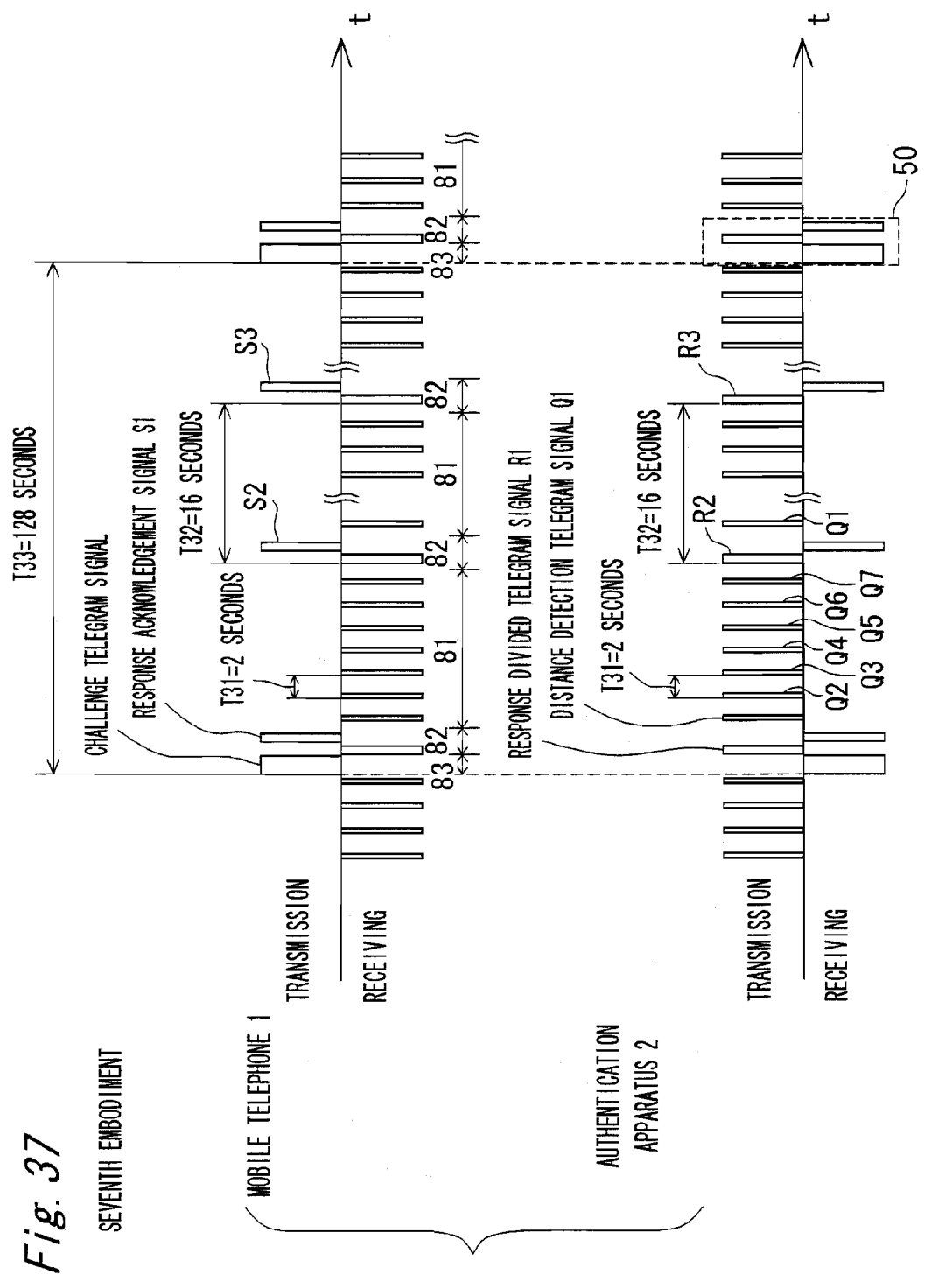
Figure 38:
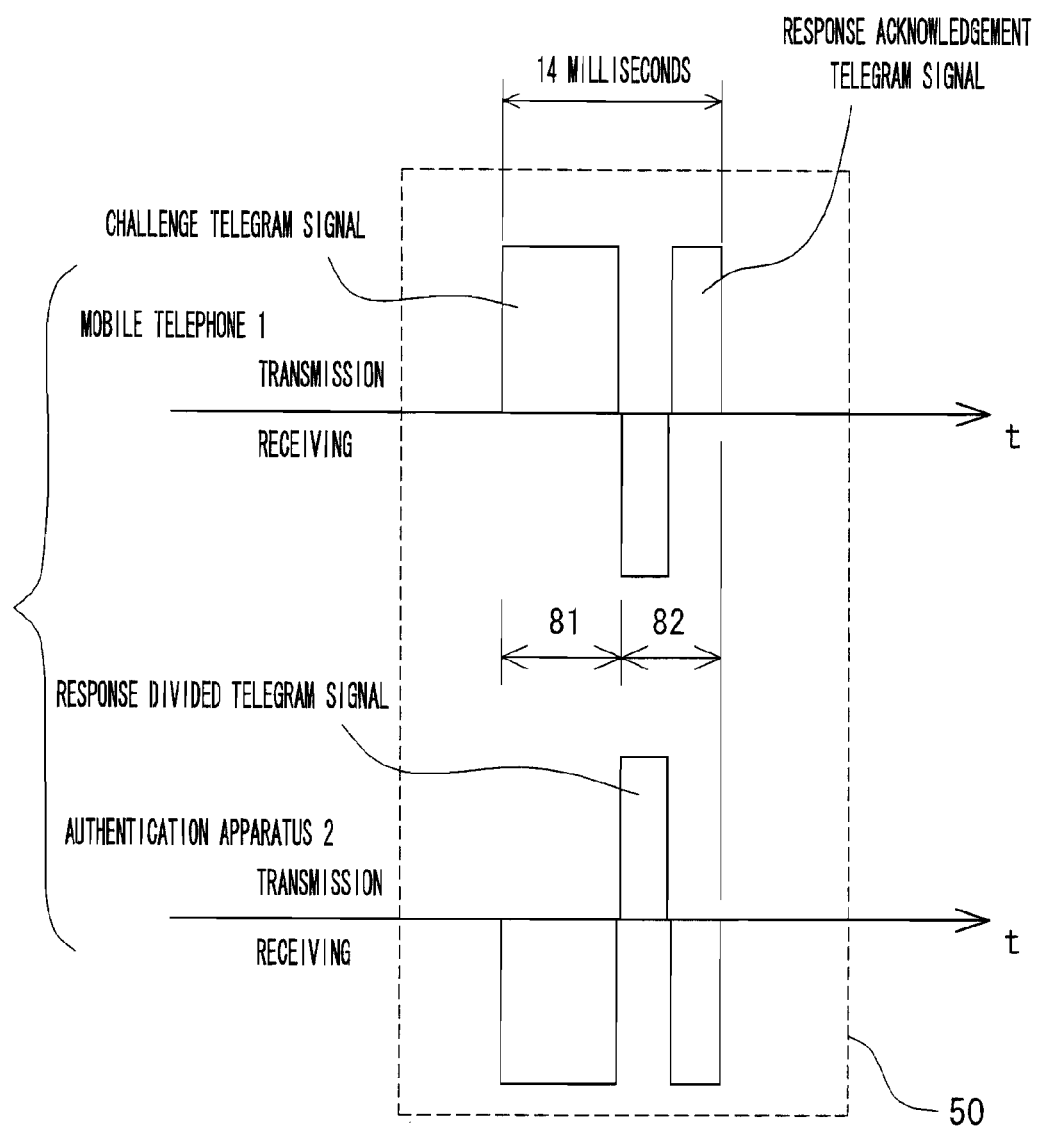
FIG. 38 is an enlarged view of a part 50 of the communication procedure shown in FIG. 37.
Figure 42:
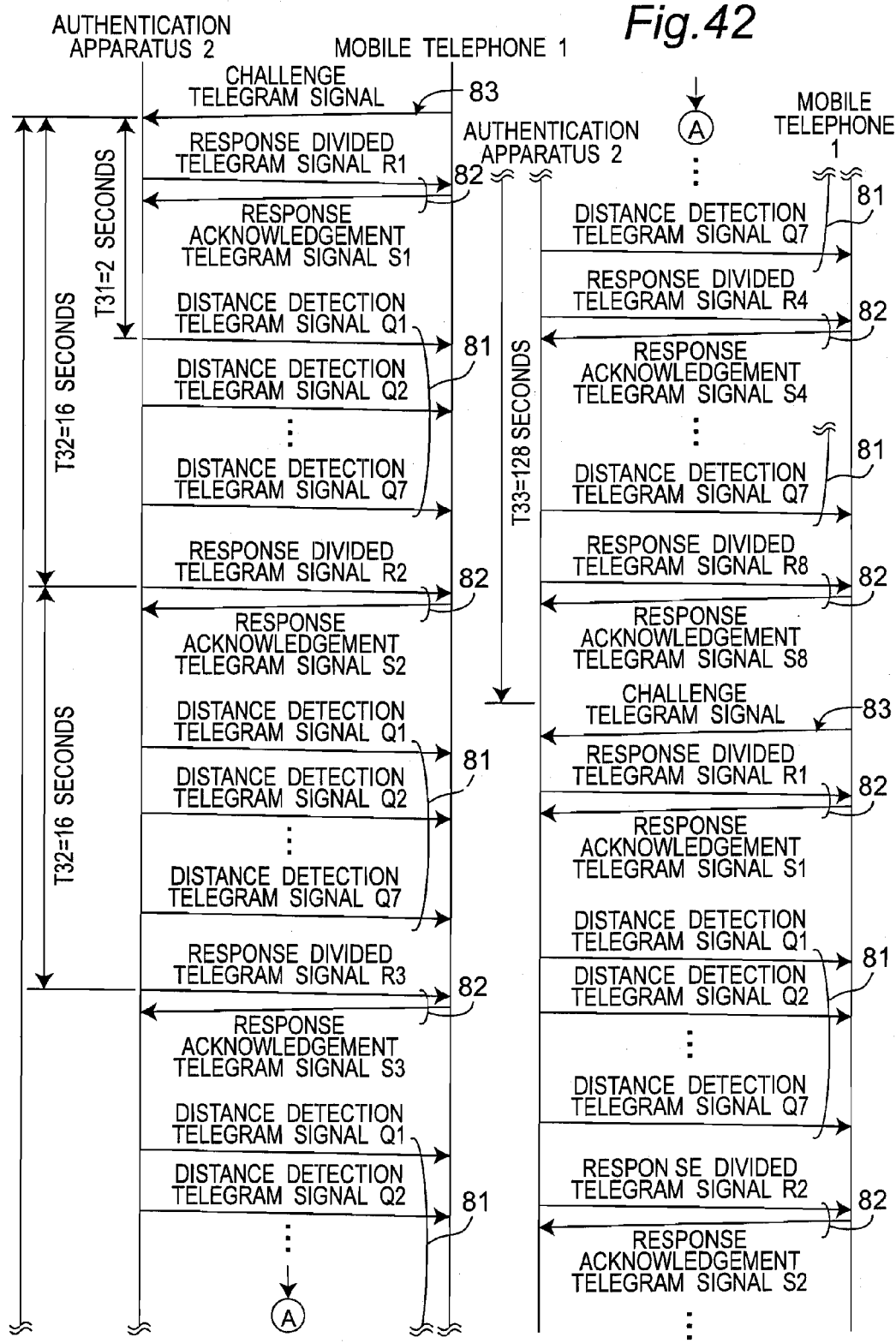
FIG. 42 is a sequence diagram showing the procedure of the communication between the mobile telephone 1 and the authentication apparatus 2 shown in FIG. 37.

FIG. 37 is a timing chart showing a communication procedure between a mobile telephone 1 and an authentication apparatus 2 for use in a wireless device monitoring system according to a seventh embodiment of the present invention. FIG. 38 is an enlarged view of a part 50 of the communication procedure shown in FIG. 37. FIG. 42 is a sequence diagram showing the procedure of the communication between the mobile telephone 1 and the authentication apparatus 2 shown in FIG. 37. The wireless device monitoring system according to the seventh embodiment is characterized as follows. The wireless device monitoring system according to the seventh embodiment is similar in apparatus configuration to that shown in FIG. 1. In addition, the wireless device monitoring system according to the seventh embodiment uses a combination of the communication procedure according to the second embodiment (FIG. 11) and one of the authentication and judgment procedures (the communication procedure for making the mobile telephone 1 to judge whether or not the authentication apparatus 2 is a true counterpart) in the communication procedure according to the fifth embodiment. The wireless device monitoring system according to the seventh embodiment in particular includes the following first to third communication procedures 81, 82, and 83, and can realize the largest reduction in the power consumption among the embodiments disclosed in the present specification.

Referring to FIGS. 37, 38, and 42, the first communication procedure 81 is a communication procedure for a distance detection communication for making the mobile telephone 1 to measure a distance to the authentication apparatus 2. The authentication apparatus 2 transmits short-time distance detection telegram signals to the mobile telephone 1 at time intervals of T31=2 seconds, to judge whether or not the mobile telephone 1 is within a predetermined distance. It is to be noted that creation and transmission of the distance detection telegram signals are identical with, for example, those of the distance detection telegram signal D1 according to the first or second embodiment.

Moreover, the second communication procedure 82 is a communication procedure for authentication, in which a response divided telegram signal Rn is transmitted from the authentication apparatus 2, and in which a response acknowledgment telegram signal Sn is transmitted from the mobile telephone 1 in response to the response divided telegram signal Rn (where n=1, 2, ..., 8). This second communication procedure 82 is executed at time intervals of T32=16 seconds. It is to be noted that creation and transmission of the response divided telegram signal Rn and the response acknowledgment telegram signal Sn are identical with, for example, those according to the fifth embodiment.

Furthermore, the third communication procedure 83 is a communication procedure for receiving a challenge telegram signal including a challenge telegram transmitted from the mobile telephone 1 to the authentication apparatus 2, and is executed at time intervals of T33=128 seconds. It takes 128 seconds to execute these communication procedures once. It is to be noted that creation and transmission of the challenge telegram signal are identical with, for example, those according to the fifth embodiment.

In the present embodiment, authentication communication can be done with the power consumption reduced to about one-24th of that if the authentication communication is done at intervals of two seconds, so that the authentication communication can be realized with a quite lower power consumption. Further, because it is possible to determine and detect that the counterpart apparatus is away from the apparatus within two seconds, and that the counterpart apparatus is not a true counterpart apparatus within 16 seconds, it is possible to maintain high security strength.

Figure 39:
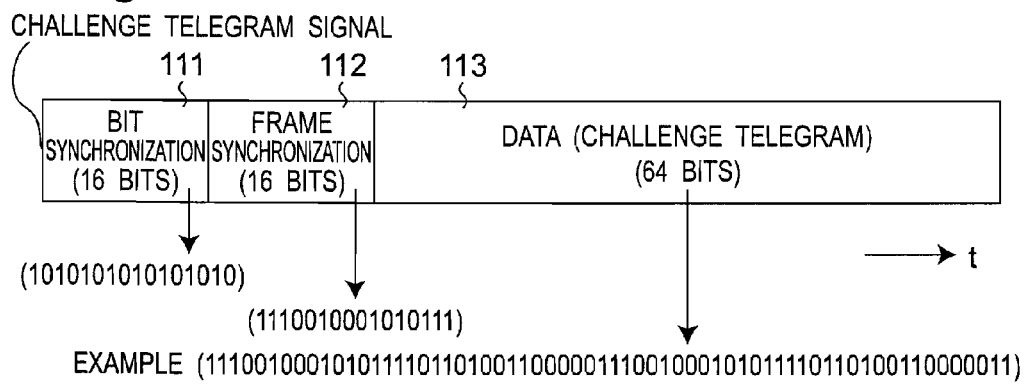
FIG. 39 is a diagram showing a signal format of a challenge telegram signal as used in the procedure of the communication between the mobile telephone 1 and the authentication apparatus 2 shown in FIG. 37.

FIG. 39 is a diagram showing a signal format of the challenge telegram signal as used in the procedure of the communication between the mobile telephone 1 and the authentication apparatus 2 shown in FIG. 37. Referring to FIG. 39, the challenge telegram signal is configured to include data of bit synchronization (16 bits) 111, data of frame synchronization (16 bits) 112, and data including the challenge telegram (64 bits) 113.

Figure 40:
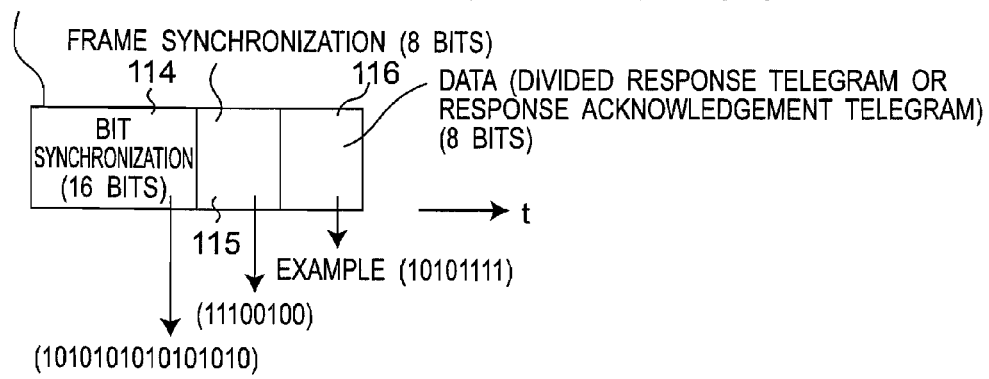
FIG. 40 is a diagram showing signal formats of response divided telegram signals R1 to R8 and response acknowledgement telegram signals S1 to S8 as used in the procedure of the communication between the mobile telephone 1 and the authentication apparatus 2 shown in FIG. 37.

FIG. 40 is a diagram showing signal formats of response divided telegram signals R1 to R8 and response acknowledgement telegram signals S1 to S8 as used in the procedure of the communication between the mobile telephone 1 and the authentication apparatus 2 shown in FIG. 37. Referring to FIG. 40, each of the response divided telegram signals R1 to R8 and the response acknowledgement telegram signals S1 to S8 is configured to include data of bit synchronization (16 bits) 114, data of frame synchronization (8 bits) 115, and data including either a divided response telegram or a response acknowledgment telegram (8 bits) 116.

Figure 41:
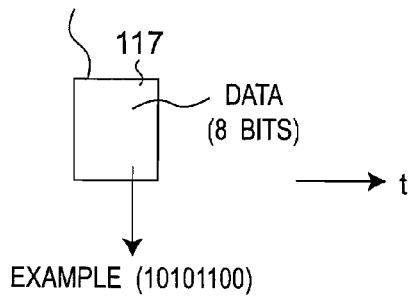
FIG. 41 is a diagram showing signal formats of distance detection telegram signals Q1 to Q7 as used in the procedure of the communication between the mobile telephone 1 and the authentication apparatus 2 shown in FIG. 37.

FIG. 41 is a diagram showing signal formats of response distance detection telegram signals Q1 to Q7 as used in the procedure of the communication between the mobile telephone 1 and the authentication apparatus 2 shown in FIG. 37. Referring to FIG. 41, each of the response distance detection telegram signals Q1 to Q7 is configured to include only data (8 bits).

Figure 43:
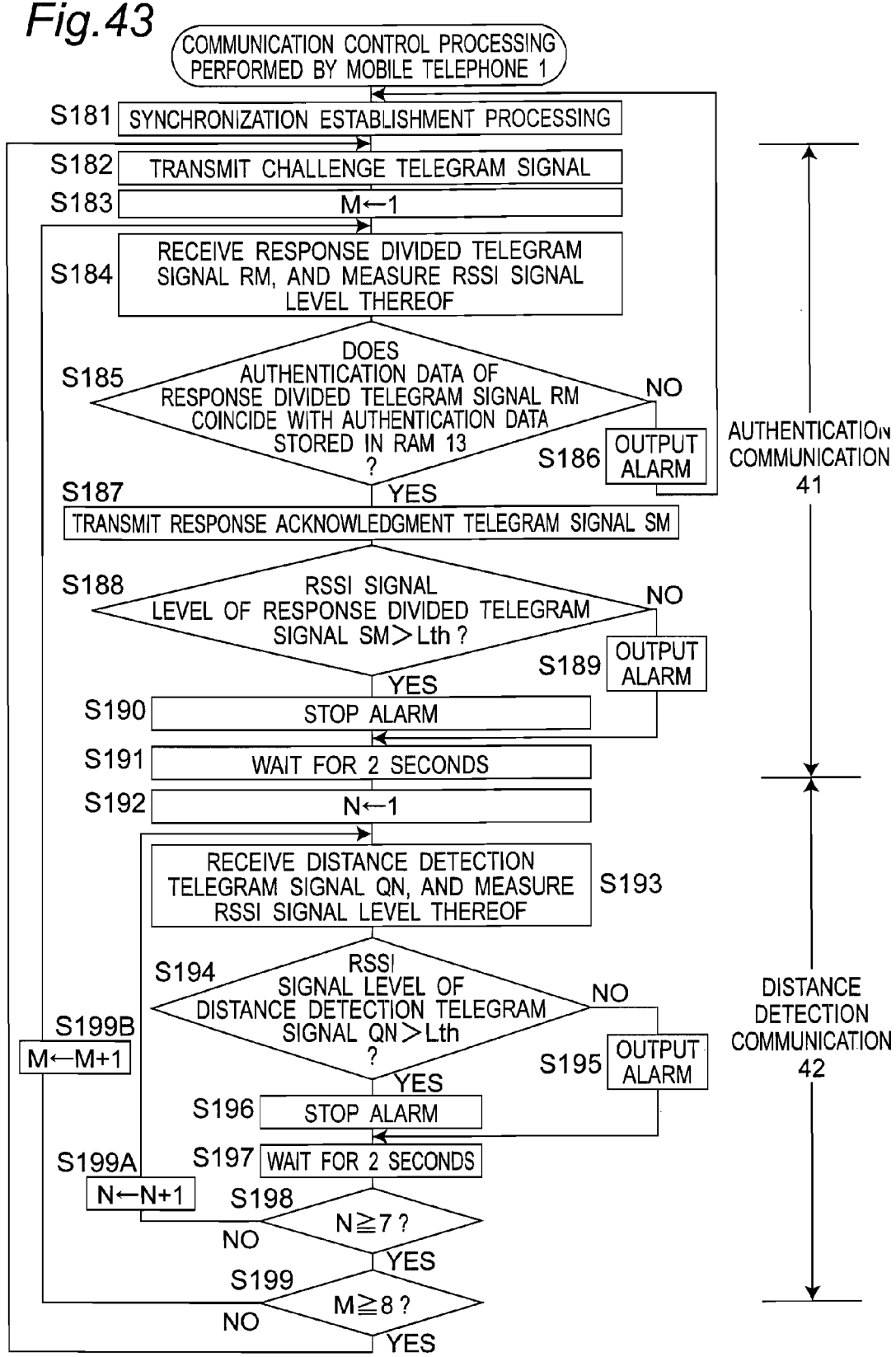
FIG. 43 is a flowchart showing a communication control processing performed by the controller 20 of the mobile telephone 1 according to the seventh embodiment.

FIG. 43 is a flowchart showing a communication control processing performed by the controller 20 of the mobile telephone 1 according to the seventh embodiment.

In the communication control processing performed by the mobile telephone 1 shown in FIG. 43, first of all, the mobile telephone 1 performs a synchronization establishment processing in step S181, transmits a challenge telegram signal in step S182, resets a parameter "M" to one in step S183, then receives a response divided telegram signal RM and measures the RSSI signal level thereof in step S184. Next, the mobile telephone 1 judges whether or not authentication data of the response divided telegram signal RM coincides with corresponding authentication data in a RAM 13 in step S185. If the judgment result is YES, the processing goes to step S187. On the other hand, if NO, the processing goes to step S186. The mobile telephone 1 outputs an alarm in step S186, and the processing returns to step S181. On the other hand, the mobile telephone 1 transmits a response acknowledgment telegram signal SM in step S187, and judges whether or not the RSSI signal level of the response acknowledgment telegram signal SM exceeds a predetermined threshold value Lth in step S188. If the judgment result is YES, the processing goes to step S190. On the other hand, if NO, the processing goes to step S189. The mobile telephone 1 outputs an alarm in step S189, and the processing then goes to step S191. On the other hand, the mobile telephone 1 stops the alarm in step S190, waits for two seconds in step S191, and goes to step S192.

Next, the mobile telephone 1 resets a parameter "n" to one in step S192, receives a distance detection telegram signal QN, and measures the RSSI signal level thereof in step S193. Then the mobile telephone 1 judges whether or not the RSSI signal level of the distance detection telegram signal QN exceeds the predetermined threshold Lth in step S194. If the judgment result is YES, the processing goes to step S196. On the other hand, if NO, the processing goes to step S195. The mobile telephone 1 outputs an alarm in step S195, and the processing returns to step S197. On the other hand, the mobile telephone 1 stops the alarm in step S196, waits for two seconds in step S197, and judges whether or not the parameter "n" is equal to or larger than seven in step S198. If the judgment result is YES, the processing goes to step S199. On the other hand, if NO, the processing goes to step S199A. Furthermore, the mobile telephone 1 judges whether or not the parameter "M" is equal to or larger than eight at the step S199. If the judgment result is YES, the processing returns to step S182. On the other hand, if NO, the processing goes to step S199B. The mobile telephone 1 increments the parameter "n" by one in step S199A, and the processing goes to step S193. The mobile telephone 1 increments the parameter "M" by one in step S199B, and the processing returns to step S184.

Figure 44:
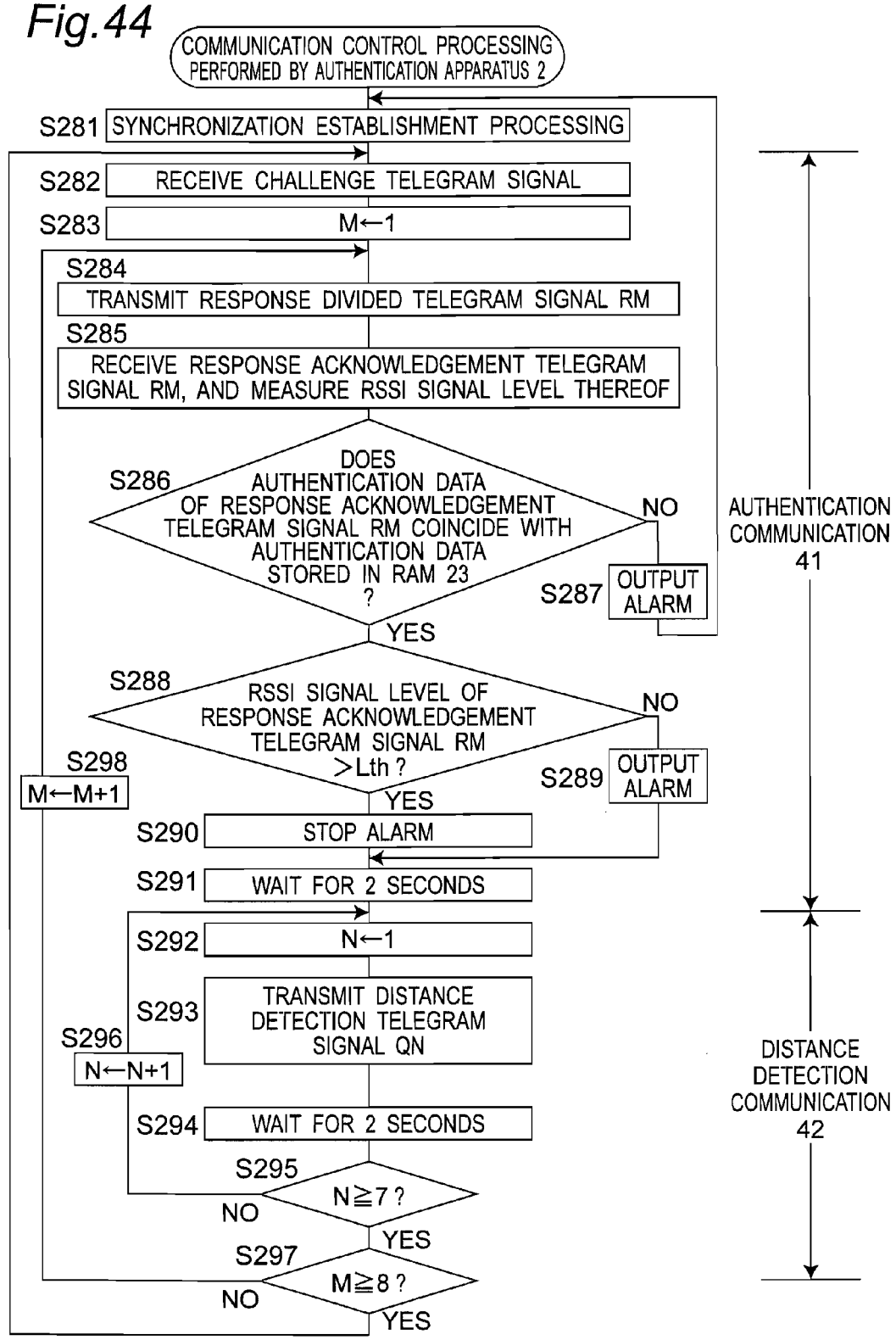
FIG. 44 is a flowchart showing a communication control processing performed by the controller 20 of the authentication apparatus 2 according to the seventh embodiment.

FIG. 44 is a flowchart showing a communication control processing performed by the controller 20 of the authentication apparatus 2 according to the seventh embodiment.

In the communication control processing performed by the authentication apparatus 2 shown in FIG. 44, the authentication apparatus 2, first, performs a synchronization establishment processing in step S281, receives a challenge telegram signal E in step S282, resets the parameter "M" to one in step S283, transmits the response divided telegram signal RM in step S284, and receives the response acknowledgement divided telegram signal RM and measures the RSSI signal level thereof in step S285. Next, the authentication apparatus 2 judges whether or not authentication data of the response acknowledgement divided telegram signal RM coincides with corresponding authentication data in a RAM 23 in step S286. If the judgment result is YES, the processing goes to step S288. On the other hand, if NO, the processing goes to step S287. The authentication apparatus 2 outputs an alarm in step S287, and the processing returns to step S281. On the other hand, the authentication apparatus 2 judges whether or not the RSSI signal level of the response acknowledgment telegram signal RM exceeds the predetermined threshold value Lth in step S288. If the judgment result is YES, the processing goes to step S290. On the other hand, if NO, the processing goes to step S289. The authentication apparatus 2 outputs an alarm in step S289, and the processing goes to step S291. On the other hand, the authentication apparatus 2 stops the alarm in step S290, waits for two seconds in step S291, and goes to step S292.

Next, the authentication apparatus 2 resets a parameter "n" to one in step S292, transmits the distance detection telegram signal QN in step S293, waits for two seconds in step S294, and judges whether or not the parameter "n" is equal to or larger than 7 in step S295. If the judgment result is YES, the processing goes to step S297. On the other hand, if NO, the processing goes to step S296. The authentication apparatus 2 increments the parameter "n" by one in step S296, and the processing goes to step S292. On the other hand, the authentication apparatus 2 judges whether or not the parameter "M" is equal to or larger than eight in step S297. If the judgment result is YES, the processing returns to step S282. On the other hand, if NO, the processing goes to step S298. The authentication apparatus 2 increments the parameter "M" by one in step S298, and the processing returns to step S284.

As stated so far, the communication procedure according to the second embodiment (FIG. 11) is combined with one of the authentication and judgment procedures (the communication procedure for making the mobile telephone 1 to judge whether or not the authentication apparatus 2 is a true counterpart) in the communication procedure according to the fifth embodiment, and the first to third communication procedures 81, 82, and 83 are in particular included. The power consumption can be thereby remarkably reduced. It is to be noted that communication is done without dividing the challenge telegram for the following reason. The challenge telegram is a random number and information on authentication of the counterpart apparatus cannot be acquired from a content of the telegram. Due to this, even if the telegram is divided, each of divided telegrams cannot be given its meaning. In addition, the apparatus operates only for distance detection based on the received electric field intensity level. That is why the challenge telegram is transmitted once without dividing the challenge telegram.

Eighth Embodiment

Figure 45:
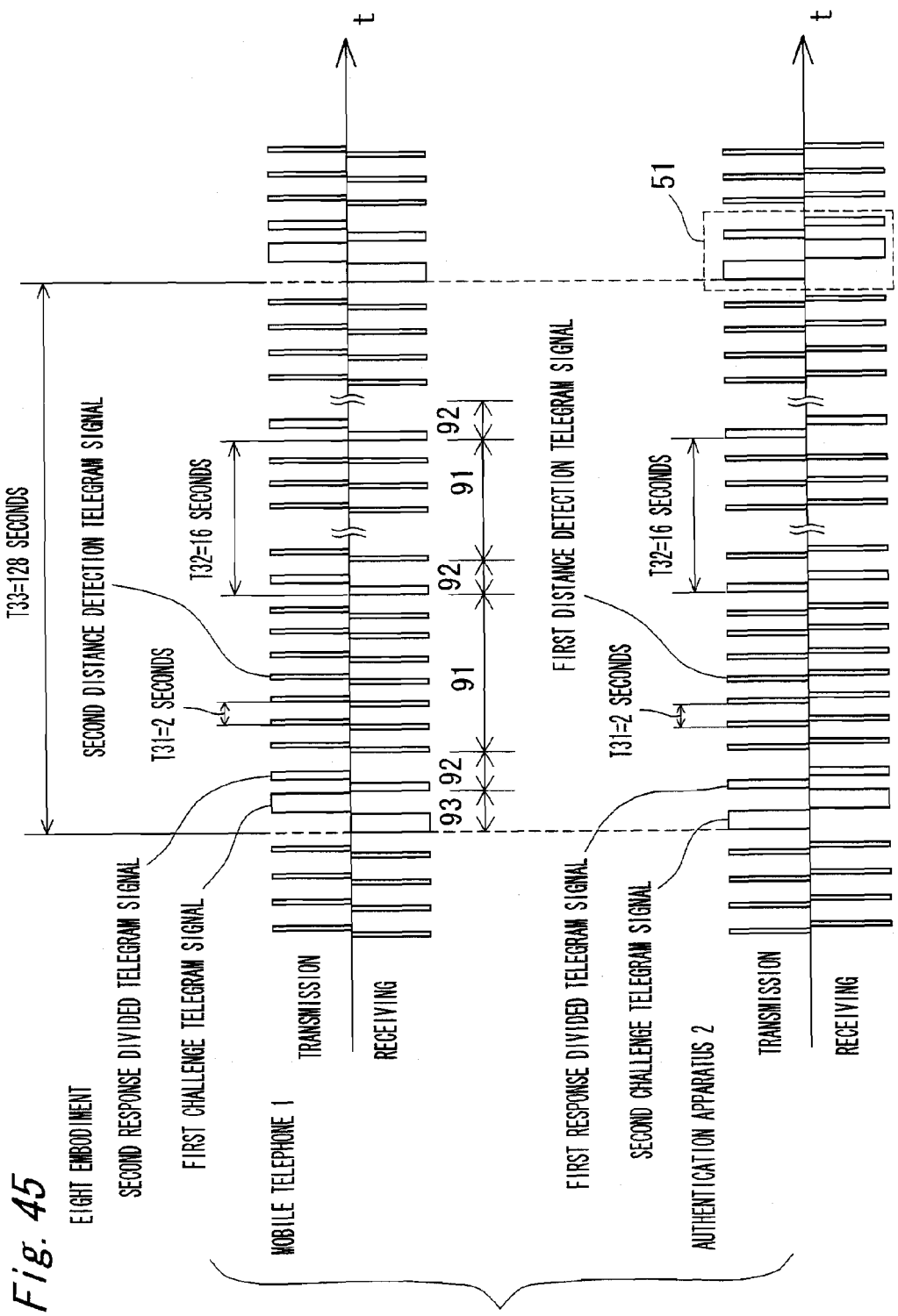
FIG. 45 is a timing chart showing a communication procedure between a mobile telephone 1 and an authentication apparatus 2 for use in a wireless device monitoring system according to an eighth embodiment of the present invention.
Figure 46:
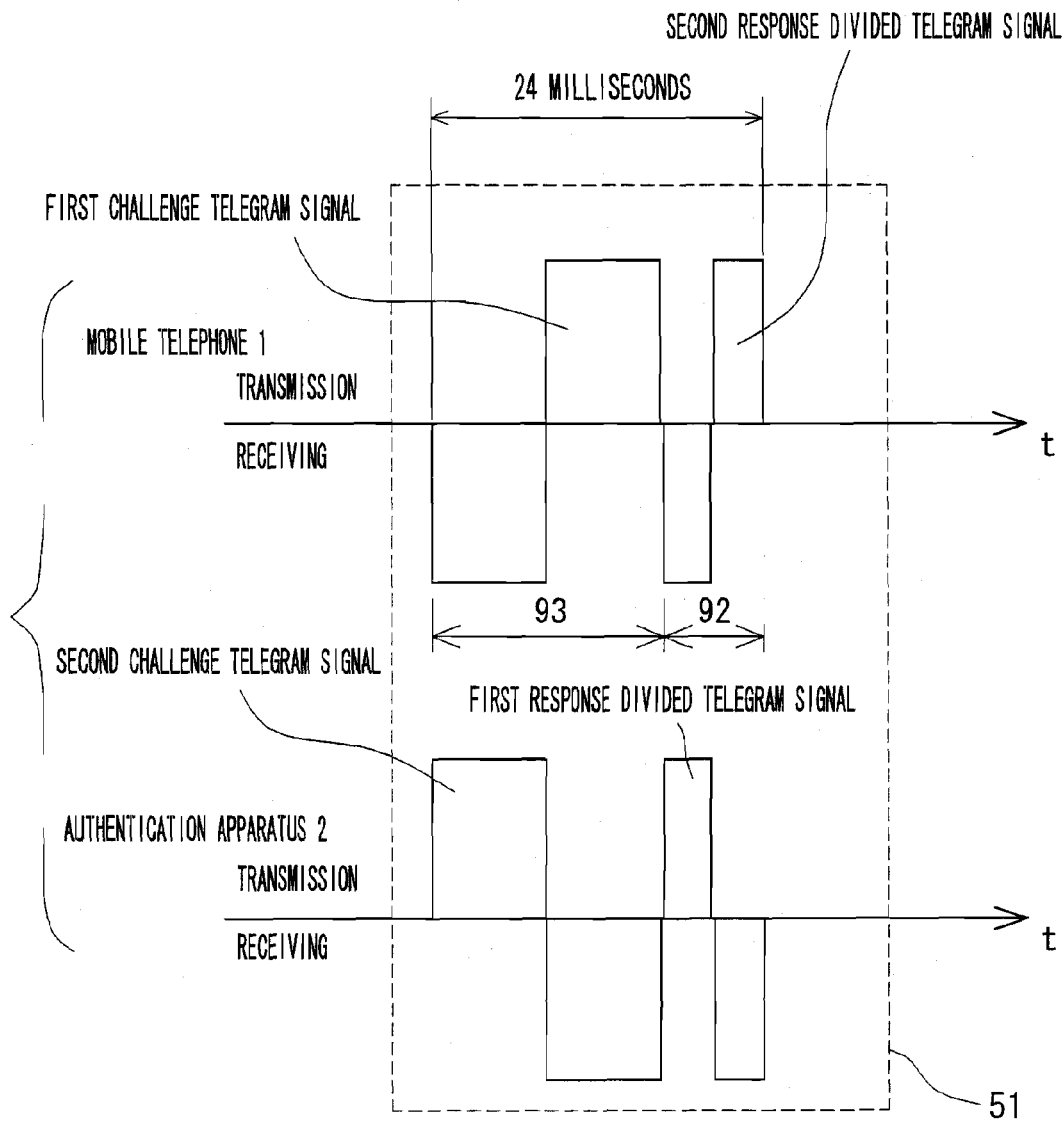
FIG. 46 is an enlarged view of a part 51 of the communication procedure shown in FIG. 45.
Figure 50:
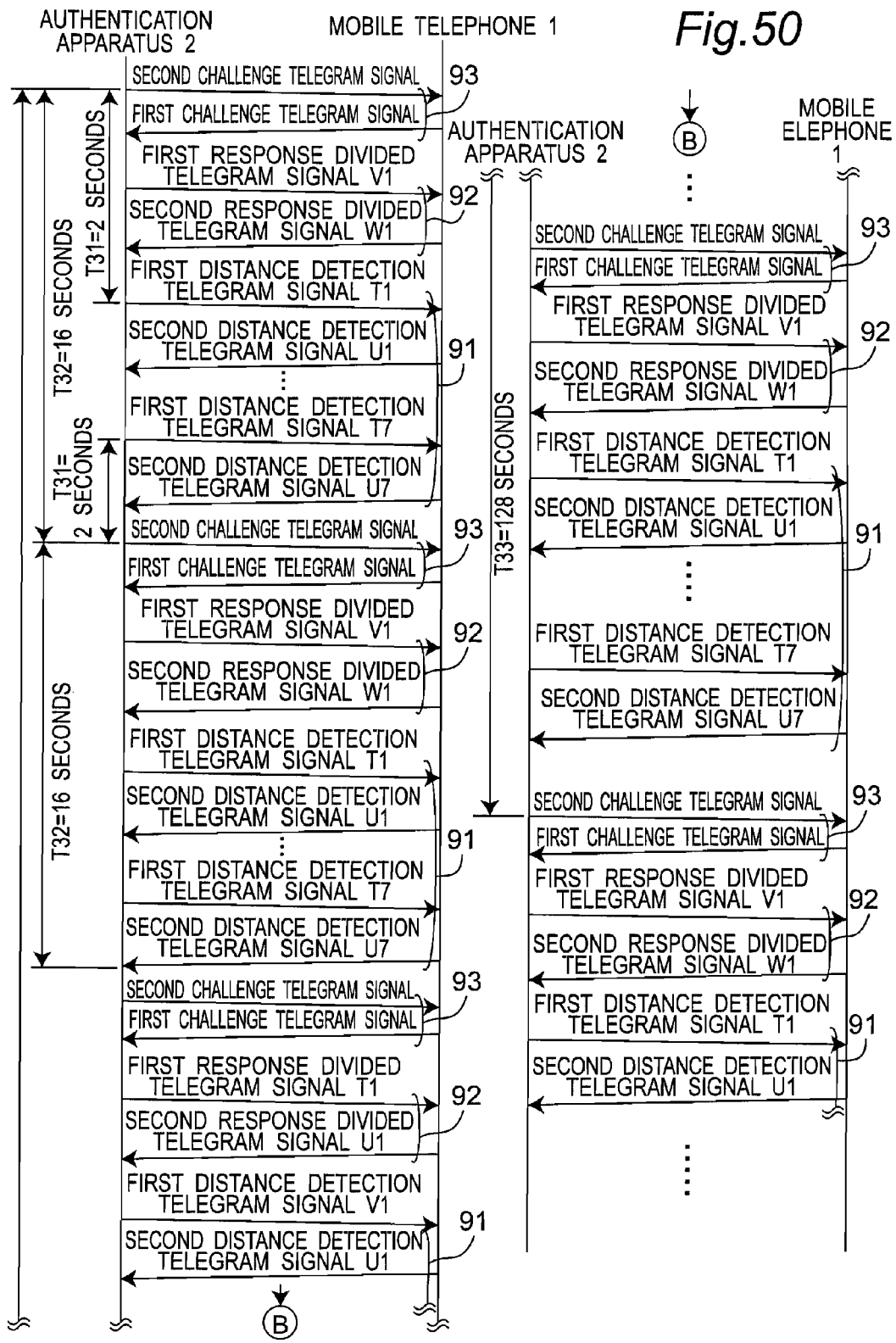
FIG. 50 is a sequence diagram showing the procedure of the communication between the mobile telephone 1 and the authentication apparatus 2 shown in FIG. 45.

FIG. 45 is a timing chart showing a communication procedure between a mobile telephone 1 and an authentication apparatus 2 for use in a wireless device monitoring system according to an eighth embodiment of the present invention. FIG. 46 is an enlarged view of a part 51 of the communication procedure shown in FIG. 45. FIG. 50 is a sequence diagram showing the procedure of the communication between the mobile telephone 1 and the authentication apparatus 2 shown in FIG. 45. The wireless device monitoring system according to the eighth embodiment is characterized as follows. The wireless device monitoring system according to the eighth embodiment is similar in apparatus configuration to that shown in FIG. 1. In addition, in the wireless device monitoring system according to the eighth embodiment, the first to third communication procedures 81, 82, and 83 according to the seventh embodiment are executed bidirectionally between the apparatuses 1 and 2. The power consumption can be thereby remarkably reduced. In this case, a communication procedure, in which the first communication procedure 81 is executed bidirectionally is denoted by the first communication procedure 91, a communication procedure, in which the second communication procedure 82 is executed bidirectionally is denoted by the second communication procedure 92, and a communication procedure in which the third communication procedure 83 is executed bidirectionally is denoted by the third communication procedure 93. The first to third communication procedures 91, 92, and 93 are shown in FIGS. 45, 46, and 50.

Namely, referring to FIGS. 45, 46, and 50, the first communication procedure 91 includes a communication procedure for a distance detection communication for making the mobile telephone 1 to measure a distance to the authentication apparatus 2 and a communication procedure for a distance detection communication for making the authentication apparatus 2 to measure a distance to the mobile telephone 1. The authentication apparatus 2 transmits short-time distance detection telegram signals to the mobile telephone 1 at time intervals of T31=2 seconds, and the mobile telephone 1 transmits short-time distance detection telegram signals to the authentication apparatus 2 at time intervals of T31=2 seconds to correspond to the respective distance detection communications. Then, the mobile telephone 1 and the authentication apparatus 2 judge whether or not the counterpart is within a predetermined distance. It is to be noted that creation and transmission of the distance detection telegram signals are identical with, for example, those of the distance detection telegram signals D1 and D2 according to the first embodiment.

Moreover, the second communication procedure 92 includes a communication procedure for authentication, in which the first response divided telegram signal Vn is transmitted from the authentication apparatus 2, and in which the second response divided telegram signal Wn (corresponding to the response acknowledgment telegram signal Sn) is transmitted from the mobile telephone 1 in response to the first response divided telegram signal Vn (where n=1, 2, ..., 8). This second communication procedure 92 is executed at time intervals of T32=16 seconds. It is to be noted that creation and transmission of the first and second response divided telegram signals Vn and Wn are identical with, for example, those according to the fifth embodiment.

Furthermore, the third communication procedure 93 includes a communication procedure for receiving a challenge telegram signal including a challenge telegram transmitted from the mobile telephone 1 to the authentication apparatus 2 and a communication procedure for receiving a challenge telegram signal including a challenge telegram transmitted from the authentication apparatus 2 to the mobile telephone 1, and is executed at time intervals of T33=128 seconds. It takes 128 seconds to execute these communication procedures once. It is to be noted that creation and transmission of the challenge telegram signal are identical with, for example, those according to the fifth embodiment.

In the present embodiment, the power consumption can be remarkably reduced as compared with the authentication communication done at intervals of two seconds, so that the authentication communication can be realized with a quite lower power consumption. Further, because it is possible to determine and detect that the counterpart apparatus is away from the apparatus within two seconds, and that the counterpart apparatus is not a true counterpart apparatus within 16 seconds, it is possible to maintain high security strength. Moreover, because the apparatuses 1 and 2 authenticate each other and detect the detection bidirectionally, it is possible to remarkably improve security as compared with the seventh embodiment.

Figure 47:
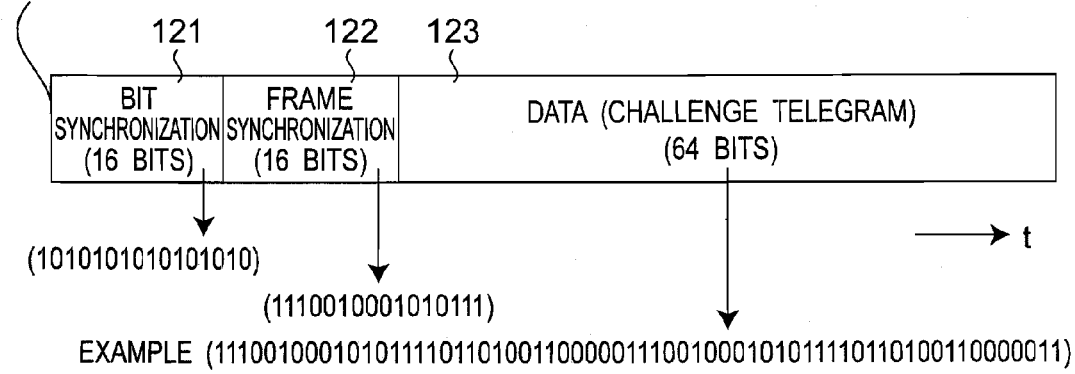
FIG. 47 is a diagram showing signal formats of a first challenge telegram signal and a second challenge telegram signal as used in the procedure of the communication between the mobile telephone 1 and the authentication apparatus 2 shown in FIG. 45.

FIG. 47 is a diagram showing signal formats of the first challenge telegram signal, and the second challenge telegram signal as used in the procedure of the communication between the mobile telephone 1 and the authentication apparatus 2 shown in FIG. 45. Referring to FIG. 47, each of the first challenge telegram signal and the second challenge telegram signal is configured to include data of bit synchronization (16 bits) 121, data of frame synchronization (16 bits) 122, and data including the challenge telegram (64 bits) 123.

Figure 48:
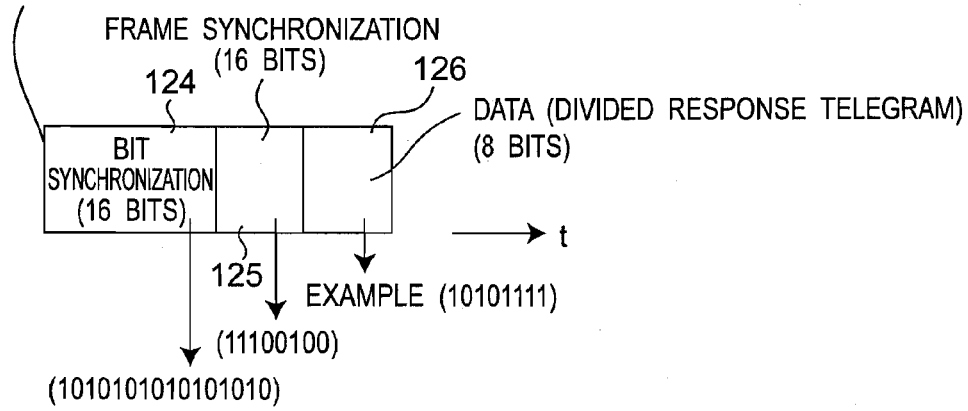
FIG. 48 is a diagram showing signal formats of first response divided telegram signals V1 to V8 and second response divided telegram signals W1 to W8 as used in the procedure of the communication between the mobile telephone 1 and the authentication apparatus 2 shown in FIG. 45.

FIG. 48 is a diagram showing signal formats of first response divided telegram signals V1 to V8, and second response divided telegram signals W1 to W8 as used in the procedure of the communication between the mobile telephone 1 and the authentication apparatus 2 shown in FIG. 45. Referring to FIG. 48, each of the first response divided telegram signals V1 to V8 and the second response divided telegram signals W1 to W8 is configured to include data of bit synchronization (16 bits) 124, data of frame synchronization (8 bits) 125, and data including a divided response telegram (8 bits) 126.

Figure 49:
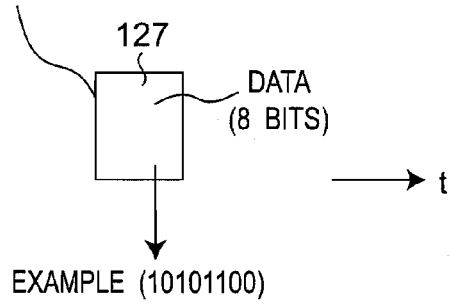
FIG. 49 is a diagram showing signal formats of first distance detection telegram signals T1 to T8 and second distance detection telegram signals U1 to U7 as used in the procedure of the communication between the mobile telephone 1 and the authentication apparatus 2 shown in FIG. 45.

FIG. 49 is a diagram showing signal formats of first distance detection telegram signals T1 to T8, and second distance detection telegram signals U1 to U7 as used in the procedure of the communication between the mobile telephone 1 and the authentication apparatus 2 shown in FIG. 45. Referring to FIG. 49, each of the first distance detection telegram signals T1 to T8 and the second distance detection telegram signals U1 to U7 is configured to include only data (8 bits).

FIG. 51 is a flowchart showing a communication control processing performed by the controller 20 of the mobile telephone 1 according to the eighth embodiment.

In the communication control processing performed by the mobile telephone 1 shown in FIG. 51, the mobile telephone 1, first, performs a synchronization establishment processing in step S301, receives the second challenge telegram signal in step S302, and transmits the first challenge telegram signal in step S303. Next, the mobile telephone 1 resets a parameter "M" to one in step S304, then receives the first response divided telegram signal VM and measures the RSSI signal level thereof in step S305. Then the mobile telephone 1 judges whether or not divided authentication data of the first response divided telegram signal VM coincides with corresponding divided authentication data in a RAM 13 in step S306. If the judgment result is YES, the processing goes to step S308. On the other hand, if NO, the processing goes to step S307. The mobile telephone 1 outputs an alarm in step S307, and the processing then returns to step S301. On the other hand, the mobile telephone 1 transmits the second response divided telegram signal WM in step S308, and judges whether or not the RSSI signal level of the first response divided telegram signal VM exceeds a predetermined threshold value Lth in step S309. If the judgment result is YES, the processing goes to step S311. On the other hand, if NO, the processing goes to step S310. The mobile telephone 1 outputs an alarm in step S310, and the processing then returns to step S312. On the other hand, the mobile telephone 1 stops the alarm in step S311, waits for two seconds in step S312, and goes to step S313.

Next, the mobile telephone 1 resets a parameter "n" to one in step S313, then receives the first distance detection telegram signal TN and measures the RSSI signal level thereof in step S314. Then the mobile telephone 1 judges whether or not the RSSI signal level of the first distance detection telegram signal TN exceeds the predetermined threshold Lth in step S315. If the judgment result is YES, the processing goes to step S317. On the other hand, if NO, the processing goes to step S316. The mobile telephone 1 outputs an alarm in step S316, and the processing goes to step S318. On the other hand, the mobile telephone 1 stops the alarm in step S317, transmits the second distance detection telegram signal UN in step S318, and waits for two seconds in step S319. Next, the mobile telephone 1 judges whether or not the parameter "n" is equal to or larger than 7 in step S320. If the judgment result is YES, the processing goes to step S322. On the other hand, if NO, the processing goes to step S321. The mobile telephone 1 increments the parameter "n" by one in step S321, and the processing returns to step S314. Furthermore, the mobile telephone 1 judges whether or not the parameter "M" is equal to or larger than eight in step S322. If the judgment result is YES, the processing goes to step S302. On the other hand, if NO, the processing goes to step S323. The mobile telephone 1 increments the parameter "M" by one in step S323, the processing returns to step S305.

FIG. 52 is a flowchart showing a communication control processing performed by the controller 20 of the authentication apparatus 2 according to the eighth embodiment.

In the communication control processing performed by the authentication apparatus 2 shown in FIG. 52, the authentication apparatus 2, first, performs a synchronization establishment processing in step S401, transmits the second challenge telegram signal in step S402, and receives the first challenge telegram signal in step S403. Next, the authentication apparatus 2 resets the parameter "M" to one in step S404, transmits the first response divided telegram signal VM in step S405, and receives the second response divided telegram signal WM and measures the RSSI signal level thereof in step S406. Then, the authentication apparatus 2 judges whether or not divided authentication data of the second response divided telegram signal WM coincides with corresponding divided authentication data stored in the RAM 13 in step S407. If the judgment result is YES, the processing goes to step S409. On the other hand, if NO, the processing goes to step S408. The authentication apparatus 2 outputs an alarm in step S408, and the processing returns to step S401. On the other hand, the authentication apparatus 2 judges whether or not the RSSI signal level of the second response divided telegram signal WM exceeds the predetermined threshold value Lth in step S409. If the judgment result is YES, the processing goes to step S411. On the other hand, if NO, the processing goes to step S410. The authentication apparatus 2 outputs an alarm in step S410, and the processing goes to step S412. The authentication apparatus 2 stops the alarm in step S411, waits for two seconds in step S412, and goes to step S413.

Next, the authentication apparatus 2 resets the parameter "n" to one in step S413, transmits the first distance detection telegram signal TN in step S414, and receives the second distance detection telegram signal UN and measures the RSSI signal level thereof in step S415. Then, the authentication apparatus 2 judges whether or not the RSSI signal level of the second distance detection telegram signal UN exceeds the predetermined threshold Lth in step S416. If the judgment result is YES, the processing goes to step S418. On the other hand, if NO, the processing goes to step S417. The authentication apparatus 2 outputs an alarm in step S417, and the processing goes to step S419. On the other hand, the authentication apparatus 2 stops the alarm in step S418, waits for two seconds in step S419, and judges whether or not the parameter "n" is equal to or larger than 7 in step S420. If the judgment result is YES, the processing goes to step S422. On the other hand, if NO, the processing goes to step S421. The authentication apparatus 2 increments the parameter "n" by one in step S421, and the processing returns to step S415. On the other hand, the authentication apparatus 2 judges whether or not the parameter "M" is equal to or larger than eight at the step S422. If the judgment result is YES, the processing returns to step S402. On the other hand, if NO, the processing goes to step S423. The authentication apparatus 2 increments the parameter "M" by one in step S423, and the processing returns to step S405.

As stated so far, the communication procedure according to the second embodiment (FIG. 11) is combined with one of the authentication and judgment procedures (the communication procedure for making the mobile telephone 1 to judge whether or not the authentication apparatus 2 is a true counterpart) in the communication procedure according to the fifth embodiment, and these procedures are executed bidirectionally. Namely, the first to third communication procedures 91, 92, and 93 are provided. The power consumption can be thereby remarkably reduced.

INDUSTRIAL APPLICABILITY

As stated so far in detail, according to the present invention, each of the electronic apparatus and the wireless device monitoring system using the electronic apparatus include the control means for monitoring whether a true counterpart electronic apparatus is present within the threshold distance by repeatedly executing the distance detection processing and the authentication processing continuously at the first communication interval and the second communication interval, respectively, and for outputting an alarm signal or executing a predetermined control processing when the true counterpart electronic apparatus is not present or when the true counterpart electronic apparatus is apart from the electronic apparatus by a distance longer than the predetermined threshold distance. In this case, if the first communication time for the distance detection processing is shorter than second communication time for the authentication processing, the first time interval is set to be shorter than the second time interval. Therefore, the number of repetition (or frequency) of the communication for the distance detection processing having a short communication time is increased, and the number of repetition (or frequency) for the authentication processing having a longer communication time is reduced. Then, this leads to that the total communication time can be shortened and the power consumption can be remarkably reduced while the detection time is kept short.

In addition, each of the electronic apparatus and the wireless device monitoring system using the electronic apparatus according to the present invention judge whether the counterpart electronic apparatus is a true electronic apparatus by judging whether each of the divided authentication data included in the received wireless signal is corresponding divided authentication data when the authentication data is divided into the plurality of divided authentication data, and authenticates the counterpart electronic apparatus, then outputs an alarm signal or executes a predetermined control processing when it is not judged that the counterpart electronic apparatus is the true electronic apparatus. Therefore, the authentication data is divided into a plurality of divided authentication data, and the divided authentication data is transmitted intermittently and received by the counterpart electronic apparatus, so that one communication time can be shortened. Accordingly, even if the number of repetition (or frequency) of communication is increased, the power consumption of the transceiver can be reduced, and the detection time for the authentication can be shortened. In other words, it is possible to realize both of reduction in the response time for authentication and detection, and reduction in the battery consumption.

The invention claimed is:

1. An electronic apparatus comprising:
a receiver for intermittently receiving a first wireless signal and a second wireless signal from a counterpart electronic apparatus;
a distance detector for executing a distance detection processing for detecting whether or not a distance to the counterpart electronic apparatus exceeds a predetermined threshold distance based on a received level of the received first wireless signal;
an authentication unit for executing an authentication processing for authenticating the counterpart electronic apparatus by judging whether or not authentication data included in the received second wireless signal is predetermined authentication data; and
a controller for (i) determining whether or not a true counterpart electronic apparatus is present within the predetermined threshold distance by repeatedly executing the distance detection processing and the authentication processing continuously at a first communication interval and a second communication interval, respectively, and (ii) executing one of a processing of outputting an alarm signal and a predetermined control processing when the true counterpart electronic apparatus is not present within the predetermined threshold distance,
wherein, when a first communication time for the distance detection processing is shorter than a second communication time for the authentication processing, the first communication interval is set to be shorter than the second communication interval, wherein the authentication data is encrypted authentication data, and wherein the authentication unit decodes the encrypted authentication data included in the received second wireless signal from the counterpart electronic apparatus using a predetermined decoding key, and obtains the authentication data.

2. The electronic apparatus of claim 1, wherein the controller determines that the true counterpart electronic apparatus is not present within the predetermined threshold distance when (i) the distance detector detects that the distance to the counterpart electronic apparatus exceeds the predetermined threshold distance, or (ii) the authentication unit judges that the authentication data is not the predetermined authentication data.

3. A wireless device monitoring system comprising:
a first electronic apparatus; and
a second electronic apparatus that is a counterpart electronic apparatus to the first electronic apparatus,
wherein each of the first and second electronic apparatuses includes:
a receiver for intermittently receiving a first wireless signal and a second wireless signal from a counterpart electronic apparatus;
a distance detector for executing a distance detection processing for detecting whether or not a distance to the counterpart electronic apparatus exceeds a predetermined threshold distance based on a received level of the received first wireless signal;
an authentication unit for executing an authentication processing for authenticating the counterpart electronic apparatus by judging whether or not authentication data included in the received second wireless signal is predetermined authentication data; and
a controller for (i) determining whether or not a true counterpart electronic apparatus is present within the predetermined threshold distance by repeatedly executing the distance detection processing and the authentication processing continuously at a first communication interval and a second communication interval, respectively, and (ii) executing one of a processing of outputting an alarm signal and a predetermined control processing when the true counterpart electronic apparatus is not present within the predetermined threshold distance, wherein, when a first communication time for the distance detection processing is shorter than a second communication time for the authentication processing, the first communication interval is set to be shorter than the second communication interval, wherein the authentication data is encrypted authentication data, and wherein the authentication unit decodes the encrypted authentication data included in the received second wireless signal from the counterpart electronic apparatus using a predetermined decoding key, and obtains the authentication data.

4. The wireless device monitoring system of claim 3, wherein the controller determines that the true counterpart electronic apparatus is not present within the predetermined threshold distance when (i) the distance detector detects that the distance to the counterpart electronic apparatus exceeds the predetermined threshold distance, or (ii) the authentication unit judges that the authentication data is not the predetermined authentication data.

5. A wireless device monitoring system comprising:
a first electronic apparatus; and
a second electronic apparatus that is a counterpart electronic apparatus to the first electronic apparatus,
wherein the first electronic apparatus includes:
a first receiver for intermittently receiving a first wireless signal and a second wireless signal from the second electronic apparatus;
a distance detector for executing a distance detection processing for detecting whether or not a distance to the second electronic apparatus exceeds a first predetermined threshold distance based on a received level of the received first wireless signal;
a first authentication unit for executing a first authentication processing for authenticating the second electronic apparatus by judging whether or not first authentication data included in the received second wireless signal is first predetermined authentication data; and
a first controller for (i) determining whether or not a true counterpart second electronic apparatus is present within the first predetermined threshold distance by repeatedly executing the distance detection processing and the first authentication processing continuously at a first communication interval and a second communication interval, respectively, and (ii) executing one of a processing of outputting a first alarm signal and a first predetermined control processing when the true counterpart second electronic apparatus is not present within the first predetermined threshold distance, wherein, when a first communication time for the distance detection processing is shorter than a second communication time for the first authentication processing, the first communication interval is set to be shorter than the second communication interval, and wherein the second electronic apparatus includes:
a second receiver for intermittently receiving a third wireless signal from the first electronic apparatus;
a second authentication unit for executing a second authentication processing for authenticating the first electronic apparatus by judging whether or not second authentication data included in the received third wireless signal is second predetermined authentication data; and
a second controller for (i) determining whether or not a true counterpart first electronic apparatus is present within a second predetermined threshold distance by repeatedly executing the second authentication processing continuously, and (ii) executing one of a processing of outputting a second alarm signal and a second predetermined control processing when the true counterpart first electronic apparatus is not present within the second predetermined threshold distance, wherein the first authentication data is encrypted first authentication data, and wherein the first authentication unit decodes the encrypted first authentication data included in the received second wireless signal from the second electronic apparatus using a predetermined decoding key, and obtains the first authentication data.

6. The wireless device monitoring system of claim 5, wherein the first controller determines that the true counterpart second electronic apparatus is not present within the first predetermined threshold distance when (i) the distance detector detects that the distance to the second electronic apparatus exceeds the first predetermined threshold distance, or (ii) the first authentication unit judges that the first authentication data is not the first predetermined authentication data, and wherein the second controller determines that the true counterpart first electronic apparatus is not present within the first predetermined threshold distance when the second authentication unit judges that the second authentication data is not the second predetermined authentication data.

7. An electronic apparatus comprising:
a receiver for intermittently receiving a first wireless signal and a second wireless signal from a counterpart electronic apparatus, the second wireless signal including a plurality of pieces of divided authentication data into which authentication data is divided;
a distance detector for executing a distance detection processing for detecting whether or not a distance to the counterpart electronic apparatus exceeds a predetermined threshold distance based on a received level of the received first wireless signal, the first wireless signal including a distance detection signal,
an authentication unit for executing authentication processing for authenticating the counterpart electronic apparatus by judging whether or not each of the pieces of divided authentication data, included in the received second wireless signal, corresponds to a piece of corresponding divided predetermined authentication data when the authentication data is divided into the plurality of pieces of divided authentication data; and
a controller for (i) determining whether or not a true counterpart electronic apparatus is present within the predetermined threshold distance by repeatedly executing the distance detection processing and the authentication processing continuously at a first communication interval for transmitting the first wireless signal including the distance detection signal and a second communication interval for transmitting the second wireless signal, respectively, and (ii) executing one of a processing of outputting an alarm signal and a predetermined control processing when the true counterpart electronic apparatus is not present within the predetermined threshold distance, wherein, when a first communication time for the distance detection processing is shorter than a second communication time for the authentication processing, the first communication interval is set to be shorter than the second communication interval, wherein the plurality of pieces of divided authentication data is encrypted authentication data, and wherein the authentication unit (i) obtains the encrypted authentication data by combining the plurality of pieces of divided authentication data included in the received second wireless signal from the counterpart electronic apparatus, (ii) decodes the encrypted authentication data using a predetermined decoding key to obtain the authentication data, and (iii) authenticates the counterpart electronic apparatus using the obtained authentication data.

8. The electronic apparatus of claim 7,
wherein the receiver receives an initial wireless signal including initial authentication data from the counterpart electronic apparatus before receiving the plurality of pieces of divided authentication data,
wherein the authentication unit initially authenticates the counterpart electronic apparatus by judging that the initial authentication data included in the received initial wireless signal is the predetermined authentication data, and wherein the controller executes one of the processing of outputting the alarm and the control processing when the authentication unit does not judge that the initial authentication is the predetermined authentication data.

9. The electronic apparatus of claim 7, wherein the distance detector detects whether or not the distance to the counterpart electronic apparatus exceeds the predetermined threshold based on a received level of the second wireless signal.

10. The electronic apparatus of claim 7, wherein the controller determines that the true counterpart electronic apparatus is not present within the predetermined threshold distance when (i) the distance detector detects that the distance to the counterpart electronic apparatus exceeds the predetermined threshold distance, or (ii) the authentication unit judges that each of the pieces of divided authentication data does not correspond to the piece of corresponding divided predetermined authentication data.

11. A wireless device monitoring system comprising:
a first electronic apparatus; and
a second electronic apparatus that is a counterpart electronic apparatus to the first electronic apparatus and that transmits a first wireless signal and a second wireless signal to the first electronic apparatus,
wherein the first electric apparatus includes:
a receiver for intermittently receiving the first wireless signal and the second wireless signal from the second electronic apparatus, the second wireless signal including a plurality of pieces of divided authentication data into which authentication data is divided;
a distance detector for executing distance detection processing for detecting whether or not a distance to the second electronic apparatus exceeds a predetermined threshold distance based on a received level of the first wireless signal, the received first wireless signal including a distance detection signal;
an authentication unit for executing authentication processing for authenticating the second electronic apparatus by judging whether or not each of the pieces of the plurality of divided authentication data, included in the received second wireless signal, corresponds to a piece of corresponding divided predetermined authentication data when the authentication data is divided into the plurality of pieces of divided authentication data; and
a controller for (i) determining whether or not a true counterpart electronic apparatus is present within the predetermined threshold distance by repeatedly executing the distance detection processing and the authentication processing continuously at a first communication interval for transmitting the first wireless signal including the distance detection signal and a second communication interval for transmitting the second wireless signal, respectively, and (ii) executing one of a processing of outputting an alarm signal and a predetermined control processing when the true counterpart electronic apparatus is not present within the predetermined threshold distance, wherein, when a first communication time for the distance detection processing is shorter than a second communication time for the authentication processing, the first communication interval is set to be shorter than the second communication interval, wherein the plurality of pieces of divided authentication data is encrypted authentication data, and wherein the authentication unit (i) obtains the encrypted authentication data by combining the plurality of pieces of divided authentication data included in the received second wireless signal from the second electronic apparatus, (ii) decodes the encrypted authentication data using a predetermined decoding key to obtain the authentication data, and (iii) authenticates the second electronic apparatus using the obtained authentication data.

12. The wireless device monitoring system of claim 11, wherein the controller determines that the true counterpart electronic apparatus is not present within the predetermined threshold distance when (i) the distance detector detects that the distance to the second electronic apparatus exceeds the predetermined threshold distance, or (ii) the authentication unit judges that each of the pieces of divided authentication data does not correspond to the piece of corresponding divided predetermined authentication data.

13. A wireless device monitoring system comprising:
a first electronic apparatus; and
a second electronic apparatus that is a counterpart electronic apparatus to the first electronic apparatus, the second electronic apparatus transmitting a first wireless signal and a second wireless signal to the first electronic apparatus,
wherein each of the first and second electronic apparatuses includes:
a receiver for intermittently receiving a first wireless signal from a counterpart electronic apparatus, the wireless signal including a plurality of pieces of divided authentication data into which authentication data is divided;
a distance detector for executing a distance detection processing for detecting whether or not a distance to the counterpart electronic apparatus exceeds a predetermined threshold distance based on a received level of the received first wireless signal, the received first wireless signal including a distance detection signal,
an authentication unit for executing authentication processing for authenticating the counterpart electronic apparatus by judging whether or not each of the pieces of divided authentication data, included in the received second wireless signal, corresponds to a piece of corresponding divided predetermined authentication data when the authentication data is divided into the plurality of pieces of divided authentication data; and
a controller for (i) determining whether or not a true counterpart electronic apparatus is present within the predetermined threshold distance by repeatedly executing the distance detection processing and the authentication processing continuously at a first communication interval for transmitting the first wireless signal including the distance detection signal and a second communication interval for transmitting the second wireless signal, respectively, and (ii) executing one of a processing of outputting an alarm signal and a predetermined control processing when the true counterpart electronic apparatus is not present within the predetermined threshold distance, wherein, when a first communication time for the distance detection processing is shorter than a second communication time for the authentication processing, the first communication interval is set to be shorter than the second communication interval, wherein the plurality of pieces of divided authentication data is encrypted authentication data, and wherein the authentication unit (i) obtains the encrypted authentication data by combining the plurality of pieces of divided authentication data included in the received second wireless signal from the counterpart electronic apparatus, (ii) decodes the encrypted authentication data using a predetermined decoding key to obtain the authentication data, and (iii) authenticates the counterpart electronic apparatus using the obtained authentication data.

14. The wireless device monitoring system of claim 13, wherein each of the first and second electronic apparatuses uses authentication data obtained by combining the plurality of pieces of divided authentication data included in the second wireless signal from the counterpart electronic apparatus, as authentication data of a next wireless signal to be next transmitted to the counterpart electronic apparatus.

15. The wireless device monitoring system of claim 13, wherein the controller determines that the true counterpart electronic apparatus is not present within the predetermined threshold distance when (i) the distance detector detects that the distance to the counterpart electronic apparatus exceeds the predetermined threshold distance, or (ii) the authentication unit judges that each of the pieces of divided authentication data does not correspond to the piece of corresponding divided predetermined authentication data.

16. A non-transitory computer readable recording medium having stored thereon a control program for use in an electronic apparatus, wherein, when executed, the control program causes the electronic apparatus to perform a method comprising:

intermittently receiving a first wireless signal and a second wireless signal from a counterpart electronic apparatus;

executing a distance detection processing for detecting whether or not a distance to the counterpart electronic apparatus exceeds a predetermined threshold distance based on a received level of the received first wireless signal;

executing an authentication processing for authenticating the counterpart electronic apparatus by judging whether or not authentication data included in the received second wireless signal is predetermined authentication data;

determining whether or not a true counterpart electronic apparatus is present within the predetermined threshold distance by repeatedly executing the distance detection processing and the authentication processing continuously at a first communication interval and a second communication interval, respectively;

executing one of a processing of outputting an alarm signal and a predetermined control processing when the true counterpart electronic apparatus is not present within the predetermined threshold distance; and setting the first communication interval shorter than the second communication interval when a first communication time for the distance detection processing is shorter than a second communication time for the authentication processing, wherein the authentication data is encrypted authentication data, and wherein the executing the authentication processing includes decoding the encrypted authentication data included in the received second wireless signal from the counterpart electronic apparatus using a predetermined decoding key, and obtaining the authentication data.

17. The non-transitory computer readable recording medium of claim 16, wherein the determining whether or not a true counterpart electronic apparatus is present within the predetermined threshold distance determines that the true counterpart electronic apparatus is not present within the predetermined threshold distance when (i) the distance detection processing detects that the distance to the counterpart electronic apparatus exceeds the predetermined threshold distance, or (ii) the authentication processing judges that the authentication data is not the predetermined authentication data.

18. A non-transitory computer readable recording medium having stored thereon a control program for use in an electronic apparatus, wherein, when executed, the control program causes the electronic apparatus to perform a method comprising:

intermittently receiving a first wireless signal and a second wireless signal from a counterpart electronic apparatus, the second wireless signal including a plurality of pieces of divided authentication data into which authentication data is divided;

executing a distance detection processing for detecting whether or not a distance to the counterpart electronic apparatus exceeds a predetermined threshold distance based on a received level of the received first wireless signal, the first wireless signal including a distance detection signal, executing an authentication processing for authenticating the counterpart electronic apparatus by judging whether or not each of the pieces of divided authentication data, included in the received second wireless signal, corresponds to a pieces of corresponding divided predetermined authentication data when the authentication data is divided into the plurality of pieces of divided authentication data;

determining whether or not a true counterpart electronic apparatus is present within the predetermined threshold distance by repeatedly executing the distance detection processing and the authentication processing continuously at a first communication interval for transmitting the first wireless signal including the distance detection signal and a second communication interval for transmitting the second wireless signal, respectively;

executing one of a processing of outputting an alarm signal and a predetermined control processing when the true counterpart electronic apparatus is not present within the predetermined threshold distance; and setting the first communication interval to be shorter than the second communication interval when first communication time for the distance detection processing is shorter than second communication time for the authentication processing, wherein the plurality of pieces of divided authentication data is encrypted authentication data, and wherein the executing the authentication processing includes (i) obtaining the encrypted authentication data by combining the plurality of pieces of divided authentication data included in the received second wireless signal from the counterpart electronic apparatus, (ii) decoding the encrypted authentication data using a predetermined decoding key to obtain the authentication data, and (iii) authenticating the counterpart electronic apparatus using the obtained authentication data.

19. The non-transitory computer readable recording medium of claim 18, wherein the determining whether or not a true counterpart electronic apparatus is present within the predetermined threshold distance determines that the true counterpart electronic apparatus is not present within the predetermined threshold distance when (i) the distance detection processing detects that the distance to the counterpart electronic apparatus exceeds the predetermined threshold distance, or (ii) the authentication processing judges that each of the pieces of divided authentication data does not correspond to the piece of corresponding divided predetermined authentication data.

* * * * *